US011788921B2

(12) United States Patent
Berry et al.

(10) Patent No.: US 11,788,921 B2
(45) Date of Patent: Oct. 17, 2023

(54) REUSABLE PIPE INTEGRITY TEST HEAD SYSTEMS AND METHODS

(71) Applicant: Trinity Bay Equipment Holdings, LLC, Houston, TX (US)

(72) Inventors: Shawn Thomas Berry, Mont Belivieu, TX (US); Kirk Spencer Francis, Richmond, TX (US); David Michael Gregory, Houston, TX (US); Jonathan Guerrero, Houston, TX (US); John Paul Leger, Baytown, TX (US); Mikel Lee Lewis, Baytown, TX (US); Dale Brian Marietta, Katy, TX (US); Ashesh Srivastava, Houston, TX (US); Jagtar Singh Thethy, Cypress, TX (US); Alexander Lee Winn, Spring, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 18/083,639

(22) Filed: Dec. 19, 2022

(65) Prior Publication Data

US 2023/0122475 A1 Apr. 20, 2023

Related U.S. Application Data

(63) Continuation of application No. 17/588,454, filed on Jan. 31, 2022, now Pat. No. 11,566,961, which is a
(Continued)

(51) Int. Cl.
*G01M 3/28* (2006.01)
*F16L 55/134* (2006.01)

(52) U.S. Cl.
CPC ......... *G01M 3/2807* (2013.01); *F16L 55/134* (2013.01)

(58) Field of Classification Search
None
See application file for complete search history.

(56) References Cited

U.S. PATENT DOCUMENTS

| 2,732,864 A | * | 1/1956 | Stansbury | B65D 59/06 138/96 T |
| 2,745,438 A | * | 5/1956 | Bloom | B65D 59/06 138/96 T |

(Continued)

*Primary Examiner* — Paul M. West
*Assistant Examiner* — Mark A Shabman
(74) *Attorney, Agent, or Firm* — Conrad J. Hsu

(57) ABSTRACT

Techniques for implementing and/or operating a test head that includes an end cap assembly; a bore plug assembly including a plug fastener mechanism; an inflation fluid port and an annulus fluid port that open through the end cap assembly; and an internal inflation fluid conduit that connects the inflation fluid port to the plug fastener mechanism. The end cap assembly includes a cap end plate that covers an open end of a pipe segment, a cap sleeve to be disposed around the pipe segment, and a cap fastener mechanism that runs along an inner surface of the cap sleeve and that expands inward such that the cap fastener mechanism engages an outer surface of the pipe segment. The plug fastener mechanism is to be disposed within a pipe bore of the pipe segment and expands outward such that the plug fastener mechanism engages an inner surface of the pipe segment.

20 Claims, 12 Drawing Sheets

Related U.S. Application Data continuation of application No. 17/329,497, filed on May 25, 2021, now Pat. No. 11,237,075, which is a continuation of application No. 16/930,999, filed on Jul. 16, 2020, now Pat. No. 11,067,469, which is a continuation of application No. 16/748,538, filed on Jan. 21, 2020, now Pat. No. 10,739,225.

(56) References Cited

U.S. PATENT DOCUMENTS

| | | | | |
|---|---|---|---|---|
| 3,858,613 | A | * | 1/1975 | Musslewhite .......... B65D 59/06 138/96 T |
| 4,086,806 | A | | 5/1978 | Covey et al. |
| 4,173,988 | A | * | 11/1979 | Fowler .................. F16L 57/005 138/96 T |
| 4,250,926 | A | | 2/1981 | Satterthwaite et al. |
| 4,442,737 | A | * | 4/1984 | Miner .................... B25B 27/143 81/448 |
| 4,957,678 | A | * | 9/1990 | Budde .................... B65D 59/06 264/263 |
| 6,463,793 | B1 | * | 10/2002 | Selby ..................... G01N 11/14 73/54.32 |
| 11,067,469 | B1 | * | 7/2021 | Francis ............... G01M 3/2807 |
| 2006/0086400 | A1 | | 4/2006 | Beebe et al. |
| 2016/0039980 | A1 | * | 2/2016 | Tzoganakis ......... B29C 49/0005 521/143 |
| 2018/0231168 | A1 | | 8/2018 | Barnes |

* cited by examiner

REUSABLE PIPE INTEGRITY TEST HEAD SYSTEMS AND METHODS

CROSS-REFERENCE

The present disclosure is a continuation-in-part of and claims priority to U.S. patent application Ser. No. 17/588,454, entitled "REUSABLE PIPE INTEGRITY TEST HEAD SYSTEMS AND METHODS," filed Jan. 31, 2022, and issued as U.S. Pat. No. 11,566,961, which is a continuation of U.S. patent application Ser. No. 17/329,497, entitled "REUSABLE PIPE INTEGRITY TEST HEAD SYSTEMS AND METHODS," filed May 25, 2021, and issued as U.S. Pat. No. 11,237,075, which is a continuation of U.S. patent application Ser. No. 16/930,999, entitled "REUSABLE PIPE INTEGRITY TEST HEAD SYSTEMS AND METHODS," filed Jul. 16, 2020, and issued as U.S. Pat. No. 11,067,469, which is a continuation of U.S. patent application Ser. No. 16/748,538, entitled "REUSABLE PIPE INTEGRITY TEST HEAD SYSTEMS AND METHODS," filed on Jan. 21, 2020, and issued as U.S. Pat. No. 10,739,225, which are each incorporated herein by reference in its entirety for all purposes.

BACKGROUND

The present disclosure generally relates to pipeline systems and, more particularly, to a test head that may be secured to a pipe segment, which is or is to be deployed in a pipeline system, to facilitate testing the integrity of the pipe segment.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system generally includes one or more pipe segments, for example, in addition to one or more pipe (e.g., midline and/or end) fittings, which are used to couple a pipe segment to another pipeline component, such as another pipe segment, another pipe fitting, a fluid source, and/or a fluid destination. Generally, a pipe segment includes tubing that defines (e.g., encloses) a pipe bore, which provides a primary fluid conveyance (e.g., flow) path through the pipe segment. More specifically, the tubing of a pipe segment may be implemented to facilitate isolating (e.g., insulating) fluid being conveyed within the pipe bore of the pipe segment from environmental conditions external to the pipe segment, for example, to reduce the likelihood of the conveyed (e.g., bore) fluid being lost to and/or contaminated by the external environmental conditions.

However, at least in some instances, the presence of one or more faults, such as a breach, a kink, and/or a dent, in the tubing of a pipe segment may affect (e.g., reduce and/or compromise) its integrity and, thus, its ability to provide fluid isolation (e.g., insulation). In other words, at least in some instances, operating a pipeline system while a pipe segment deployed therein has an integrity-compromising fault may affect (e.g., reduce) operational efficiency and/or operational reliability of the pipeline system, for example, due to the fault resulting in conveyed fluid being lost to and/or contaminated by external environmental conditions. As such, to facilitate improving operational efficiency and/or operational reliability of a pipeline system, the integrity of a pipe segment, which is or is to be deployed in the pipeline system, may be tested, for example, before beginning and/or resuming normal operation of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a test head includes an end cap assembly, in which the test head is configured to be secured to an open end of a pipe segment such that the open end of the pipe segment is sealed therein; a bore plug assembly including a reusable plug fastener mechanism that includes a plug fluid bladder; an inflation fluid port that opens through the end cap assembly; an internal inflation fluid conduit that fluidly connects the inflation fluid port to the plug fluid bladder to enable inflation fluid to be supplied to the plug fluid bladder, extracted from the plug fluid bladder, or both; and an annulus fluid port that opens through the end cap assembly. The end cap assembly includes a cap end plate that covers the open end of the pipe segment, a cap sleeve to be disposed circumferentially around the pipe segment, and a reusable cap fastener mechanism that runs circumferentially along an inner surface of the cap sleeve and that expands radially inward such that the reusable cap fastener mechanism circumferentially engages a tubing outer surface of the pipe segment to facilitate securing and sealing the open end of the pipe segment within the test head. The plug fluid bladder is to be disposed within a pipe bore of the pipe segment and expands radially outward such that the plug fluid bladder circumferentially engages a tubing inner surface of the pipe segment to facilitate securing and sealing the open end of the pipe segment within the test head. The annulus fluid port facilitates testing integrity of the pipe segment at least in part by enabling annulus test fluid to be supplied to a tubing annulus of the pipe segment, enabling annulus fluid to flow out from the tubing annulus of the pipe segment, or both.

In another embodiment, a test head includes an end cap assembly within which an open end of pipe segment tubing is to be secured and sealed; an annulus fluid port that opens through the end cap assembly; a bore plug assembly including a reusable plug fastener mechanism that is to be disposed internal to the end cap assembly; and a supplemental support assembly including a support clamp that is to be secured to the end cap assembly such that the support clamp is external to the end cap assembly. The reusable plug fastener mechanism facilitates securing and sealing the open end of the pipe segment tubing within the end cap assembly to enable integrity of the pipe segment tubing to be tested at least in part by flowing annulus test fluid into an internal annulus fluid conduit defined in an annulus of the pipe segment tubing via the annulus fluid port that opens through the end cap assembly. The support clamp is to be secured circumferentially around the pipe segment tubing to facilitate securing the open end of the pipe segment tubing within the end cap assembly In another embodiment, a test head includes an end cap assembly within which an open end of pipe segment tubing is to be secured and sealed; an annulus fluid port that opens through the end cap assembly; a support clamp that is to be secured to the end cap assembly and selectively tightened around the pipe segment tubing to facilitate securing the pipe segment tubing within the end cap assembly to enable integrity of the pipe segment tubing to be test at least in part by flowing annulus test fluid into an internal annulus fluid conduit defined within an annulus of the pipe segment tubing via the annulus fluid port that opens through the end cap assembly; a bolt; and a nut. The support clamp includes a first clamp flange having a first fastener opening and a second clamp flange having a second fastener opening, in which the second clamp flange opposes the first clamp flange. The bolt includes a threaded end that is to be inserted through the first fastener opening in the first clamp flange and the second fastener opening in the second clamp flange. The nut is to be tightened on the threaded end of the bolt to facilitate tightening the support clamp around the pipe segment tubing and securing the support clamp to the end cap assembly.

DETAILED DESCRIPTION

Figure 1:
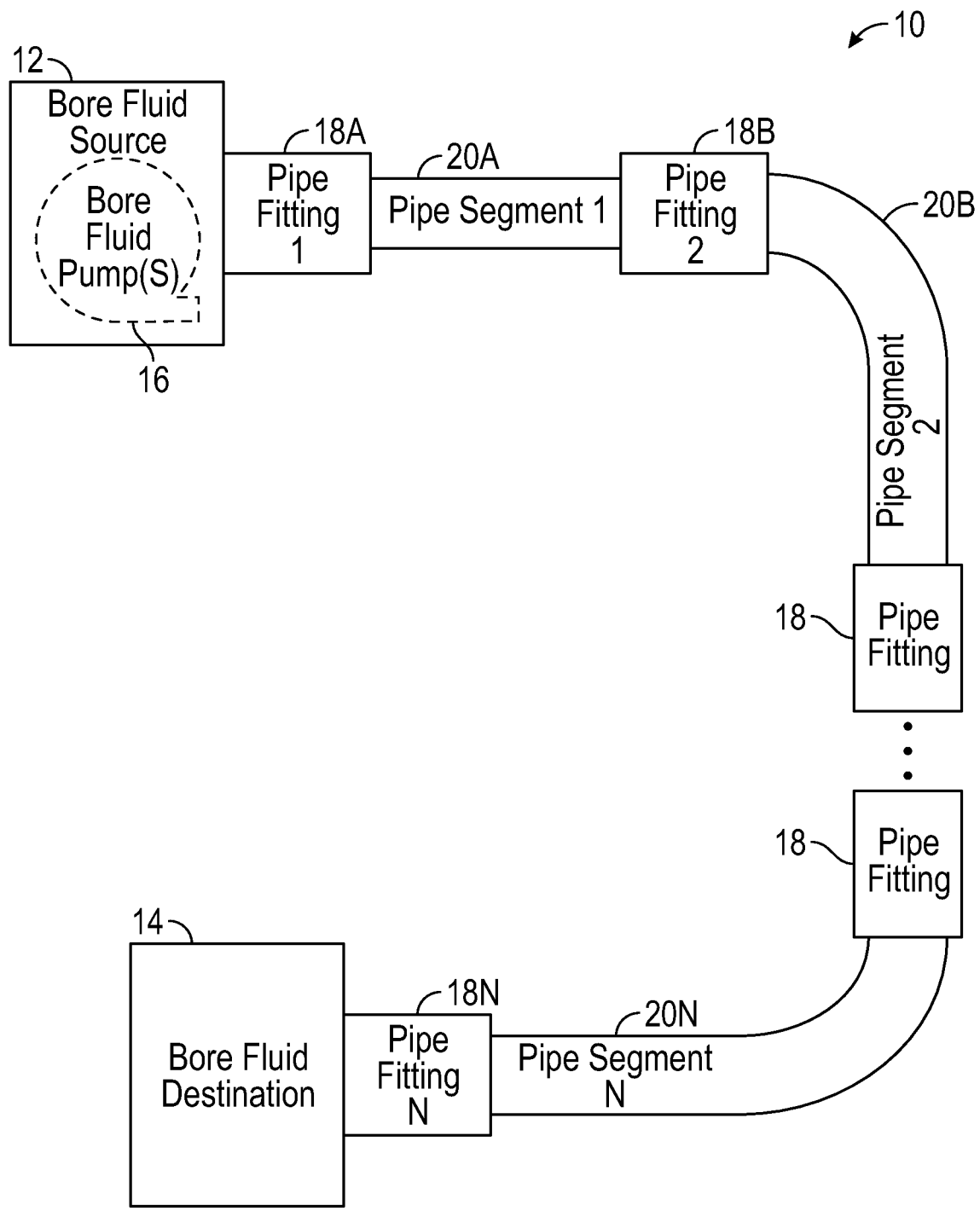
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system includes pipe fittings, such as a midline pipe fitting and/or a pipe end fitting, and one or more pipe segments. Merely as an illustrative non-limiting example, a pipeline system may include a first pipe end fitting that couples a first pipe segment to a bore fluid source, a midline pipe fitting that couples the first pipe segment to a second pipe segment, and a second pipe end fitting that couples the second pipe segment to a bore fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within the pipe bore of the pipe segment and, thus, fluid that flows therethrough. In particular, the tubing of a pipe segment may primarily be implemented to block fluid flow directly between the pipe bore of the pipe segment and environmental conditions external to the pipe segment, for example, in addition to providing thermal and/or electrical isolation (e.g., insulation).

To facilitate providing fluid isolation, in some instances, the tubing of a pipe segment may include multiple tubing layers. For example, the tubing of a pipe segment may include an inner (e.g., innermost and/or liner) barrier layer and an outer (e.g., outermost and/or sheath) barrier layer that each run (e.g., span) the length of the pipe segment. To facilitate blocking fluid flow directly therethrough, the inner barrier layer and the outer barrier layer may each be implemented as a continuous layer of solid material, such as plastic and/or a composite material, that runs the length of the pipe segment.

In some instances, the tubing of a pipe segment may additionally include one or more intermediate (e.g., reinforcement) layers between its inner barrier layer and its outer barrier layer and, thus, in its tubing annulus, for example, to facilitate improving its tensile strength and/or its hoop strength. Additionally, to facilitate improving pipe deployment (e.g., installation) efficiency, in some such instances, an intermediate layer in pipe segment tubing may include solid material, such as metal and/or a composite material, with one or more gaps (e.g., openings) devoid of solid material. In other words, in such instances, the intermediate layer may have one or more gaps in which the solid material is not implemented. Due to the reduced amount of solid material, at least in some instances, implementing an intermediate layer of a pipe segment with one or more openings may facilitate improving flexibility of the pipe segment, for example, to facilitate reducing its minimum bend radius (MBR). In fact, at least in some instances, a flexible pipe segment may be spooled into a coil and, thus, increasing its flexibility may facilitate improving deployment efficiency, for example, by enabling the pipe segment to be transported and/or deployed using a tighter coil.

Nevertheless, in some instances, a fault, such as a breach, a kink, and/or a dent, in the tubing of a pipe segment may affect (e.g., compromise and/or reduce) its integrity and, thus, its ability to provide fluid isolation (e.g., insulation) between the pipe bore of the pipe segment and environmental conditions external to the pipe segment. For example, a fault in the tubing of a pipe segment may result in excessive (e.g., undesired) fluid flow from the pipe segment directly out into environmental conditions external to the pipe segment and/or from the external environmental conditions directly into the pipe segment. Thus, at least in some instances, operating a pipeline system while a pipe segment deployed therein has an integrity-compromising fault may affect (e.g., reduce) operational efficiency and/or operational reliability of the pipeline system, for example, due to the fault resulting in conveyed fluid being lost to and/or contaminated by external environmental conditions.

As such, to facilitate improving operational efficiency and/or operational reliability of a pipeline system, the integrity of a pipe segment deployed or to be deployed in the pipeline system may be tested, for example, via a pipe integrity testing process performed by a pipe integrity testing system before beginning and/or resuming normal operation of the pipeline system. In fact, to facilitate testing its integrity, in some instances, one or more gaps (e.g., openings) in an intermediate layer of a pipe segment may each be implemented such that it runs the length of the pipe segment and opens at each axial end of the pipe segment, thereby providing one or more internal annulus fluid conduits (e.g., paths) through which fluid can flow within the tubing annulus of the pipe segment. In particular, in such instances, the outer barrier layer of a pipe segment may facilitate isolating conditions within the tubing annulus (e.g., one or more internal annulus fluid conduits implemented in one or more intermediate layers) of the pipe segment from environmental conditions external to the pipe segment while the inner barrier layer of the pipe segment may facilitate isolating the conditions within the tubing annulus from conditions within the pipe bore of the pipe segment. In other words, in such instances, a pipe segment may be implemented to enable fluid flow within its pipe bore as well as fluid flow within the annulus of its tubing.

Leveraging this fact, a pipe integrity testing system may perform a pipe integrity testing process on a pipe segment at least in part by supplying (e.g., injecting and/or pumping) annulus test fluid into the tubing annulus (e.g., one or more internal annulus fluid conduit implemented in one or more intermediate layers) of the pipe segment to pressurize the tubing annulus and, subsequently, determining one or more fluid parameters that result in the tubing annulus of the pipe segment. To facilitate supplying annulus test fluid to a pipe segment, a pipe integrity testing system may generally include one or more annulus test fluid sources, such as a fluid pump and/or a compressed air tank. Additionally, to facilitate determining a fluid parameter associated with (e.g., resulting in) a pipe segment and, thus, an integrity state of the pipe segment, a pipe integrity testing system generally include one or more fluid parameter sensors. For example, a pipe integrity testing system may include a fluid pressure sensor to facilitate determining an annulus fluid pressure resulting in a pipe segment, a fluid temperature sensor to facilitate determining an annulus fluid temperature resulting in the pipe segment, a fluid composition sensor to facilitate determining an annulus fluid composition resulting in the pipe segment, or any combination thereof.

In any case, since generally implemented to provide fluid isolation between the pipe bore of a pipe segment and external environmental conditions, the tubing of the pipe segment may facilitate reducing the amount a fluid parameter associated with annulus test fluid supplied to the pipe segment changes and, thus, differs from a corresponding fluid parameter associated with fluid in the tubing annulus of the pipe segment. Although some amount may nevertheless occur, a fluid parameter change that results in a pipe segment with non-faulty tubing due to annulus test fluid being supplied to its tubing annulus is generally predictable, for example, based at least in part on a model, empirical testing, external environmental conditions, fluid parameters of the annulus test fluid, implementation parameters, such as material and/or thickness, of the tubing of the pipe segment, or any combination thereof.

Accordingly, in some embodiments, a pipe integrity testing system may determine that the tubing of a pipe segment is potentially faulty when an annulus fluid parameter resulting in the pipe segment due to supply of annulus test fluid differs from a corresponding fluid parameter of the annulus test fluid by more than a corresponding difference (e.g., error) threshold, which accounts for the expected (e.g., predicted) change, for example, in addition to sensor (e.g., measurement) error and/or changes in external environmental conditions. Merely as an illustrative non-limiting example, a pipe integrity testing system may determine that the tubing of a pipe segment is potentially faulty when annulus fluid pressure resulting in the pipe segment differs from (e.g., is greater than or is less than) the fluid pressure of annulus test fluid supplied to the pipe segment by more than a pressure difference threshold, when annulus fluid temperature resulting in the pipe segment differs from the temperature of the annulus test fluid by more than a temperature difference threshold, when annulus fluid composition resulting in the pipe segment differs from the fluid composition of the annulus test fluid by more than a composition difference threshold, or any combination thereof.

Accordingly, at least in some instances, efficacy (e.g., accuracy) of an integrity test for a pipe segment may be premised on the tubing annulus (e.g., one or more internal annulus fluid conduits implemented in one or more intermediate layers) of the pipe segment being fluidly isolated from conditions external to the tubing of the pipe segment. To facilitate providing fluid isolation, a test head may be secured to an axial (e.g., open) end of a pipe segment such that the test head seals the axial end of the tubing of the pipe segment and, thus, its tubing annulus therein. In particular, in some instances, a test head may be secured to a pipe segment using swaging techniques. For example, in such instances, an axial end of the pipe segment may be inserted into a tubing cavity defined in the test head and special-purpose deployment equipment—namely a swage machine—may then conformally deform at least a portion of the test head around the tubing of the pipe segment such that the test head is compressed against an outer surface (e.g., outer barrier layer) of the pipe segment tubing as well as an inner surface (e.g., inner barrier layer) of the pipe segment tubing, which facilitates securing the test head to the axial end of the pipe segment tubing such that the axial end of the pipe segment tubing and, thus, an open end of its tubing annulus are sealed within the test head.

However, at least in some instances, securing a test head to a pipe segment using swaging techniques may affect (e.g., reduce) pipe integrity testing efficiency. For example, at least in some instances, the deformation used to secure a test head to a pipe segment may result in the test head effectively being permanently coupled to the pipe segment. Thus, in such instances, the test head along with the portion of the pipe segment secured therein may be cut off from the remainder of the pipe segment before the pipe segment is deployed in and/or used in normal operation of a pipeline system. Moreover, even when the portion of a pipe segment secured in a test head is removable from the test head, at least in some instances, the deformation used to secure the test head to the pipe segment may limit the ability of the test head to be reused for testing the integrity of another pipe segment. In other words, at least in some instances, a test head secured using swaging techniques may effectively be a one-time-use (e.g., sacrificial) test head and, thus, potentially limit pipe integrity testing efficiency for a pipeline system, for example, due to at least one new (e.g., different) test head being used to test the integrity of each pipe segment deployed or to be deployed in the pipeline system.

Accordingly, to facilitate improving pipe integrity testing efficiency, the present disclosure provides techniques for implementing and/or operating a reusable test head that which may be utilized in a pipe integrity testing system and/or during a pipe integrity testing process, for example, to separately test the integrity of multiple different pipe segments. As will be described in more detail below, to facilitate sealing a tubing annulus of a pipe segment from the pipe bore of the pipe segment and, thus, testing the integrity of the pipe segment, a reusable test head generally includes a bore plug assembly, which is to be at least partially inserted into the pipe bore of the pipe segment. Additionally, to facilitate sealing a tubing annulus of a pipe segment from external environmental conditions and, thus, testing the integrity of the pipe segment, a reusable test head generally includes an end cap assembly, which is to be disposed around and cover an open (e.g., axial) end of the pipe segment.

To facilitate testing the integrity of a pipe segment, in some embodiments, a reusable test head may additionally include one or more annulus (e.g., test) fluid ports, which each opens through its end cap assembly to enable fluid to flow into and/or out from the tubing annulus of the pipe segment. In particular, to facilitate supplying annulus test fluid to the tubing annulus of a pipe segment, an annulus test fluid source may be fluidly connected to an annulus fluid port on a corresponding reusable test head, for example, via one or more external annulus fluid conduits, such as a hose. Additionally or alternatively, to facilitate determining an annulus fluid parameter resulting in a pipe segment, one or more fluid parameter sensors may be fluidly connected to an annulus fluid port on a corresponding reusable test head, for example, via one or more external annulus fluid conduits. Nevertheless, one or more fluid parameter sensors may additionally or alternatively be implemented within (e.g., internal to) a reusable test head.

In any case, to facilitate reusably securing and sealing pipe segment tubing therein and, thus, improving pipe integrity testing efficiency, a reusable test head generally includes one or more reusable fastener mechanisms, for example, instead of a swaged (e.g., one-time use) fastener mechanism. In particular, to facilitate sealing a tubing annulus of a pipe segment from the pipe bore of the pipe segment, a bore plug assembly of a reusable test head generally includes a reusable plug fastener mechanism (e.g., seal or bladder), which expands radially outward when transitioned from a deactivated state toward an activated state (e.g., to circumferentially compress an outer surface of the reusable plug fastener mechanism against an inner surface of the tubing of the pipe segment) and contracts radially inward when transitioned from the activated state toward the deactivated state (e.g., to disengage the outer surface of the reusable plug fastener mechanism from the inner surface of the tubing of the pipes segment). In other words, a bore plug assembly of a reusable test head may generally be inserted into and/or withdrawn from the pipe bore of a pipe segment while the bore plug assembly is in its deactivated state. On the other hand, while in its activated state, a bore plug assembly of a reusable test head may facilitate sealing the tubing annulus of a pipe segment from the pipe bore of the pipe segment, for example, in addition to securing the reusable test head to the pipe segment.

Additionally, to facilitate sealing a tubing annulus of a pipe segment from external environmental conditions, an end cap assembly of a reusable test head generally includes a reusable cap fastener mechanism (e.g., seal or bladder), which expands radially inward when transitioned from a deactivated state toward an activated state (e.g., to circumferentially compress an inner surface of the reusable cap fastener mechanism against an outer surface of the tubing of the pipe segment) and contracts radially outward when transitioned from the activated state toward the deactivated state (e.g., to disengage the inner surface of the reusable cap fastener mechanism from the outer surface of the tubing of the pipe segment). In other words, an end cap assembly of a reusable test head may generally be disposed over and/or removed from an axial (e.g., open) end of a pipe segment while in its deactivated state. On the other hand, while in its activated state, an end cap assembly of a reusable test head may facilitate sealing the tubing annulus of a pipe segment from environmental conditions external to the pipe segment, for example, in addition to securing the reusable test head to the pipe segment.

In particular, to enable repeatedly cycling between an activated state and a deactivated state and, thus, separately testing the integrity of multiple different pipe segments, in some embodiments, a reusable (e.g., cap or plug) fastener mechanism in a reusable test head may be a mechanical fastener mechanism that generally includes a mechanical (e.g., cap or plug) seal, which expands radially when axially compressed between other components of the reusable test head and contracts radially when the axial compression is released. In other words, in some such embodiments, a bore plug assembly in a reusable test head may include a mechanical plug fastener mechanism (e.g., seal). Additionally or alternatively, an end cap assembly in a reusable test head may include a mechanical cap fastener mechanism (e.g., seal).

To facilitate controlling expansion and contraction of a (e.g., outer and/or first) mechanical cap fastener mechanism (e.g., seal) and, thus, its activation state, in some embodiments, an end cap assembly of a reusable test head may additionally include (1) a cap end plate, which is implemented to cover an open end of a pipe segment and includes a (e.g., first) shaft opening (e.g., pad eye) that enables a threaded shaft to be inserted through the cap end plate, (2) a cap end ring, which is to be disposed circumferentially around the pipe segment and includes another (e.g., second) shaft opening that enables the threaded shaft to be inserted through the cap end ring, (3) a cap sleeve, which is to be disposed circumferentially around the pipe segment between the cap end plate and the cap end ring such that (4) the mechanical cap fastener mechanism is disposed circumferentially around the pipe segment between the cap sleeve and the cap end ring, (5) an end plate nut, which is to be selectively tightened on the threaded shaft behind the shaft opening in the cap end plate, and (6) an end ring nut, which is to be selectively tightened on the threaded shaft in front of the other shaft opening in the cap end ring, for example, in addition to another (e.g., inner and/or second) cap fastener mechanism (e.g., seal), which is to be disposed circumferentially around the pipe segment between the cap end plate and the cap sleeve. Accordingly, in such embodiments, the end cap assembly may be transitioned from its deactivated state toward its activated state at least in part by tightening the end plate nut on the threaded shaft directly behind the shaft opening in the cap end plate and/or tightening the end ring nut on the threaded shaft directly in front of the other shaft opening in its cap end ring to axially compress the mechanical cap fastener mechanism between the cap end ring and the cap sleeve such that the mechanical cap fastener mechanism contracts radially inward. On the other hand, the end cap assembly may be transitioned from its activated state towards its deactivated state at least in part by loosening the end plate nut from behind the shaft opening in the cap end plate and/or loosening the end ring nut from in front of the other shaft opening in the cap end ring to enable the mechanical cap fastener mechanism to push the cap sleeve and the cap end ring axially away from one another as the mechanical cap fastener mechanism expands radially outward (e.g., due to material spring back).

To facilitate controlling expansion and contraction of a mechanical plug fastener mechanism (e.g., seal) and, thus, its activation state, in some embodiments, a bore plug assembly of a reusable test head may additionally include (1) a threaded plug shaft, (2) a plug end plate, which is secured to an end of the threaded plug shaft, (3) a plug activation plate, which is disposed circumferentially around the threaded plug shaft such that the plug activation plate can slide along the threaded plug shaft and (4) the mechanical plug fastener mechanism is disposed circumferentially around the threaded plug shaft between the plug activation plate and the plug end plate, and (5) a plug activation nut, which is to be selectively tightened on the threaded plug shaft behind the plug activation plate. Accordingly, in such embodiments, the bore plug assembly may be transitioned from its deactivated state toward its activated state at least in part by tightening the plug activation nut on the threaded plug shaft behind the plug activation plate to axially compress the mechanical plug fastener mechanism between the plug activation plate and the plug end plate such that the mechanical plug fastener mechanism expands radially outward. On the other hand, the bore plug assembly may be transitioned from its activated state towards its deactivated state at least in part by loosening the plug activation nut from behind the plug activation plate to enable the mechanical plug fastener mechanism to push the plug activation plate axially away from the plug end plate as the mechanical plug fastener mechanism contracts radially inward (e.g., due to material spring back).

However, to enable repeatedly cycling between an activated state and a deactivated state and, thus, separately testing the integrity of multiple different pipe segments, in other embodiments, a reusable (e.g., cap or plug) fastener mechanism in a reusable test head may be an inflatable (e.g., pneumatic) fastener mechanism that generally includes an inflatable bladder, which expands radially when inflation fluid is supplied to its fluid cavity and contracts radially when inflation fluid is extracted (e.g., released) from its fluid cavity. In other words, in some such embodiments, a bore plug assembly in a reusable test head may include an inflatable plug fastener mechanism (e.g., bladder). Additionally or alternatively, an end cap assembly in a reusable test head may include an inflatable cap fastener mechanism (e.g., bladder). Furthermore, in such embodiments, to facilitate supplying inflation fluid to and/or extracting inflation fluid from a reusable fastener mechanism in a reusable test head, a pipe integrity testing system may generally include one or more inflation fluid sources, such as a fluid pump and/or a compressed air tank, which can be fluidly connected to the reusable test head, for example, via one or more external inflation fluid conduits, such as a hose.

To facilitate controlling expansion and contraction of an inflatable cap fastener mechanism (e.g., bladder) and, thus, its activation state, in some embodiments, an end cap assembly of a reusable test head may additionally include (1) a cap end plate, which is implemented to cover an open end of the pipe segment, (2) a cap sleeve, which is secured to the cap end plate, is to be disposed circumferentially around the pipe segment, and has (3) the inflatable cap fastener mechanism implemented circumferentially along its inner surface, (4) one or more inflation fluid ports, which open through the cap end plate and/or the cap sleeve, and (5) one or more internal cap inflation fluid conduits, which fluidly connect an (e.g., first and/or cap) inflation fluid port to the inflatable cap fastener mechanism. Accordingly, in such embodiments, the end cap assembly may be transitioned from its deactivated state toward its activated state at least in part by supplying inflation fluid to the inflatable cap fastener mechanism (e.g., from an inflation fluid source that is fluidly connected to the inflation fluid port via one or more external inflation fluid conduits) such that the inflatable cap fastener mechanism expands radially inward. On the other hand, in such embodiments, the end cap assembly may be transitioned from its activated state towards its deactivated state at least in part by extracting (e.g., releasing) inflation fluid from the inflatable cap fastener mechanism (e.g., back to the inflation fluid source or to external environmental conditions) such that the inflatable cap fastener mechanism contracts radially outward.

Furthermore, to facilitate controlling expansion and contraction of an inflatable plug fastener mechanism (e.g., bladder) and, thus, its activation state, in some embodiments, a bore plug assembly of a reusable test head may additionally include (1) a plug shaft, which is or is to be secured to a cap end plate of a corresponding end cap assembly and has (2) the inflatable fastener mechanism secured thereto, and (3) one or more internal plug inflation fluid conduits, which fluidly connect a (e.g., second and/or plug) inflation fluid port that opens through the end cap assembly to the inflatable plug fastener mechanism. Accordingly, in such embodiments, the bore plug assembly may be transitioned from its deactivated state toward its activated state at least in part by supplying inflation fluid to the inflatable plug fastener mechanism (e.g., from an inflation fluid source that is fluidly connected to the inflation fluid port via one or more external inflation fluid conduits) such that the inflatable plug fastener mechanism expands radially outward. On the other hand, in such embodiments, the bore plug assembly may be transitioned from its activated state towards its deactivated state at least in part by extracting (e.g., releasing) inflation fluid from the inflatable plug fastener mechanism (e.g., back to the inflation fluid source or to external environmental conditions) such that the inflatable plug fastener mechanism contracts radially inward.

In fact, in some embodiments, a reusable test head may include multiple different types of reusable fastener mechanisms. For example, a reusable test head may include an inflatable (e.g., pneumatic) plug fastener mechanism (e.g., bladder) and a mechanical cap fastener mechanism (e.g., seal). Alternatively, a reusable test head may include a mechanical plug fastener mechanism (e.g., seal) and an inflatable cap fastener mechanism (e.g., bladder).

In any case, since the tubing annulus of a pipe segment is pressurized during integrity testing, to facilitate blocking a bore plug assembly of a reusable test head from being pushed too far into the pipe bore of the pipe segment, in some embodiments, the bore plug assembly may be secured to a corresponding end cap assembly. For example, to facilitate securing a bore plug assembly thereto, in some embodiments, an end cap assembly may include a plug shaft opening, which enables a threaded plug shaft of the bore plug assembly to be inserted therein. In particular, in some such embodiments, the plug shaft opening in the end cap assembly may include threading and, thus, the bore plug assembly may be secured to the end cap assembly at least in part by threadingly engaging the threaded plug shaft of the bore plug assembly with the threading in the plug shaft opening in the end cap assembly. Additionally or alternatively, the plug shaft opening in the end cap assembly may enable the threaded plug shaft of the bore plug assembly to extend through the end cap assembly and, thus, the reusable test head may additionally include a plug securement nut, which is to be selectively tightened on the threaded plug shaft behind the plug shaft opening in the end cap assembly to facilitate securing the bore plug assembly to the end cap assembly. However, in other embodiments, an end cap assembly and a bore plug assembly of a reusable test head may be integrated together, for example, due to a plug shaft of the bore plug assembly being integrated with a cap end plate and a cap sleeve of the end cap assembly to form a shell.

Moreover, in some embodiments, a plug shaft included in a bore plug assembly of a reusable test head may be a hollow tube and, thus, defined a tube bore that enables fluid flow therein. In fact, in some such embodiments, a plug shaft and an internal plug inflation fluid conduit of a bore plug assembly may be integrated together by using the tube bore of the plug shaft to fluidly connect a corresponding inflation fluid port to an inflatable plug fastener mechanism (e.g., seal) in the bore plug assembly.

However, in other such embodiments, to facilitate improving pipe integrity testing, a reusable test head may additionally include a bore fluid port, which opens through its end cap assembly to a first end of a tube bore in the plug shaft of its bore plug assembly, and the plug shaft may extend through a reusable (e.g., inflatable or mechanical) plug fastener mechanism of the bore plug assembly such that a second end its tube bore opens through the reusable plug fastener mechanism to the pipe bore of the pipe segment. In particular, since the tubing annulus of a pipe segment is pressurized during integrity testing, in some embodiments, a pipe integrity testing system may include one or more bore test fluid sources, such as a fluid pump and/or a compressed air tank, which can be operated to supply bore test fluid to the pipe bore of the pipe segment to facilitate pressurizing the pipe bore and, thus, blocking the inner barrier layer of the pipe segment from collapsing. Accordingly, in such embodiments, a bore test fluid source may be fluidly connected to a bore fluid port on a reusable test head, for example, via one or more external bore fluid conduits, such as a hose.

Additionally or alternatively, since the inner barrier layer of a pipe segment is primarily implemented to provide fluid isolation between the pipe bore of the pipe segment and external environmental conditions and, thus, provides fluid isolation between the pipe bore and the tubing annulus of the pipe segment, which is external to the inner barrier layer, an unexpected change in a bore fluid parameter resulting in the pipe bore of the pipe segment due to supply of annulus test fluid to the tubing annulus of the pipe segment may indicate that the integrity of the inner barrier layer of the pipe segment is potentially compromised by one or more faults, such as a breach. For example, an unexpected change (e.g., increase or decrease) in bore fluid pressure in a pipe segment toward the fluid pressure of annulus test fluid supplied to the pipe segment, an unexpected change in bore fluid temperature in the pipe segment toward the fluid temperature of the annulus test fluid, and/or an unexpected change in bore fluid composition in the pipe segment toward the fluid composition of the annulus test fluid may indicate that annulus test fluid is leaking from the tubing annulus of the pipe segment into the pipe bore and, thus, the inner barrier layer of the pipe segment is potentially faulty. Accordingly, to facilitate determining one or more bore fluid parameters and, thus, testing pipe integrity, in some embodiments, one or more fluid parameter sensors, such as a fluid pressure sensor, a fluid temperature sensor, and/or a fluid composition sensor, may be fluidly connected to a bore fluid port on a reusable annulus test head, for example, via one or more external bore fluid conduits, such as a hose.

In any case, supplying annulus test fluid to the tubing annulus of a pipe segment may pressurize the tubing annulus and, thus, attempt to push a test head, which is secured to the pipe segment, away from the pipe segment. To facilitate increasing securement strength, in some embodiments, a contact (e.g., inner or outer) surface of a reusable (e.g., inflatable or mechanical) fastener mechanism (e.g., seal or bladder) in a reusable test head may be contoured (e.g., rough) and/or coated with a substance that provides a higher coefficient of friction than the base material of the reusable fastener mechanism. Additionally, when a reusable test head includes an inflatable fastener mechanism, the inflatable fastener mechanism may be pressurized to a higher fluid pressure than the tubing annulus of a corresponding pipe segment.

Furthermore, to facilitate further improving securement strength of its end cap assembly and/or its bore plug assembly, in some embodiments, a reusable test head may additionally include a supplemental support assembly, which is to be secured to a pipe segment external from the end cap assembly and generally includes a support clamp. In particular, in such embodiments, a support clamp in a supplemental support assembly may contract radially inward when transitioned from a deactivated state toward an activated state (e.g., to compress an inner surface of the support clamp against an outer surface of the tubing of a pipe segment) and expand radially outward when transitioned from the activated state toward the deactivated state (e.g., to disengage the inner surface of the support clamp from the outer surface of the tubing of the pipe segment). In other words, a supplemental support assembly of a reusable test head may generally be secured to a pipe segment while in its activated state and removed from the pipe segment while in its deactivated state.

To facilitate controlling expansion and contraction of a support clamp and, thus, its activation state, in some embodiments, a supplemental support assembly of a reusable test head may additionally include one or more support activation fasteners, such as a nut and a bolt, which are each to be selectively tightened around a corresponding pair of clamp flanges on the support clamp. Accordingly, to facilitate transitioning the supplemental support assembly from its deactivated state toward its activated state, in such embodiments, a support activation fastener may be tightened around a pair of clamp flanges on the support clamp to cause the support clamp to contract radially inward. On the other hand, to facilitate transitioning the supplemental support assembly from its activated state toward its deactivated state, the support activation fastener may be loosened from around the pair of clamp flanges on the support clamp to enable the support clamp to expand radially outward (e.g., due to material spring back) to facilitate removing the support clamp from a pipe segment.

Moreover, to facilitate securing a support clamp to a corresponding end cap assembly, a supplemental support assembly of a reusable test head may generally include one or more support members (e.g., arms). In particular, in some embodiments, a support member in a supplemental support assembly may be a support bar, which is to be secured between a pair of clamp flanges on a support clamp and includes at least a fastener opening that enables a corresponding support activation fastener to extend therethrough. Accordingly, in such embodiments, securing a support activation fastener around a pair of clamp flanges on the support clamp may facilitate securing the support clamp to a pipe segment as well as securing the support clamp to the support bar and, thus, a corresponding end cap assembly. On the other hand, removing the support activation fastener from around the pair of clamp flanges may facilitate removing the support clamp from the pipe segment as well as disconnecting the end cap assembly from the support clamp.

In some such embodiments, to facilitate securing its supplemental support assembly to its end cap assembly, a reusable test head may additionally include one or more cap securement fasteners, such as a nut and a bolt, which are each to be selectively tightened around a corresponding pair of cap flanges on the end cap assembly and through a corresponding fastener opener in a support bar of the supplemental support assembly. Accordingly, in such embodiments, securing a cap securement fastener around a pair of cap flanges in the end cap assembly and through a fastener opening in a support bar of the supplemental support assembly may facilitate securing the end cap assembly to the support bar and, thus, a support clamp in the supplemental support assembly, On the other hand, removing (e.g., withdrawing) the cap securement fastener from the fastener opening in the support bar may facilitate disconnecting the end cap assembly from the support bar and, thus, the support clamp. However, instead of being a discrete component, in other such embodiments, a support bar of a supplemental support assembly may be integrated with the cap sleeve of an end cap assembly, for example, as part of a shell.

Furthermore, in other embodiments, a support member in a supplemental support assembly of a reusable test head may be a threaded support shaft, which is to be secured in a shaft opening in an end cap assembly via a cap nut (e.g., end plate nut or end ring nut) and inserted between a corresponding pair of clamp flanges on a support clamp in the supplemental support assembly, and the reusable test head may include a support securement nut, which is to be selectively tightened on the threaded support shaft in front of the pair of clamp flanges on the support clamp. Accordingly, in such embodiments, tightening the cap nut on the threaded support shaft behind the shaft opening in the end cap assembly and tightening a support securement nut on the threaded support shaft in front of a pair of clamp flanges on the support clamp may facilitate securing the end cap assembly to the support clamp. On the other hand, in such embodiments, removing the cap nut from behind the shaft opening in the end cap assembly and/or removing the support securement nut may facilitate disconnecting the end cap assembly from the threaded support shaft and, thus, the support clamp.

Moreover, in other embodiments, a support member in a supplemental support assembly of a reusable test head may be a support chain, which is to be secured to the end cap assembly of the reusable test head as well as a support activation fastener in the supplemental support assembly. In particular, in some such embodiments, a first end of the support chain may be secured (e.g., shackled) to a threaded cap shaft in the end cap assembly between the cap end plate and the cap end ring in the end cap assembly and a second end of the support chain may be secured to the support activation fastener between a corresponding pair of clamp flanges on a support clamp in the supplemental support assembly. Accordingly, in such embodiments, securing (e.g., shackling) the support chain to the end cap assembly and securing the support chain to the support activation fastener, which is secured to the support clamp, may facilitate securing the end cap assembly to the support clamp. On the other hand, in such embodiments, disconnecting (e.g., unshackling) the support chain from the end cap assembly and/or disconnecting the support chain from the support activation fastener may facilitate disconnecting the end cap assembly from the support clamp.

Nevertheless, in some embodiments, an end cap assembly of a reusable test head may not be disconnected from a support clamp in a corresponding supplemental support assembly while the reusable test head is being removed from and/or installed at a pipe segment, for example, to facilitate reducing deployment duration for reinstalling (e.g., redeploying and/or reusing) the reusable test head at another pipe segment. In particular, in some such embodiments, when an end cap assembly and a corresponding supplemental support assembly are transitioned to their deactivated states, a support member in the supplemental support assembly may remain secured between the end cap assembly and a corresponding support clamp in the supplemental support assembly and, thus, the end cap assembly and the supplemental support assembly may be slid onto and/or off of a pipe segment as a unit.

In any case, in this manner, as will be described in more detail below, the techniques described in the present disclosure may facilitate implementing and/or operating a (e.g., reusable) test head such that the test head is reusable to separately test the integrity of multiple different pipe segments. For example, implementing and/or operating a reusable test head in accordance with the techniques described in the present disclosure may enable the reusable test head to be secured to a first pipe segment to test its integrity, removed from the first pipe segment after completing a pipe integrity testing cycle for the first pipe segment, secured to a second (e.g., different) pipe segment to test its integrity, and so on. Thus, at least in some instances, implementing and/or operating a reusable test head in accordance with the techniques described in the present disclosure may facilitate improving pipe integrity testing efficiency for a pipeline system, for example, by obviating the use of a new (e.g., different) test head for testing each pipe segment deployed or to be deployed in the pipeline system.

To help illustrate, an example of a pipeline system 10 is shown in FIG. 1. As in the depicted example, a pipeline system 10 may generally be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, a pipeline system 10 may generally facilitate transporting (e.g., conveying) fluid, such as gas and/or liquid, from a bore fluid source 12 to a bore fluid destination 14. In fact, in some embodiments, a pipeline system 10 may be used in many applications, including without limitation, both onshore and offshore oil and gas applications. For example, in such embodiments, a pipeline system 10 may be used to transport one or more hydrocarbons, such as crude oil, petroleum, natural gas, or any combination thereof. Additionally or alternatively, a pipeline system 10 may be used to transport one or more other types of fluid, such as produced water, fresh water, fracturing fluid, flowback fluid, carbon dioxide, or any combination thereof.

To facilitate flowing fluid to a bore fluid destination 14, in some embodiments, a bore fluid source 12 may include one or more bore fluid pumps 16, which operate to inject (e.g., pump and/or supply) fluid from the bore fluid source 12 into a bore of a pipeline system 10. However, it should be appreciated that the depicted example is merely intended to be illustrative and not limiting. In particular, in other embodiments, a bore fluid pump 16 may not be included at a bore fluid source 12, for example, when fluid flow through the bore of a pipeline system 10 is produced by gravity. Additionally or alternatively, in other embodiments, a bore fluid pumps 16 may be included in a pipeline system 10 and/or at a bore fluid destination 14.

In any case, to facilitate transporting fluid from a bore fluid source 12 to a bore fluid destination 14, a pipeline system 10 generally include pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may include multiple different tubing layers. For example, the tubing of a pipe segment 20 may include a first high-density polyethylene (e.g., internal corrosion protection) layer, one or more intermediate (e.g., metal, composite, and/or reinforcement) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material within its annulus. In fact, in some embodiments, free space defined within the tubing of a pipe segment 20 may run (e.g., span) the length of the pipe segment 20 and, thus, define (e.g., enclose) an internal annulus fluid conduit (e.g., free space) in the annulus of the tubing, which is separate from the pipe bore. In other words, in such embodiments, fluid may flow through a pipe segment 20 via its pipe bore, free space (e.g., gaps and/or one or more internal annulus fluid conduits) defined within its tubing annulus, or both.

Figure 2:
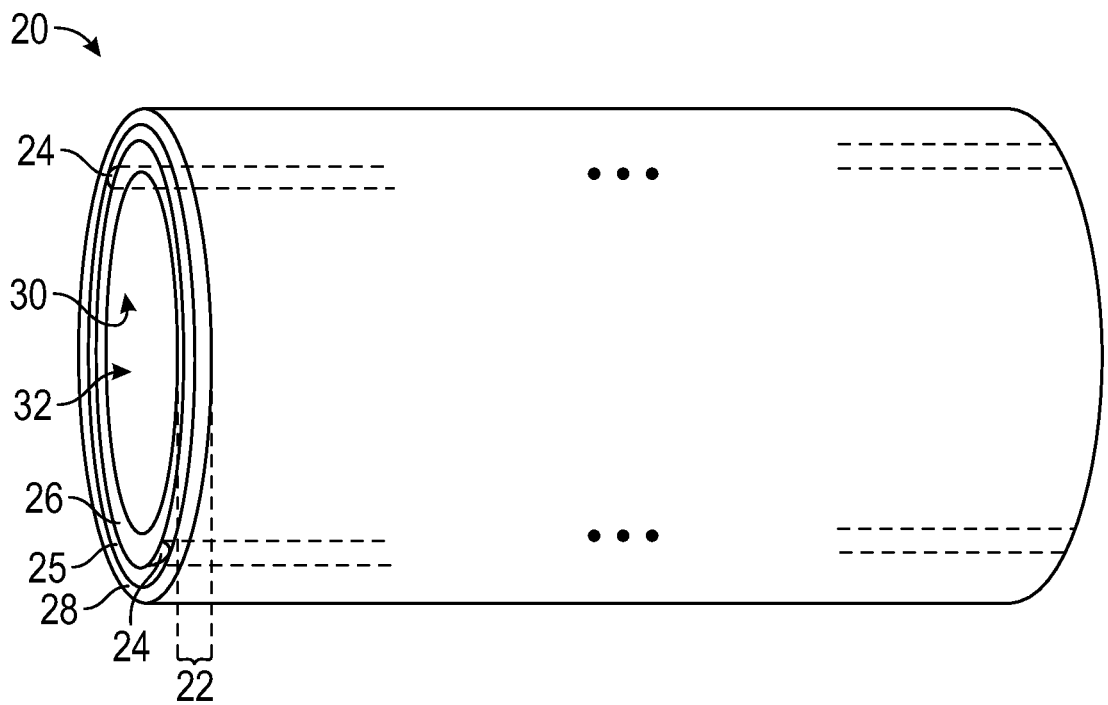
FIG. 2 is a side view of an example of a pipe segment that includes a pipe bore defined by its tubing as well as fluid conduits defined within an annulus of its tubing, in accordance with an embodiment of the present disclosure.

To help illustrate, an example of a pipe segment 20, which includes tubing 22 with internal annulus fluid conduits (e.g., free space) 24 defined in its annulus 25, is shown in FIG. 2. As depicted, the pipe segment tubing 22 has multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures having two or more layers, for example, as distinguished from a rubber or plastic single-layer hose subject to vulcanization. In any case, as depicted, an inner surface 30 of the pipe segment tubing 22 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is defined between its inner barrier layer 26 and its outer barrier layer 28. As will be described in more detail below, the tubing annulus 25 may include one or more intermediate layers. Furthermore, as depicted, internal annulus fluid conduits (e.g., free space and/or gaps) 24 running along the length of the pipe segment 20 are defined (e.g., enclosed) in the tubing annulus 25 and open at axial ends of the pipe segment tubing 22. As described above, an internal annulus fluid conduit 24 in the tubing annulus 25 may be devoid of solid material. As such, pipe segment tubing 22 that includes one or more internal annulus fluid conduits 24 may include less solid material and, thus, exert less resistance to flexure, for example, as compared to solid pipe segment tubing 22 and/or pipe segment tubing 22 that does not include internal annulus fluid conduits 24 defined therein. Moreover, to facilitate further improving pipe flexibility, in some embodiments, one or more tubing layers in a pipe segment 20 may be unbonded from one or more other tubing layers and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) internal annulus fluid conduits 24 defined in its tubing annulus 25. Additionally, in other embodiments, an internal annulus fluid conduit 24 defined in the tubing annulus 25 of a pipe segment 20 may run non-parallel to the pipe bore 32 of the pipe segment 20, for example, such that the internal annulus fluid conduit 24 is skewed relative to the axial extent (e.g., longitudinal axis) of the pipe bore 32.

Figure 3:
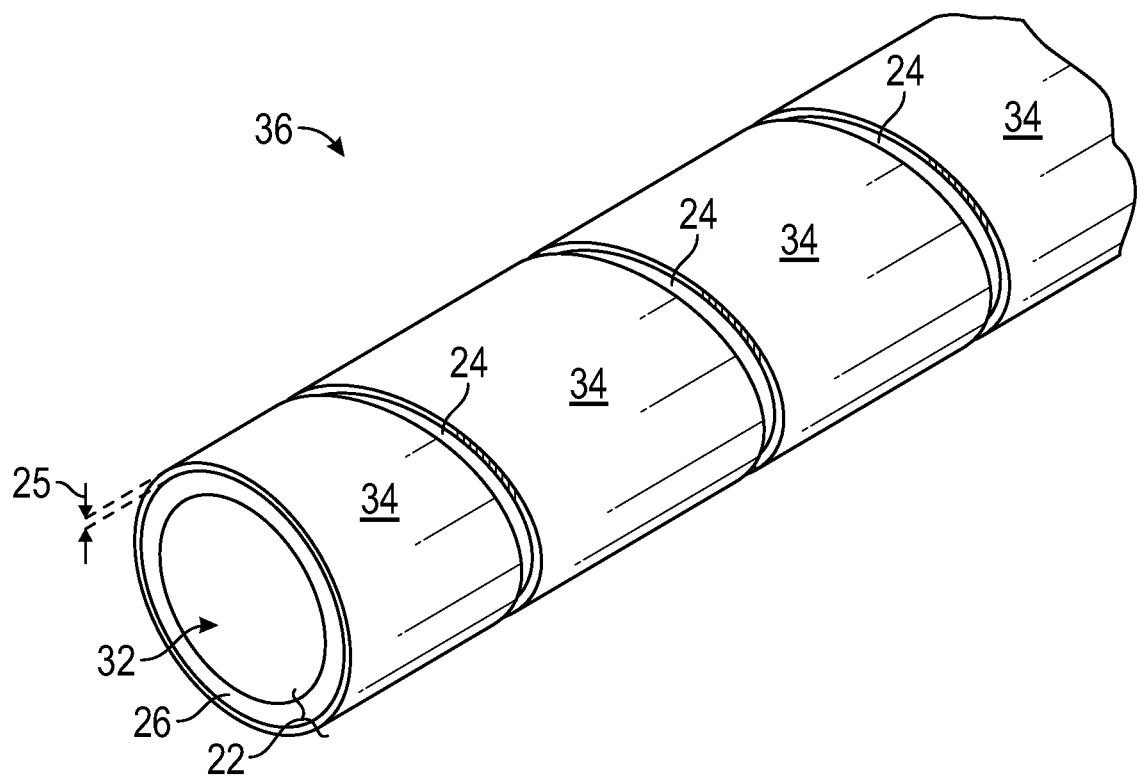
FIG. 3 is a perspective view of an example of a portion of a pipe segment that includes a helically shaped fluid conduit defined within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 in pipe segment tubing 22 may be composite material and/or metal, such as carbon steel, stainless steel, duplex stainless steel, super duplex stainless steel, or any combination thereof. In other words, at least in some such embodiments, an intermediate layer 34 of the pipe segment tubing 22 may be formed using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define an internal annulus fluid conduit 24. In other words, in some embodiments, the intermediate layer 34 may be implemented at least in part by winding a metal (e.g., steel) strip around the inner barrier layer 26 at a non-zero lay angle (e.g., fifty-two degrees) relative to the longitudinal axis of the pipe bore 32. In any case, as depicted, the resulting internal annulus fluid conduit 24 runs helically along the pipe segment 20, for example, such that the internal annulus fluid conduit 24 is skewed fifty-two degrees relative to the longitudinal axis of the pipe bore 32.

In some embodiments, an outer barrier layer 28 may be disposed directly over the depicted intermediate layer 34 and, thus, cover and/or define (e.g., enclose) the depicted internal annulus fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding internal annulus fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted internal annulus fluid conduit 24 and to implement another internal annulus fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another internal annulus fluid conduit 24 in the second other intermediate layer 34. Furthermore, a third other intermediate layer 34 may be helically disposed on the second other intermediate layer 34 using the same non-zero lay angle as the second other intermediate layer 34 to cover the other internal annulus fluid conduit 24 in the second other intermediate layer 34 and to implement another internal annulus fluid conduit 24 in the third other intermediate layer 34. In some embodiments, an outer barrier layer 28 may be disposed over the third other intermediate layer 34 and, thus, cover (e.g., define and/or enclose) the third other internal annulus fluid conduit 24 in the third other intermediate layer 34.

In any case, as described above, the tubing 22 of a pipe segment 20 is generally implemented to facilitate isolating conditions within the pipe bore 32 of the pipe segment 20 from environmental conditions external to the pipe segment 20. However, even when including multiple tubing layers, in some instances, a fault, such as a breach, a kink, and/or a dent, in the tubing 22 of a pipe segment 20 may compromise its integrity and, thus, its ability to provide isolation, for example, due to the fault resulting in excessive (e.g., undesired) fluid flow from the pipe segment 20 directly out into environmental conditions external to the pipe segment 20 and/or from the external environmental conditions directly into the pipe segment 20. As such, at least in some instances, operating a pipeline system 10 while a pipe segment 20 deployed therein has an integrity-compromising fault may affect (e.g., reduce) operational efficiency and/or operational reliability of the pipeline system 10, for example, due to the fault resulting in conveyed fluid being lost to and/or contaminated by external environmental conditions. As such, to facilitate improving operational efficiency and/or operational reliability of a pipeline system 10, the integrity of a pipe segment 20 deployed or to be deployed in the pipeline system 10 may be tested via a pipe integrity testing system, for example, which is implemented and/or operated to perform a pipe integrity testing process on the pipe segment 20 before beginning and/or resuming normal operation of the pipeline system 10.

Figure 4:
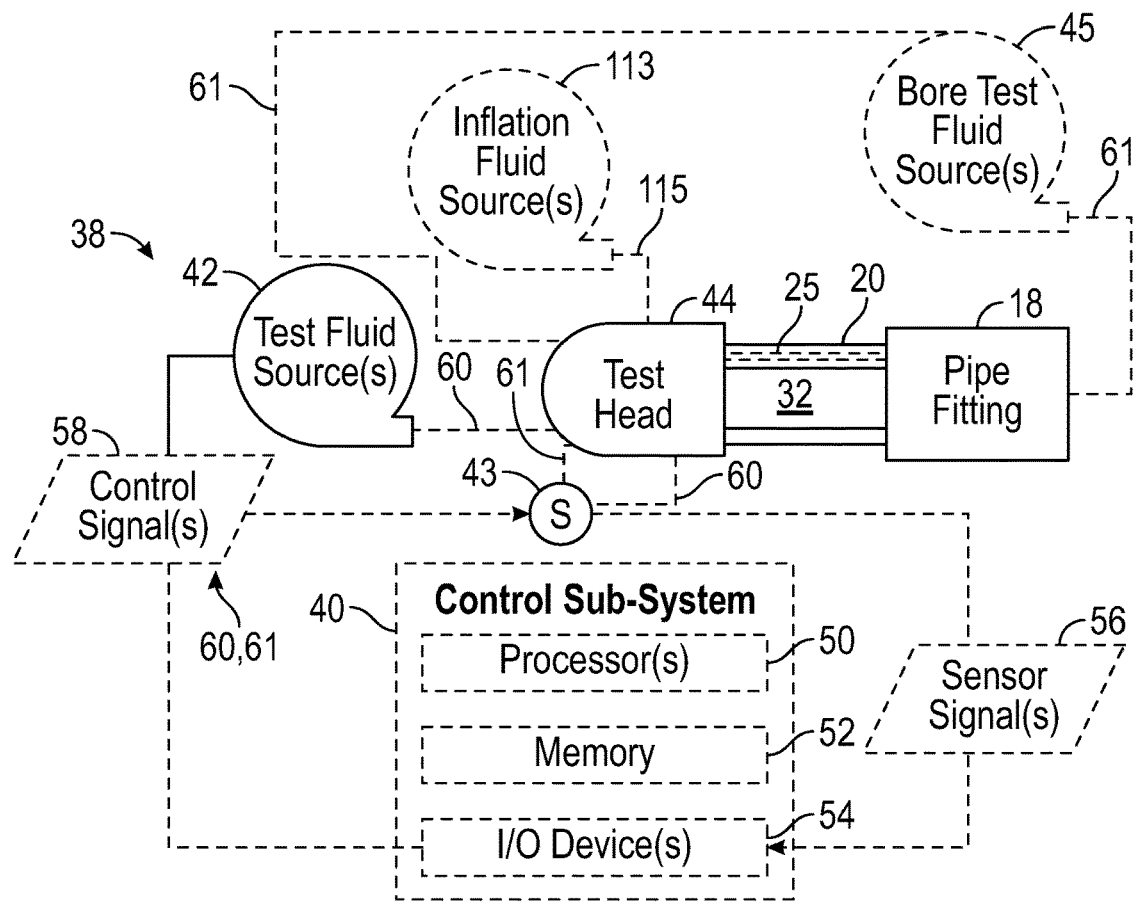
FIG. 4 is a block diagram of an example of a pipe integrity testing system, in accordance with an embodiment of the present disclosure.

To help illustrate, an example of a pipe integrity testing system 38, which may be implemented and/or operated to perform a pipe integrity testing process on a pipe segment 20, is shown in FIG. 4. As mentioned above, the outer barrier layer 28 of a pipe segment 20 may primarily be implemented to provide fluid isolation between external environmental conditions and the pipe bore 32 of the pipe segment 20 and, thus, provides fluid isolation between the external environmental conditions and the tubing annulus 25 of the pipe segment 20, which is internal to the outer barrier layer 28. Additionally, the inner barrier layer 26 of a pipe segment 20 may primarily be implemented to provide fluid isolation between the pipe bore 32 of the pipe segment 20 and external environmental conditions and, thus, provides fluid isolation between the pipe bore 32 of the pipe segment 20 and the tubing annulus 25 of the pipe segment 20, which is external to the inner barrier layer 26. In other words, in such instances, a pipe segment may be implemented to enable fluid flow within its pipe bore 32 as well within the annulus 25 (e.g., one or more internal annulus fluid conduits 24 implemented in one or more intermediate layers 34) of its tubing 22.

Leveraging this fact, a pipe integrity testing system 38 may perform a pipe integrity testing process on a pipe segment 20 at least in part by supplying (e.g., injecting and/or pumping) annulus test fluid to the tubing annulus 25 of the pipe segment 20 to pressurize the tubing annulus 25 and, subsequently, determining one or more fluid parameters that result in the tubing annulus 25 of the pipe segment 20. To facilitate supplying annulus test fluid to the tubing annulus 25 of a pipe segment 20, as depicted, a pipe integrity testing system 38 generally includes one or more annulus test fluid sources 42, such as a fluid pump and/or a compressed air tank. In particular, in some embodiments, annulus test fluid used in a pipe integrity testing system 38 and/or a pipe integrity testing process may be an inert fluid, such as nitrogen (e.g., $N_2$) gas, for example, to facilitate reducing the likelihood that the annulus test fluid itself affects (e.g., reduces) integrity of pipe segment tubing 22.

In any case, since the tubing annulus 25 of a pipe segment 20 is pressurized during integrity testing, in some embodiments, a pipe integrity testing system 38 may also pressurize the pipe bore 32 of the pipe segment 20 to facilitate blocking the inner barrier layer 26 of the pipe segment 20, which is internal to the tubing annulus 25, from collapsing. As in the depicted example, to facilitate supplying bore test fluid to the pipe bore 32 of a pipe segment 20 and, thus, pressurizing the pipe bore 32, in some embodiments, a pipe integrity testing system 38 may include one or more bore test fluid sources 45, such as a fluid pump and/or a compressed air tank.

In particular, in some embodiments, bore annulus test fluid used in a pipe integrity testing system 38 and/or a pipe integrity testing process may be an inert fluid, for example, to facilitate reducing the likelihood that the bore test fluid itself affects (e.g., reduces) integrity of pipe segment tubing 22. In fact, in some such embodiments, a pipe integrity testing system 38 and/or a pipe integrity testing process may utilize the same type of fluid as annulus test fluid and as bore test fluid, for example, such that the same fluid source can be selectively used as a bore test fluid source 45 during a first time period and as an annulus test fluid source 42 during a second (e.g., subsequent and/or non-overlapping) time period. However, in other such embodiments, a pipe integrity testing system 38 and/or a pipe integrity testing process may utilize different types of fluid for annulus test fluid and bore test fluid, which, as will be described in more detail below, may facilitate improving pipe integrity testing, for example, by enabling the pipe bore 32 of a pipe segment 20 to be pressurized while also enabling an integrity state of the pipe segment 20 to be determined based at least in part on fluid composition that results in the pipe bore 32 of the pipe segment 20 due to the annulus test fluid being supplied to its tubing annulus 25.

Nevertheless, it should be appreciated that the depicted example is merely intended to be illustrative and not limiting. In particular, in other embodiments, a pipe integrity testing system 38 may not include a bore test fluid source 45, for example, when the inner barrier layer 26 of a pipe segment 20 being tested is not expected to collapse due to its tubing annulus 25 being pressurized during integrity testing.

In any case, as depicted, to facilitate determining a fluid parameter associated with (e.g., resulting in) a pipe segment 20 and, thus, testing the integrity of the pipe segment 20, a pipe integrity testing system 38 generally includes one or more fluid parameter sensors 43. In particular, in some embodiments, a pipe integrity testing system 38 may include one or more fluid temperature sensors 43. Additionally or alternatively, a pipe integrity testing system 38 may include one or more fluid pressure sensors 43, one or more fluid composition sensors 43, or both.

In any case, since generally implemented to provide fluid isolation between the pipe bore 32 of a pipe segment 20 and external environmental conditions, the tubing 22 of the pipe segment 20 may facilitate reducing the amount a fluid parameter associated with annulus test fluid supplied to the pipe segment 20 changes and, thus, differs from a corresponding fluid parameter associated with fluid in the tubing annulus 25 of the pipe segment 20. Although some amount may nevertheless occur, a fluid parameter change that results in a pipe segment 20 with non-faulty tubing 22 is generally predictable, for example, based at least in part on a model, empirical testing, external environmental conditions, fluid parameters of test fluid supplied to the pipe segment, implementation parameters, such as material and/or thickness, of the tubing 22 of the pipe segment 20, or any combination thereof. In other words, at least in some instances, an annulus fluid parameter resulting in the tubing 22 of a pipe segment 20 that differs from a corresponding fluid parameter of annulus test fluid supplied to the tubing annulus 25 of a pipe segment 20 by more than a corresponding difference (e.g., error) threshold, which accounts for the expected (e.g., predicted) change (e.g., in addition to sensor (e.g., measurement) error and/or changes in external environmental conditions), may indicate that the pipe segment tubing 22 is potentially faulty.

Accordingly, in some embodiments, a pipe integrity testing system 38 may determine that the tubing 22 of a pipe segment 20 is potentially faulty when an annulus fluid parameter resulting in the tubing annulus 25 of the pipe segment 20 differs from a corresponding fluid parameter of annulus test fluid supplied to the tubing annulus 25 of the pipe segment 20 by more than a corresponding difference (e.g., error) threshold. For example, the pipe integrity testing system 38 may determine that the tubing 22 of the pipe segment 20 is potentially faulty when annulus fluid pressure resulting in the pipe segment 20 differs from (e.g., is greater than or is less than) the fluid pressure of annulus test fluid supplied to the pipe segment 20 by more than a pressure difference threshold. As another example, the pipe integrity testing system 38 may determine that the tubing 22 of the pipe segment 20 is potentially faulty when annulus fluid temperature resulting in the pipe segment 20 differs from (e.g., is greater than or is less than) the fluid temperature of annulus test fluid supplied to the pipe segment 20 by more than a temperature difference threshold. As a further example, the pipe integrity testing system 38 may determine that the tubing 22 of the pipe segment 20 is potentially faulty when annulus fluid composition resulting in the pipe segment 20 differs from the fluid composition of annulus test fluid supplied to the pipe segment 20 by more than a composition difference threshold.

As in the depicted example, to facilitate determining an integrity state of a pipe segment 20 and/or controlling its operation, in some embodiments, a pipe integrity testing system 38 may additionally include a control sub-system 40. In particular, as in the depicted example, a control sub-system 40 in a pipe integrity testing system 38 may generally include one or more processors 50, memory 52, and one or more input/output (I/O) devices 54.

In some embodiments, memory 52 in a control sub-system 40 may include one or more tangible, non-transitory, computer-readable media that are implemented and/or operated to store data and/or executable instructions. For example, the memory 52 may store sensor data based at least in part on one or more sensor signals 56 received from a fluid parameter sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in a control sub-system 40 may include processing circuitry that is implemented and/or operated to process data and/or to execute instructions stored in memory 52. In other words, in some embodiments, a processor 50 in a control sub-system 40 may include one or more general purpose microprocessors, one or more application specific integrated circuits (ASICs), one or more field programmable gate arrays (FPGAs), or any combination thereof. For example, a processor 50 in a control sub-system 40 may process sensor data stored in memory 52 to determine a fluid parameter measured (e.g., sensed) by a corresponding fluid parameter sensor 43, and, thus, an integrity state of a pipe segment 20 being tested.

Additionally or alternatively, a processor 50 in a control sub-system 40 of a pipe integrity testing system 38 may execute instructions stored in memory 52 to determine one or more control (e.g., command) signals 58 that instruct the pipe integrity testing system 38 to perform corresponding control actions. For example, the control sub-system 40 may determine a control signal 58 that instructs an annulus test fluid source 42 to output (e.g., pump and/or supply) annulus test fluid. As another example, the control sub-system 40 may determine a control signal 58 that instructs a fluid parameter sensor 43 to return one or more sensor signals 56 indicative of corresponding fluid parameters, such as fluid temperature, fluid pressure, and/or fluid composition, determined (e.g., sensed and/or measured) by the fluid parameter sensor 43. As a further example, the control sub-system 40 may determine a control signal 58 that instructs a bore test fluid source 45 to output (e.g., pump and/or supply) bore test fluid.

To enable communication outside a control sub-system 40, in some embodiments, I/O devices 54 of the control sub-system 40 may include one or more input/output (I/O) ports (e.g., terminals). Additionally, to facilitate communicating the results of a pipe integrity test to a user (e.g., operator and/or service technician), in some embodiments, I/O devices 54 of a control sub-system 40 may include one or more user output devices, such as an electronic display, which is implemented and/or operated to display a graphical user interface (GUI) that provides a visual representation of pipe integrity test results (e.g., integrity state of tested pipe segment 20). Furthermore, to enable user interaction with a pipe integrity testing system 38, in some embodiments, I/O devices 54 of a control sub-system 40 in the pipe integrity testing system 38 may include one or more user input devices, such as a hard button, a soft button, a keyboard, a mouse, and/or the like. For example, the one or more user input devices may enable an operator to input a user command that instructs the pipe integrity testing system 38 to initiate a pipe integrity test for a pipe segment 20.

However, it should again be appreciated that the depicted example is merely intended to be illustrative and not limiting. In particular, in other embodiments, a pipe integrity testing system 38 may not include a control sub-system 40, for example, when operation of the pipe integrity testing system 38 is to be manually controlled and fluid parameters determined by fluid parameter sensors 43 are to be manually analyzed to determine the integrity state of a pipe segment 20.

In any case, as described above, an integrity test for a pipe segment 20 may generally be premised on the tubing annulus 25 of the pipe segment 20 being sealed from the pipe bore 32 of the pipe segment 20 as well as external environmental conditions. However, as described above, an internal annulus fluid conduit 24 defined within the tubing annulus 25 of a pipe segment 20 generally opens at an axial end of the pipe segment 20. Accordingly, as depicted, to facilitate testing the integrity of a pipe segment 20, a pipe integrity testing system 38 generally includes a test head 44, which is to be secured to an axial end of the pipe segment 20 such that an open end of the tubing annulus 25 in the pipe segment 20 is sealed within the test head 44.

However, it should again be appreciated that the depicted example is merely intended to be illustrative and not limiting. In particular, although a single pipe segment 20 is depicted, in other embodiments, a pipe integrity testing system 38 may concurrently test the integrity of multiple pipe segments 20, for example, by fluidly coupling the pipe segments 20 between the test head 44 and the depicted pipe fitting 18 via one or more midline pipe fittings 18. Additionally or alternatively, although a pipe fitting 18 is depicted as being coupled to another (e.g., second and/or opposite) axial end of the pipe segment 20, in other embodiments, another test head 44 may be used instead. In other words, in such embodiments, a pipe integrity testing system 38 may include a first test head 44, which is to be secured a first axial end of a pipe segment 20, as well as a second test head 44, which is to be secured to a second (e.g., opposite) axial end of the pipe segment 20.

In any case, as in the depicted example, since the tubing annulus 25 of a pipe segment 20 is sealed therein, in some embodiments, to facilitate supplying annulus test fluid to the tubing annulus 25 and, thus, testing the integrity of the pipe segment 20, an annulus test fluid source 42 may be fluidly coupled to a corresponding test head 44 via one or more external annulus fluid conduits 60, such as a hose. Similarly, to facilitate determining a fluid parameter associated with the tubing annulus 25 of a pipe segment 20 and, thus, determining the integrity state of the pipe segment 20, in some embodiments, a fluid parameter sensor 43 may be fluidly connected to a corresponding test head 44 via one or more external annulus fluid conduits 60. Furthermore, to facilitate supplying bore test fluid to the pipe bore 32 of a pipe segment 20, in some embodiments, a bore test fluid source 45 may be fluidly connected to a corresponding test head 44 or a corresponding pipe fitting 18 via one or more external bore fluid conduits 61, such as a hose.

However, it should again be appreciated that the depicted example is merely intended to be illustrative and not limiting. In particular, in other embodiments, an annulus test fluid source 42 and/or a fluid parameter sensor 43 in a pipe integrity testing system 38 may be fluidly connected to the tubing annulus 25 of a pipe segment 20 via an annulus fluid port that opens through the outer barrier layer 28 of the pipe segment 20. Additionally or alternatively, a pipe integrity testing system 38 may include one or more fluid parameter sensors 43 internal to (e.g., implemented within) a test head 44. Furthermore, in other embodiments, a fluid parameter sensor 43 may be fluidly connected to a bore fluid port, which opens through a test head 44, via one or more external bore fluid conduits 61.

In any case, as mentioned above, to facilitate testing the integrity of a pipe segment 20, a test head 44 may generally be secured to the tubing 22 of a pipe segment 20 such that the tubing annulus 25 of the pipe segment 20 is sealed within the test head 44. For example, in some instances, a test head 44 may be secured to a pipe segment 20 using swaging techniques. In particular, in such instances, an axial (e.g., open) end of the pipe segment 20 may be inserted into the test head 44 such that the tubing 22 of the pipe segment 20 is disposed in a tubing cavity defined between an outer portion (e.g., jacket) of the test head 44 and an inner portion (e.g., tube) of the test head 44. In such embodiments, special-purpose deployment equipment—namely a swage machine—may then operate to conformally deform the test head 44 around the tubing 22 of the pipe segment 20 such that the pipe segment tubing 22 is circumferentially compressed between the outer portion and the inner portion of the test head 44, thereby securing and sealing the axial end of the pipe segment tubing 22 and, thus, an open end of its annulus 25 within the test head 44.

However, at least in some instances, securing a test head 44 to a pipe segment 20 using swaging techniques may affect (e.g., reduce) testing efficiency of a pipeline system 10. For example, at least in some instances, the deformation of a test head 44 that is used to secure the test head 44 to a pipe segment 20 may result in the test head 44 effectively being permanently coupled to the pipe segment 20. Thus, at least in some such instances, the test head 44 along with the portion of the pipe segment 20 secured therein may be cut off from the remainder of the pipe segment 20 before the pipe segment 20 is deployed in and/or used in normal operation of a pipeline system 10. Moreover, even when the portion of a pipe segment 20 secured in a test head 44 is removable from the test head 44, at least in some instances, the deformation used to secure the test head 44 to the pipe segment 20 may limit the ability of the test head 44 to be reused for testing the integrity of another pipe segment 20.

In other words, at least in some instances, a test head 44 secured using swaging techniques may effectively be a one-time-use (e.g., sacrificial) test head 44. Thus, at least in such instances, utilizing a test head 44 secured via swaging techniques may potentially limit testing efficiency of a pipeline system 10, for example, due to at least one new (e.g., different) test head 44 being used to test each pipe segment 20 deployed or to be deployed in the pipeline system 10. Accordingly, to facilitate improving pipe integrity testing efficiency, a pipe integrity testing system 38 may instead include a test head 44 that is reusable to separately test multiple different pipe segments 20.

Figure 5:
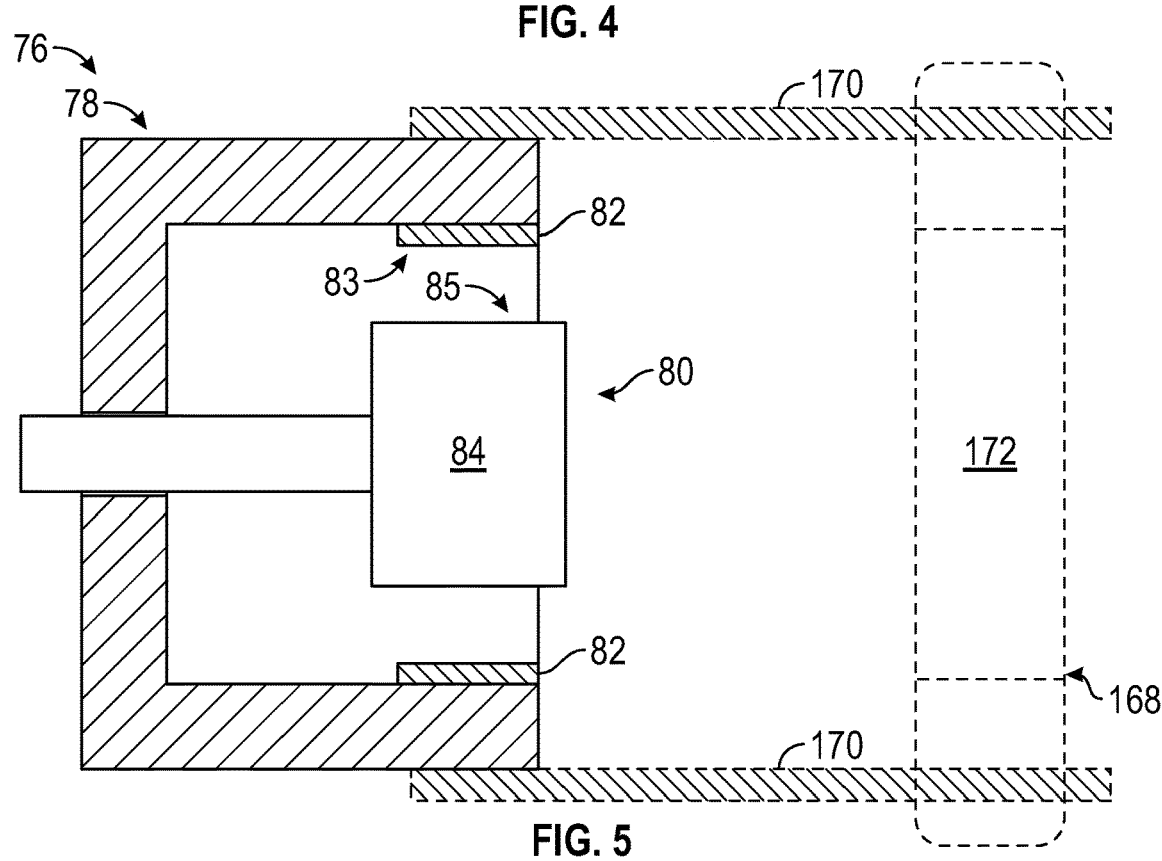
FIG. 5 is a side cross-sectional view of an example of a reusable test head that may be included in the pipe integrity testing system of FIG. 4, in accordance with an embodiment of the present disclosure.

To help illustrate, an example of a test head 44 that is reusable—namely a reusable test head 76—is shown in FIG. 5. As depicted, a reusable test head 76 in a pipe integrity testing system 38 generally includes an end cap assembly 78, which is to be used to cover an open (e.g., axial) end of a pipe segment 20 to facilitate sealing a tubing annulus 25 of the pipe segment 20 from environmental conditions external to the pipe segment 20, and a bore plug assembly 80, which is to be at least partially inserted into the pipe bore 32 of the pipe segment 20 to facilitate sealing the tubing annulus 25 of the pipe segment 20 from conditions within the pipe bore 32 of the pipe segment 20.

In particular, as depicted, to facilitate sealing a tubing annulus 25 of a pipe segment 20 from the pipe bore 32 of the pipe segment 20 and, thus, testing the integrity of the pipe segment 20, a bore plug assembly 80 of a reusable test head 76 generally includes a reusable plug fastener mechanism (e.g., seal or bladder) 84. More specifically, to enable reuse, a reusable plug fastener mechanism 84 in a bore plug assembly 80 generally expands radially outward when transitioned from a deactivated state toward an activated state (e.g., to circumferentially compress an outer surface 85 of the reusable plug fastener mechanism 84 against an inner surface 30 of the tubing 22 of a pipe segment 20) and contracts radially inward when transitioned from the activated state toward the deactivated state (e.g., to disengage the outer surface 85 of the reusable plug fastener mechanism 84 from the inner surface 30 of the pipe segment tubing 22). In other words, a bore plug assembly 80 of a reusable test head 76 may generally be inserted into and/or withdrawn from the pipe bore 32 of a pipe segment 20 while the bore plug assembly 80 is in its deactivated state. On the other hand, while in its activated state, a bore plug assembly 80 of a reusable test head 76 may facilitate sealing the tubing annulus 25 of a pipe segment 20 from the pipe bore 32 of the pipe segment 20, for example, in addition to securing the reusable test head 76 to the pipe segment 20.

Additionally, as depicted, to facilitate sealing a tubing annulus 25 of a pipe segment 20 from external environmental conditions and, thus, testing the integrity of the pipe segment 20, an end cap assembly 78 of a reusable test head 76 generally includes a reusable cap fastener mechanism (e.g., seal or bladder) 82. More specifically, to enable reuse, a reusable cap fastener mechanism 82 in an end cap assembly 78 generally expands radially inward when transitioned rom a deactivated state toward an activated state (e.g., to circumferentially compress an inner surface 83 of the reusable cap fastener mechanism 82 against an outer surface of the tubing 22 of a pipe segment 20) and expands radially outward when transitioned from the activated state toward the deactivated state (e.g., to disengage the inner surface 83 of the reusable cap fastener mechanism 82 from the outer surface of the pipe segment tubing 22). In other words, an end cap assembly 78 of a reusable test head 76 may generally be disposed over and/or removed from an axial (e.g., open) end of a pipe segment while in its deactivated state. On the other hand, while in its activated state, an end cap assembly 78 of a reusable test head 76 may facilitate sealing the tubing annulus 25 of a pipe segment 20 from environmental conditions external to the pipe segment 20, for example, in addition to securing the reusable test head 76 to the pipe segment 20.

Figure 6:
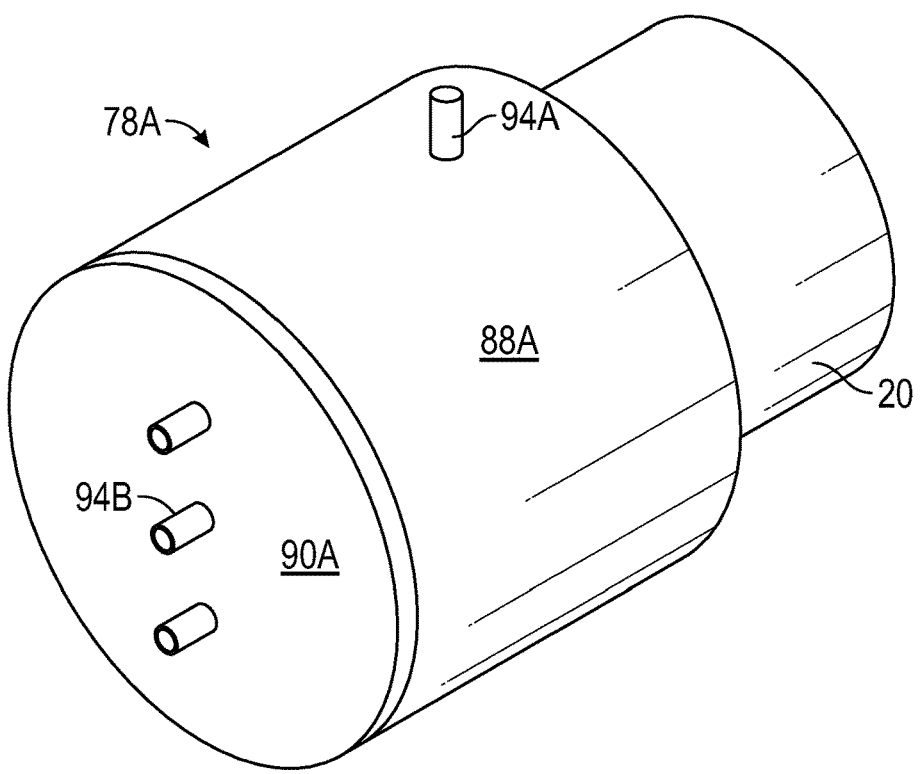
FIG. 6 is a perspective view of a more detailed example of an (e.g., inflatable) end cap assembly that may be included in the reusable test head of FIG. 5, in accordance with an embodiment of the present disclosure.

To help more clearly illustrate, an example of an end cap assembly 78A, which may be included in a reusable test head 76, secured to a pipe segment 20 is shown in FIG. 6. As in the depicted example, an end cap assembly 78 of a reusable test head 76 generally includes a cap end plate 90, which is implemented to cover an open end of a pipe segment 20, and a cap sleeve 88, which is implemented to be disposed circumferentially around the pipe segment 20. In particular, in the depicted example, the cap sleeve 88A and the cap end plate 90A of the end cap assembly 78A are secured (e.g., welded) directly to one another.

However, it should be appreciated that the depicted example is merely intended to be illustrative and not limiting. In particular, as will be described in more detail below, in other embodiments, a cap sleeve 88 of an end cap assembly 78 may be selectively (e.g., detachably) secured to a corresponding cap end plate 90 via a threaded shaft and threaded fasteners, for example, when the end cap assembly 78 includes a mechanical cap fastener mechanism 82. Alternatively, although described as distinct components, in other embodiments, a cap sleeve 88 and a cap end plate 90 of an end cap assembly 78 may be integrated together, for example, as a shell.

In any case, as in the depicted example, to facilitate selectively securing and sealing an axial (e.g., open) end of a pipe segment 20 therein, in some embodiments, a reusable test head 76 may include one or more inflation fluid ports 94 that open through its end cap assembly 78. In particular, in the depicted example, a first inflation fluid port 94A opens through the cap sleeve 88A to an inflatable (e.g., reusable) cap fastener mechanism (e.g., bladder) 82 in the end cap assembly 78A. Additionally, in the depicted example, a second inflation fluid port 94B opens through the cap end plate 90A to an inflatable (e.g., reusable) plug fastener mechanism (e.g., bladder) 84 in a bore plug assembly 80.

Figure 7:
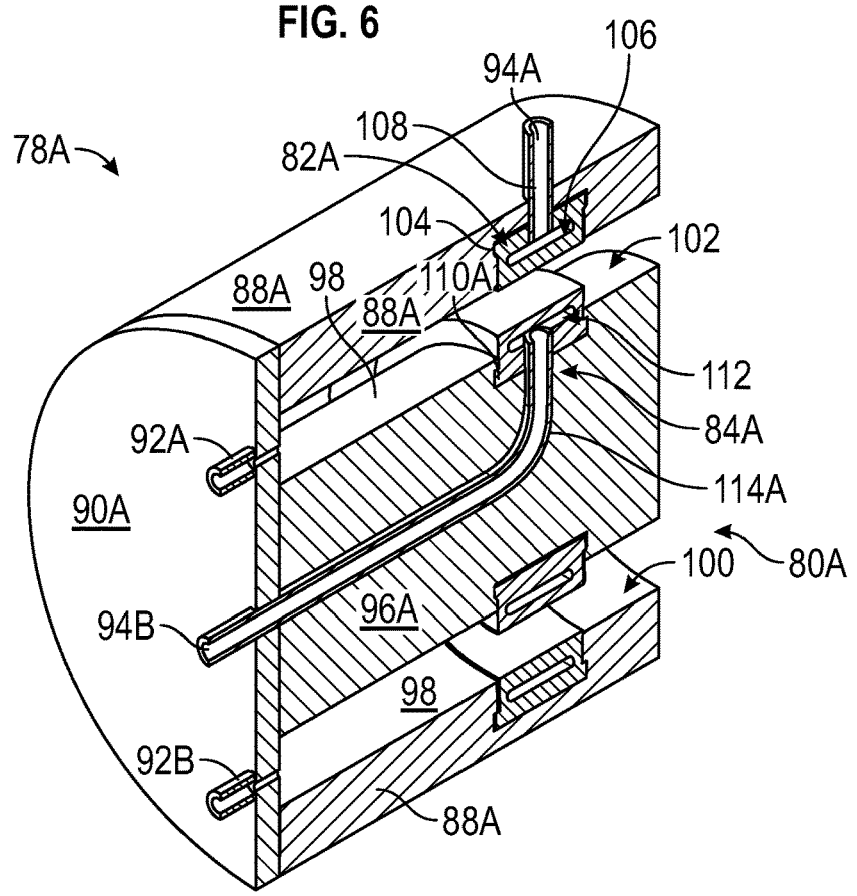
FIG. 7 is a perspective cross-sectional view of the end cap assembly of FIG. 6 and a more detailed example of a (e.g., inflatable) bore plug assembly that may be included in the reusable test head of FIG. 5, in accordance with an embodiment of the present disclosure.

To help more clearly illustrate, a cross-section of an example of an end cap assembly 78A and an example of a bore plug assembly 80A, which may be included in a reusable test head 76, is shown in FIG. 7. As in the depicted example, a bore plug assembly 80 generally includes a plug shaft (e.g., tube and/or cylinder) 96, which is or is to be secured to a cap end plate 90 of a corresponding end cap assembly 78. In particular, in the depicted example, the plug shaft 96A of the bore plug assembly 80A and the cap sleeve 88A of the end cap assembly 78A are concentrically secured to the cap end plate 90A of the end cap assembly 78A such that a tubing (e.g., annulus) cavity 98 is defined between an inner surface 100 of the cap sleeve 88A and an outer surface (e.g., circumference and/or diameter) 102 of the plug shaft 96A, for example to form a shell.

Additionally, as in the depicted example, to facilitate securing the tubing 22 of a pipe segment 20 therein such that the tubing annulus 25 of the pipe segment 20 is sealed from external environmental conditions, in some embodiments, a reusable cap fastener mechanism 82 in an end cap assembly 78 of a reusable test head 76 may be an inflatable (e.g., pneumatic) cap fastener mechanism 82. As in the depicted example, an inflatable cap fastener mechanism 82 in an end cap assembly 78 generally includes a cap (e.g., first and/or outer) fluid bladder 104, which is formed from elastic material, such as rubber, to define a cap fluid cavity 106. In particular, in the depicted example, the cap fluid bladder 104 is secured such that it runs circumferentially along the inner surface 100 of the cap sleeve 88A.

Furthermore, as in the depicted example, to facilitate securing the tubing 22 of a pipe segment 20 therein such that the tubing annulus 25 of the pipe segment 20 is sealed from the pipe bore 32 of the pipe segment 20, in some embodiments, a reusable plug fastener mechanism 84 in a bore plug assembly 80 of a reusable test head 76 may be an inflatable (e.g., pneumatic) plug fastener mechanism 84. As in the depicted example, an inflatable plug fastener mechanism 84 in a bore plug assembly 80 generally includes a plug (e.g., second and/or inner) fluid bladder 110, which is formed from elastic material, such as rubber, to define a plug fluid cavity 112. In particular, in the depicted example, the plug fluid bladder 110A is secured such that it runs circumferentially along the outer surface 102 of the plug shaft 96A and, thus, has a ring shape.

However, it should be appreciated that the depicted example is merely intended to be illustrative and not limiting. In particular, as will be described in more detail below, in other embodiments, a reusable test head 76 may additionally or alternatively include other types of reusable fastener mechanisms, such as a mechanical fastener mechanism or an electromagnetic fastener mechanism.

In any case, a (e.g., cap or plug) fluid bladder in a reusable test head 76 generally expands radially when inflation fluid is supplied to its fluid cavity and contracts radially when inflation fluid is extracted (e.g., released) form its fluid cavity. In particular, a cap fluid bladder 104 in an end cap assembly 78 generally expands radially inward and, thus, the end cap assembly 78 transitions from its deactivated state toward its activated state when inflation fluid is supplied to its cap fluid cavity 106. On the other hand, the cap fluid bladder 104 generally contracts radially outward and, thus, the end cap assembly 78 transitions from its activated state toward its deactivated state when inflation fluid is extracted (e.g., released) from its cap fluid cavity 106. Accordingly, to facilitate controlling expansion and contraction of the cap fluid bladder 104 and, thus, its activation state, the end cap assembly 78A includes a first inflation fluid port 94A, which opens through its cap sleeve 88A, and an internal cap inflation fluid conduit 108, which fluidly connects the first inflation fluid port 94A to the cap fluid cavity 106 in the cap fluid bladder 104.

Additionally, a plug fluid bladder 110 in a bore plug assembly 80 of a reusable test head 76 generally expands radially outward and, thus, the bore plug assembly 80 transitions from its deactivated state toward its activated state when inflation fluid is suppled to is plug fluid cavity 112. On the other hand, the plug fluid bladder 110 generally contracts radially inward when inflation fluid is extracted (e.g., released) from its plug fluid cavity 112. Accordingly, to facilitate controlling expansion and contraction of the cap fluid bladder 104 and, thus, its activation state, the bore plug assembly 80A includes an internal plug inflation fluid conduit 114A, which fluidly connects the plug fluid cavity 112 in the plug fluid bladder 110A to a second inflation fluid port 94B that opens through the end cap assembly 78A.

Accordingly, as in the example depicted in FIG. 4, to facilitate controlling the activation state of a bore plug assembly 80 and/or the activation state of an end cap assembly 78, in some embodiments, a pipe integrity testing system 38 may include one or more inflation fluid sources 113, such as a fluid pump and/or a compressed air tank, which are fluidly connected to a corresponding test head 44 via one or more external inflation fluid conduits 115, such as a hose. In particular, in some embodiments, inflation fluid used in a pipe integrity testing system 38 and/or a pipe integrity testing process may be an inert fluid. In fact, in some such embodiments, a pipe integrity testing system 38 and/or a pipe integrity testing process may use the same type of fluid for annulus test fluid as well as inflation fluid, for example, such that the same fluid source can be selectively used as an annulus test fluid source 42 during a first period time and as a bore test fluid source 45 during a second (e.g., subsequent and/or non-overlapping) time period.

However, in other such embodiments, a pipe integrity testing system 38 and/or a pipe integrity testing process may utilize different types of fluid for annulus test fluid and inflation fluid, which, at least in some instances, may facilitate improving pipe integrity testing. In particular, as described above, in some embodiments, a pipe integrity testing system 38 may include a fluid composition sensor 43 that determines annulus fluid composition within a pipe segment 20. Accordingly, in such embodiments, utilizing different types of fluid for annulus test fluid and inflation fluid may enable a pipe integrity testing system 38 to determine whether the inflation fluid supplied to a reusable test head 76 secured to a pipe segment 20 is inadvertently leaking into the tubing annulus 25 of the pipe segment 20 and, thus, whether the reusable test head 76 is faulty. In other words, in such embodiments, utilizing different types of fluid for annulus test fluid and inflation fluid may enable a pipe integrity testing system 38 to determine whether an annulus fluid composition resulting in a pipe segment 20 that differs from the fluid composition of annulus test fluid supplied to the pipe segment 20 by more than a composition threshold, which accounts for the expected (e.g., predicted) change, is due to the tubing 22 of the pipe segment 20 being faulty or due to a reusable test head 76 secured to the pipe segment 20 being faulty.

In any case, to facilitate reducing implementation-associated cost, such as component count, in some embodiments, a pipe integrity testing system 38 may include a single inflation fluid source 113 to control inflation and/or deflation of multiple different inflatable fastener mechanisms in a reusable test head 76. For example, to facilitate concurrently controlling inflation and/or deflation of an inflatable cap fastener mechanism 82 and an inflatable plug fastener mechanism 84 in a reusable test head 76, in some such embodiments, an inflation fluid source 113 may be fluidly connected to a first inflation fluid port 94A on the reusable test head 76, which is fluidly connected to the inflatable cap fastener mechanism 82, via a first external inflation fluid conduit 115 and fluidly connected to a second inflation fluid port 94B on the reusable test head 76, which is fluidly connected to the inflatable plug fastener mechanism 84, via a second external inflation fluid conduit 115. However, to facilitate independently controlling inflation and/or deflation of an inflatable cap fastener mechanism 82 and an inflatable plug fastener mechanism 84 in a reusable test head 76, in other such embodiments, an inflation fluid source 113 may be fluidly connected to a first inflation fluid port 94A on the reusable test head 76, which is fluidly connected to the inflatable cap fastener mechanism 82, during a first time period and connected to a second inflation fluid port 94B on the reusable test head 76, which is fluidly connected to the inflatable plug fastener mechanism 84, during a second (e.g., subsequent and/or non-overlapping) time period, for example, to enable the inflatable cap fastener mechanism 82 and the inflatable plug fastener mechanism 84 to be inflated to different fluid pressures to facilitate accounting for size difference.

Moreover, to facilitate independently and concurrently controlling inflation and/or deflation of multiple inflatable fastener mechanisms in a reusable test head 76, in other embodiments, a pipe integrity testing system 38 may include multiple inflation fluid sources 113. In other words, to facilitate independently and concurrently controlling inflation and/or deflation of an inflatable cap fastener mechanism 82 and an inflatable plug fastener mechanism 84 in a reusable test head 76, in such embodiments, a pipe integrity testing system 38 may include a first inflation fluid source 113 that is fluidly connected to a first inflation fluid port 94A on the reusable test head 76, which is fluidly connected to the inflatable cap fastener mechanism 82, via a first external inflation fluid conduit 115 and a second inflation fluid source 113 that is fluidly connected to a second inflation fluid port 94B on the reusable test head 76, which is fluidly connected to the inflatable plug fastener mechanism 84, via a second external inflation fluid conduit 115, for example, to enable the inflatable cap fastener mechanism 82 and the inflatable plug fastener mechanism 84 to be concurrently inflated to different fluid pressures to facilitate accounting for size difference while reducing deployment (e.g., securement) duration.

Nevertheless, it should again be appreciated that the depicted example is merely intended to be illustrative and not limiting. In particular, in other embodiments, a pipe integrity testing system 38 may not include an inflation fluid source 113, for example, when a reusable test head 76 does not include an inflatable cap fastener mechanism 82 or an inflatable plug fastener mechanism 84.

In any case, as in the example depicted in FIG. 7, since a reusable test head 76 can be secured to a pipe segment 20 such that the tubing annulus 25 of the pipe segment 20 is sealed therein, in some embodiments, to facilitate testing the integrity of the pipe segment 20, the end cap assembly 78 of the reusable test head 76 may include one or more annulus fluid ports 92, which open therethrough. In particular, in the depicted example, a first annulus fluid port 92A and a second annulus fluid port 92B open through the cap end plate 90A of the end cap assembly 78A to the tubing cavity 98. In some embodiments, the first annulus fluid port 92A may be fluidly connected to an annulus test fluid source 42 and, thus, dedicated for test (e.g., annulus) fluid injection while the second annulus fluid port 92B may be fluidly connected to a fluid parameter sensor 43 and, thus, dedicated for (e.g., upstream and/or downstream) annulus fluid parameter determination.

However, it should again be appreciated that the depicted example is merely intended to be illustrative and not limiting. In particular, in other embodiments, a reusable test head 76 may include a single annulus fluid port 92, for example, which is to be fluidly coupled to an annulus test fluid source 42 and, thus dedicated for test fluid injection during a first time period while being fluidly coupled to a fluid parameter sensor 43 and, thus, dedicated for annulus fluid parameter determination during a second (e.g., subsequent and/or non-overlapping) time period. Alternatively, in other embodiments, a reusable test head 76 may not include an annulus fluid port 92, for example, when a test head 44 that is to be secured to an opposite end of a pipe segment 20 includes an annulus fluid port 92 and/or an annulus fluid port 92 is secured in an opening formed through the outer barrier layer 28 of the pipe segment 20 to the tubing annulus 25 of the pipe segment 20. Furthermore, in other embodiments, a bore plug assembly 80 of a reusable test head 76 may be formed with a different configuration.

Figure 8:
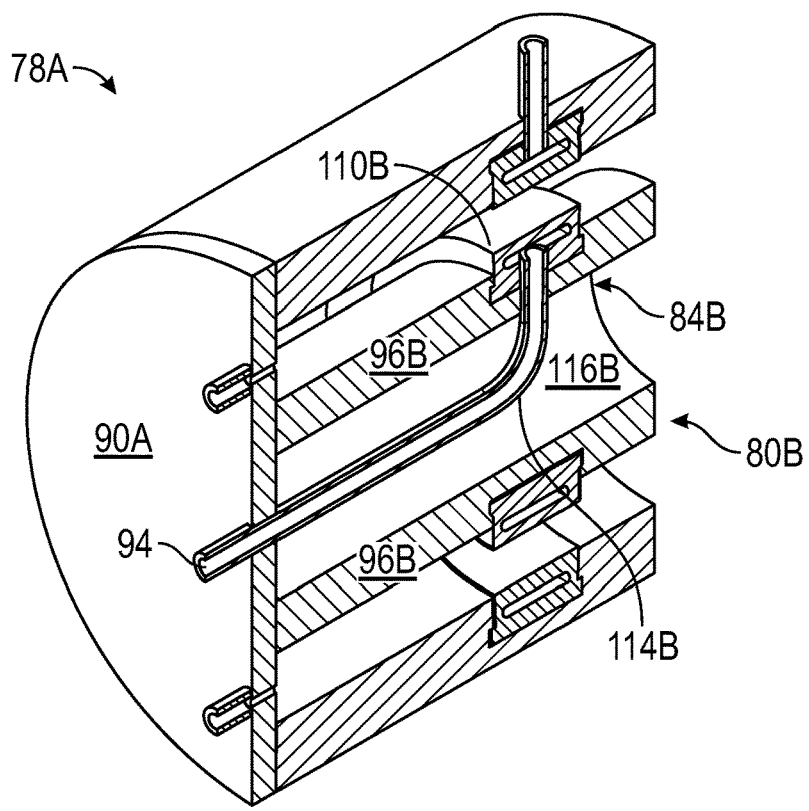
FIG. 8 is a perspective cross-sectional view of the end cap assembly of FIG. 6 and another more detailed example of a (e.g., inflatable) bore plug assembly that may be included in the reusable test head of FIG. 5, in accordance with an embodiment of the present disclosure.

To help illustrate, a cross-section of an example of an end cap assembly 78A and another example of a bore plug assembly 80B, which may be included in a reusable test head 76, is shown in FIG. 8. Similar to the bore plug assembly 80A of FIG. 7, the bore plug assembly 80B of FIG. 8 includes a plug shaft 96B, which is secured to the cap end plate 90A of the end cap assembly 78A, an inflatable plug fastener mechanism 84B, which includes a plug fluid bladder 110B secured circumferentially around the plug shaft 96B, and an internal plug inflation fluid conduit 114B, which fluidly connects the plug fluid bladder 110B to an inflation fluid port 94 that opens through the end cap assembly 78A. However, as depicted in FIG. 8, the plug shaft 96B is a hollow tube instead of a solid cylinder and, thus, includes a tube bore 116B, for example, to facilitate reducing weight of a corresponding reusable test head 76.

Nevertheless, it should be appreciated that the depicted example is merely intended to be illustrative and not limiting. In particular, in other embodiments, when a plug shaft 96 of a bore plug assembly 80 is a hollow tube, the tube bore 116 of the plug shaft 96 may act as an internal plug inflation fluid conduit 114. In other words, in such embodiments, a plug shaft 96 and an internal plug inflation fluid conduit 114 of a bore plug assembly 80 in a reusable test head 76 may be integrated together as a single component.

Figure 9:
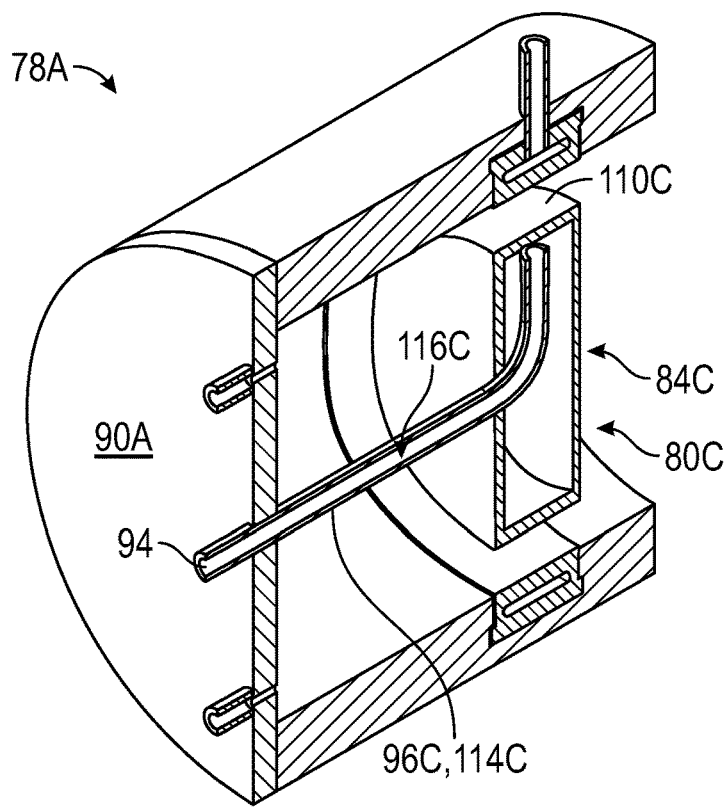
FIG. 9 is a perspective cross-sectional view of the end cap assembly of FIG. 6 and a further more detailed example of a (e.g., inflatable) bore plug assembly that may be included in the reusable test head of FIG. 5, in accordance with an embodiment of the present disclosure.

To help illustrate, a cross-section of an example of an end cap assembly 78A and a further example of a bore plug assembly 80C, which may be included in a reusable test head 76, is shown in FIG. 9. Similar to the bore plug assemblies 80 of FIGS. 7 and 8, the bore plug assembly 80C of FIG. 9 includes a plug shaft 96C, which is secured to the cap end plate 90A of the end cap assembly 78A, an inflatable plug fastener mechanism 84C, which includes a plug fluid bladder 110C, and an internal plug inflation fluid conduit 114C, which fluidly connects the plug fluid bladder 110 to an inflation fluid port 94 that opens through the end cap assembly 78A.

However, as depicted in FIG. 9, the plug shaft 96C and the internal plug inflation fluid conduit 114C are integrated together as a single component. In particular, a tube bore 116C of the integrated plug shaft 96C and internal plug inflation fluid conduit 114C may be used to facilitate supplying inflation fluid to and/or extracting inflation fluid from the plug fluid bladder 110C. Additionally, since the integrated plug shaft 96C and internal plug inflation fluid conduit 114C does not extend therethrough, the plug fluid bladder 110C has a solid cylindrical shape, for example, instead of a ring shape. Furthermore, as in the depicted example, in some embodiments, an integrated plug shaft 96 and internal plug inflation fluid conduit 114 of a bore plug assembly 80 may be rigid to facilitate suspending a plug fluid bladder 110 of the bore plug assembly 80 within a corresponding end cap assembly 78.

Nevertheless, it should be appreciated that the depicted example is merely intended to be illustrative and not limiting. In particular, in other embodiments, a reusable fastener mechanism in a reusable test head 76 may not be an inflatable fastener mechanism. For example, a reusable fastener mechanism in a reusable test head may instead be a mechanical fastener mechanism.

Figure 10A:
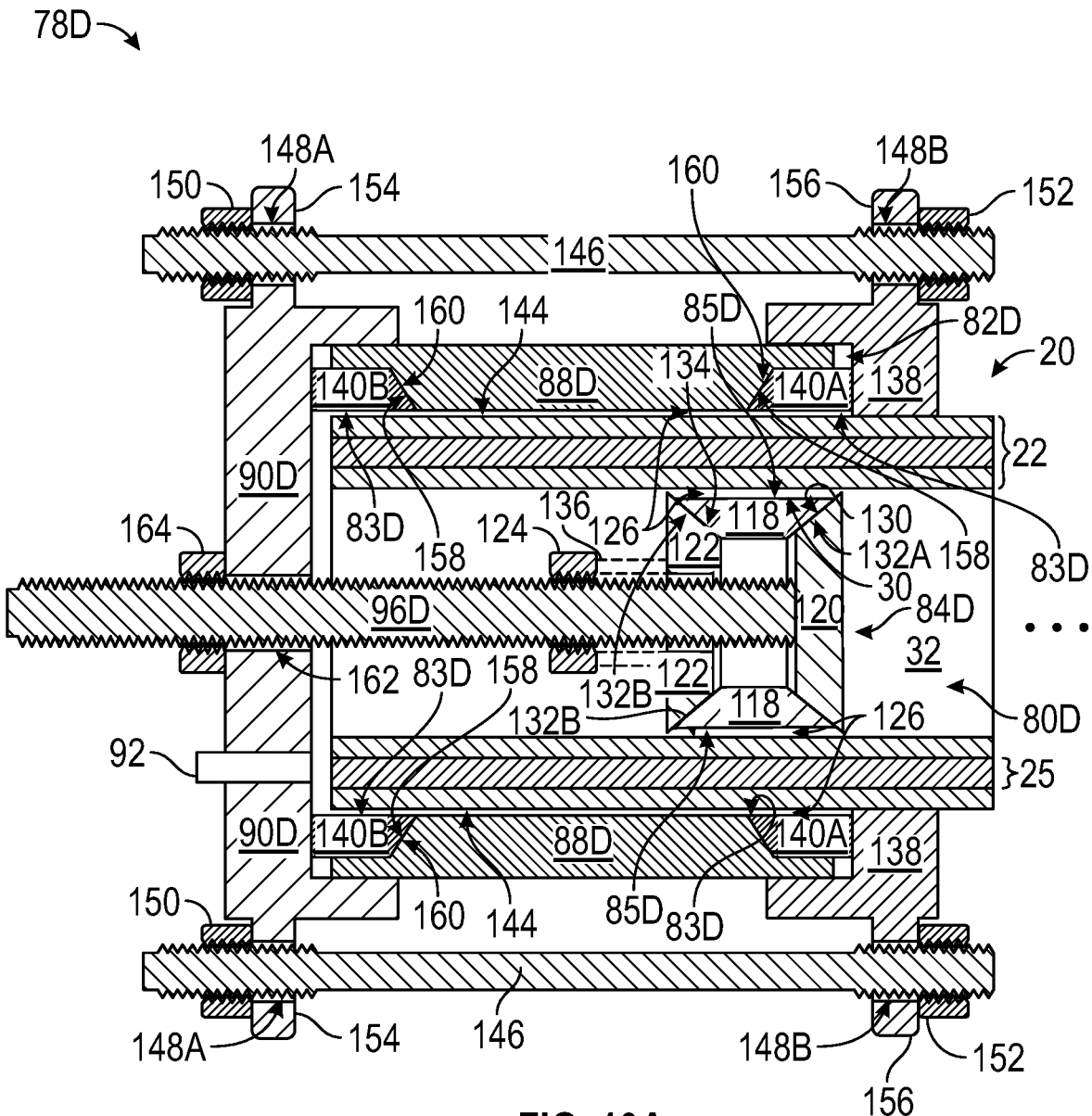
FIG. 10A is a side cross-sectional view of another more detailed example of an (e.g., mechanical) end cap assembly and another more detailed example of a (e.g., mechanical) bore plug assembly, which may be included in the reusable test head of FIG. 5, while in their deactivated states, in accordance with an embodiment of the present disclosure.
Figure 10B:
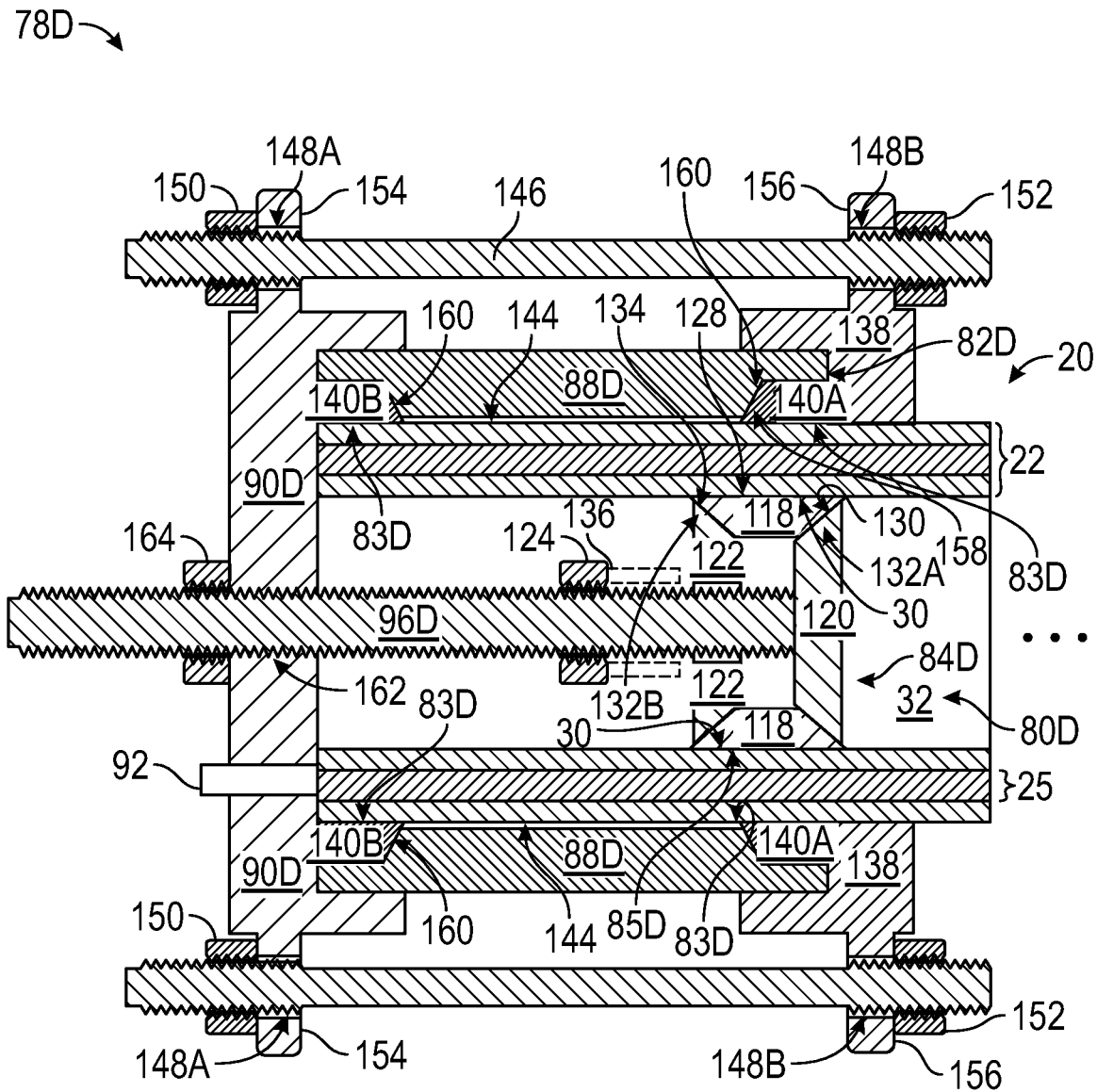
FIG. 10B is a side cross-sectional view of the end cap assembly and the bore plug assembly of FIG. 10A while in their activated states, in accordance with an embodiment of the present disclosure.

To help illustrate, a cross-section of another example of an end cap assembly 78D and another example of a bore plug assembly 80D, which may be included in a reusable test head 76, are shown in FIGS. 10A and 10B. Similar to the bore plug assemblies 80 of FIGS. 7-9, the bore plug assembly 80D of FIGS. 10A and 10B generally includes a plug shaft 96D and a reusable plug fastener mechanism 84D, which is to be inserted into a pipe bore 32 of a pipe segment 20.

However, the reusable plug fastener mechanism 84D in the bore plug assembly 80D of FIGS. 10A and 10B is a mechanical plug fastener mechanism 84, for example, instead of an inflatable (e.g., pneumatic) plug fastener mechanism 84. In particular, as in the depicted example, a mechanical plug fastener mechanism 84 in a bore plug assembly 80 of a reusable test head 76 generally includes a plug seal 118, which is disposed circumferentially around the plug shaft 96 of the bore plug assembly 80.

Nevertheless, similar to the end cap assembly 78A of FIGS. 6-9, the end cap assembly 78D of FIGS. 10A and 10B generally includes a cap end plate 90D, which is implemented to cover an open end of a pipe segment 20, and a cap sleeve 88, which is implemented to be disposed circumferentially around the pipe segment 20. Additionally, similar to the end cap assembly 78A of FIGS. 7-9, the end cap assembly 78D of FIGS. 10A and 10B includes a reusable cap fastener mechanism 82D.

However, the reusable cap fastener mechanism 82D in the end cap assembly 78D of FIGS. 10A and 10B is a mechanical cap fastener mechanism 82, for example, instead of an inflatable (e.g., pneumatic) cap fastener mechanism 82. In particular, as in the depicted example, a mechanical cap fastener mechanism 82 in an end cap assembly 78 of a reusable test head 76 generally includes one or more cap seals 140, which are implemented to be disposed circumferentially around a pipe segment 20. Nevertheless, similar to FIGS. 6-9, to facilitate testing the integrity of a pipe segment 20, as depicted in FIGS. 10A and 10B, an annulus fluid port 92, which is axially aligned with the tubing annulus 25 of the pipe segment 20, opens through the cap end plate 90D of the end cap assembly 78.

However, it should be appreciated that the depicted example is merely intended to be illustrative and not limiting. In particular, as mentioned above, in other embodiments, a reusable test head 76 in a pipe integrity testing system 38 may not include an annulus fluid port 92, for example, when a test head 44 that is to be secured to an opposite end of a pipe segment 20 includes an annulus fluid port 92 and/or when the pipe integrity testing system 38 includes an annulus fluid port 92 that is secured in an opening formed through the outer barrier layer 28 of the pipe segment 20 to the tubing annulus 25 of the pipe segment 20. Furthermore, in other embodiments, a reusable test head 76 may additionally or alternatively include other types of reusable fastener mechanisms, such as an electromagnetic fastener mechanism. For example, a bore plug assembly 80 in a reusable test head 76 may include an electromagnetic plug fastener mechanism 84, an end cap assembly 78 of the reusable test head 76 may include an electromagnetic cap fastener mechanism 82, or both.

In any case, in FIG. 10A, open space 126 is present between the outer surface 85D of the plug seal 118 and the inner surface 30 of the tubing 22 of the pipe segment 20 and, thus, the bore plug assembly 80D is in a deactivated (e.g., unsecured) state. On the other hand, in FIG. 10B, the outer surface 85D of the plug seal 118 directly abuts (e.g., engages) the inner surface 30 of the tubing 22 of the pipe segment 20 and, thus, the bore plug assembly 80D is in an activated (e.g., secured) state. In particular, the circumferential engagement between the outer surface 85 of a plug seal 118 and the inner surface 30 of the tubing 22 of a pipe segment 20 may facilitate sealing the tubing annulus 25 of the pipe segment 20 from the pipe bore 32 of the pipe segment 20, for example, in addition to facilitating securement of the bore plug assembly 80 to the pipe segment 20.

To facilitate controlling expansion and contraction of the plug seal 118 and, thus, the activation state of the bore plug assembly 80D, in the depicted example, the plug shaft 96D is threaded and the bore plug assembly 80D additionally includes a plug end plate 120, which is secured to an end of the threaded plug shaft 96D, a plug activation plate 122, which is disposed circumferentially around the threaded plug shaft 96D such that the plug seal 118 is disposed between the plug activation plate 122 and the plug end plate 120 and the plug activation plate 122 can slide along the threaded plug shaft 96, and a plug activation nut 124, which is to be selectively tightened on the threaded plug shaft 96 behind the plug activation plate 122. Accordingly, in such embodiments, tightening the plug activation nut 124 on the threaded plug shaft 96 behind the plug activation plate 122 may force the plug activation plate 122 toward the plug end plate 120, thereby compressing the plug seal 118 therebetween such that the plug seal 118 expands radially outward due to more of the plug activation plate 122 and/or more of the plug end plate 120 being disposed under the plug seal 118. On the other hand, loosening the plug activation nut 124 from behind the plug activation plate 122 may enable the plug seal 118 to push the plug activation plate 122 axially away from the plug end plate 120 as the plug seal 118 contracts radially inward (e.g., due to material spring back).

To facilitate controlling the amount of a plug end plate 120 that is disposed under a plug seal 118 and, thus, the activation state of a corresponding bore plug assembly 80, as in the depicted example, in some embodiments, a side surface 130 of the plug end plate 120 may include a male taper while a first side surface 132A of the plug seal 118 includes a female taper, which can slide along the male taper on the side surface 130 of the plug end plate 120. Additionally, to facilitate controlling the amount of a plug activation plate 122 that is disposed under a plug seal 118 and, thus, the activation state of a corresponding bore plug assembly 80, as in the depicted example, in some embodiments, a side surface 134 of the plug activation plate 122 may include a male taper while a second (e.g., opposite) side surface 132B of the plug seal 118 includes a female taper, which can slide along the male taper on the side surface 134 of the plug activation plate 122. Furthermore, as in the depicted example, in some embodiments, a bore plug assembly 80 of a reusable test head 76 may additionally include a plug extension sleeve 136, which is disposed circumferentially around its threaded plug shaft 96 between its plug activation nut 124 and its plug activation plate 122, for example, to enable the plug activation nut 124 to be accessed closer to an open end of a corresponding pipe segment 20.

However, it should be appreciated that the depicted example is merely intended to be illustrative and not limiting. In particular, in other embodiments, a bore plug assembly 80 of a reusable test head 76 may not include a plug extension sleeve 136 and, thus, its plug activation nut 124 may directly abut its plug activation plate 122. Additionally, in other embodiments, a side surface 130 of a plug end plate 120 in a bore plug assembly 80 may include a male taper while a side surface 134 of a plug activation plate 122 in the bore plug assembly 80 does not and a first side surface 132A of a plug seal 118 in the bore plug assembly 80 may include a female taper while a second (e.g., opposite) side surface 132B of the plug seal 118 does not. Alternatively, in other embodiments, a side surface 134 of a plug activation plate 122 in a bore plug assembly 80 may include a male taper while a side surface 130 of a plug end plate 120 in the bore plug assembly 80 does not and a second side surface 132B of the bore plug assembly 80 may include a female taper while a first (e.g., opposite) side surface 132A of the plug seal 118 does not.

In any case, in FIG. 10A, open space 126 is present between the inner surface 83D of each cap seal 140 and the outer surface 144 of the tubing 22 of the pipe segment 20 and, thus, the end cap assembly 78D is in a deactivated (e.g., unsecured) state. On the other hand, in FIG. 10B, the inner surface 83D of each cap seal 140 directly abuts (e.g., engages) the outer surface 144 of the tubing 22 of the pipe segment 20 and, thus, the end cap assembly 78D is in an activated (e.g., secured) state. In particular, the circumferential engagement between the inner surface 83D of a cap seal 140 in an end cap assembly 78 and the outer surface 144 of the tubing 22 of a pipe segment 20 may facilitate sealing the tubing annulus 25 of the pipe segment 20 from environmental conditions external to the pipe segment 20, for example, in addition to facilitating securement of the end cap assembly 78 to the pipe segment 20.

To facilitate controlling expansion and contraction of a (e.g., first and/or outer) cap seal 140A and, thus, its activation state, in the depicted example, the end cap assembly 78D of a reusable test head 76 additionally includes a cap end ring 138, which is implemented to be disposed circumferentially around a pipe segment 20 such that the cap seal 140A is disposed between the cap sleeve 88D and the cap end ring 138. As in the depicted example, to facilitate improving sealing, in some embodiments, an end cap assembly 78 of a reusable test head 76 may include another (e.g., second and/or inner) cap seal 140B, which is implemented to be disposed axially between its cap end plate 90 and its cap sleeve 88.

However, it should again be appreciated that the depicted example is merely intended to be illustrative and not limiting. In particular, in other embodiments, an end cap assembly 78 of a reusable test head 76 may include a cap seal 140A disposed between its cap sleeve 88 and its cap end ring 138, but not a cap seal 140B disposed between its cap end plate 90 and its cap sleeve 88. Alternatively, in other embodiments, a cap seal 140B, which is disposed between a cap end plate 90 and a cap sleeve 88 of an end cap assembly 78, may be completely enclosed by the cap end plate 90 and the cap sleeve 88 and, thus, its inner surface 83D may not be exposed to pipe segment tubing 22 while the end cap assembly 78 is in its activated state.

In any case, as in the example depicted in FIGS. 10A and 10B, to facilitate securing it together as well as controlling its activation state, in some embodiments, an end cap assembly 78 of a reusable test head 76 may additionally include one or more threaded cap shafts 146, which are each implemented to be inserted through a shaft opening (e.g., pad eye) 148A in its cap end plate 90 and a corresponding (e.g., aligned) shaft opening (e.g., pad eye) 148B in its cap end ring 138, one or more end plate nuts 150, which are each to be secured to a threaded shaft behind a corresponding shaft opening 148A in the cap end plate 90, and one or more end ring nuts 152, which are each to be secured to a threaded shaft in front of a corresponding shaft opening 148B in the cap end ring 138. In particular, as in the depicted example, in some embodiments, a shaft opening 148A in a cap end plate 90 may be formed through an end plate flange 154 on the cap end plate 90 while a shaft opening 148B in a cap end ring 138 may be formed through an end ring flange 156 on the cap end ring 138.

Accordingly, in such embodiments, tightening an end plate nut 150 on a threaded shaft behind the cap end plate 90 and/or tightening an end ring nut 152 on the threaded shaft in front of the cap end ring 138 may force the cap end ring 138 and a cap sleeve 88, which is disposed between the cap end plate 90 and the cap end ring, toward one another, which axially compresses a corresponding cap seal 140 therebetween such that the cap seal 140 expands radially inward. On the other hand, loosening the end plate nut 150 from behind the cap end plate 90 and/or loosening the end ring nut 152 from in front of the cap end ring 138 may enable the cap seal 140 to push the cap sleeve 88 and the cap end ring 138 axially away from one another as the cap seal 140 contracts radially outward (e.g., due to material spring back). Additionally, as in the depicted example, to facilitate controlling the amount of a cap sleeve 88 that is disposed around a cap seal 140 and, thus, the activation state of a corresponding end cap assembly 78, in some embodiments, a side surface 158 of the cap sleeve 88 may include a female taper while a side surface 160 of the cap seal 140 includes a male taper, which can slide along the female taper on the side surface 158 of the cap sleeve 88.

However, it should be appreciated that the depicted example is merely intended to be illustrative and not limiting. In particular, in other embodiments, an end cap assembly 78 of a reusable test head 76 may include more than two (e.g., three, four, or more) threaded cap shafts 146 and, thus, more than two (e.g., three, four, or more) end plate nuts 150 and more than two (e.g., three, four, or more) end ring nuts 152 or, alternatively, include fewer than two (e.g., one) threaded cap shafts 146 and, thus, fewer than two (e.g., one) end plate nuts 150 and fewer than two (e.g., one) end ring nut 152. In fact, as will be described in more detail below, in some embodiments, an end cap assembly 78 of a reusable test head 76 may not include a threaded cap shaft 146, for example, when a supplemental support assembly of the reusable test head 76 includes a threaded support shaft.

In any case, as described above, since a tubing annulus 25 of a pipe segment 20 is to be pressurized to facilitate testing the integrity of the pipe segment 20, to facilitate reducing the likelihood of a bore plug assembly 80 being inadvertently pushed too far into the pipe bore 32 of the pipe segment 20, the bore plug assembly 80 may generally be secured to a corresponding end cap assembly 78. In particular, as in the depicted example, in some embodiments, a cap end plate 90 of an end cap assembly 78 in a reusable test head 76 may include another shaft opening 148A—namely a plug shaft opening 162, which enables a threaded plug shaft 96 of a corresponding bore plug assembly 80 to be inserted therethrough, and the reusable test head 76 may additionally include a plug securement nut 164, which is to be selectively tightened on the threaded plug shaft 96 behind the cap end plate 90. Accordingly, in such embodiments, tightening the plug securement nut 164 on the threaded plug shaft 96 behind the cap end plate 90 may facilitate anchoring (e.g., securing) the bore plug assembly 80 to the end cap assembly 78. On the other hand, loosening the plug securement nut 164 from behind the cap end plate 90 may facilitate disconnecting (e.g., removing) the end cap assembly 78 from the bore plug assembly 80, for example, to enable access to a plug activation nut 124 in the bore plug assembly 80.

However, it should again be appreciated that the depicted example is merely intended to be illustrative and not limiting. In particular, in other embodiments, an end cap assembly 78 and a bore plug assembly 80 of a reusable test head 76 may include different types of reusable fastener mechanisms. For example, the end cap assembly 78 may include a mechanical cap fastener mechanism 82 while the bore plug assembly 80 includes an inflatable (e.g., pneumatic) plug fastener mechanism 84.

Figure 11:
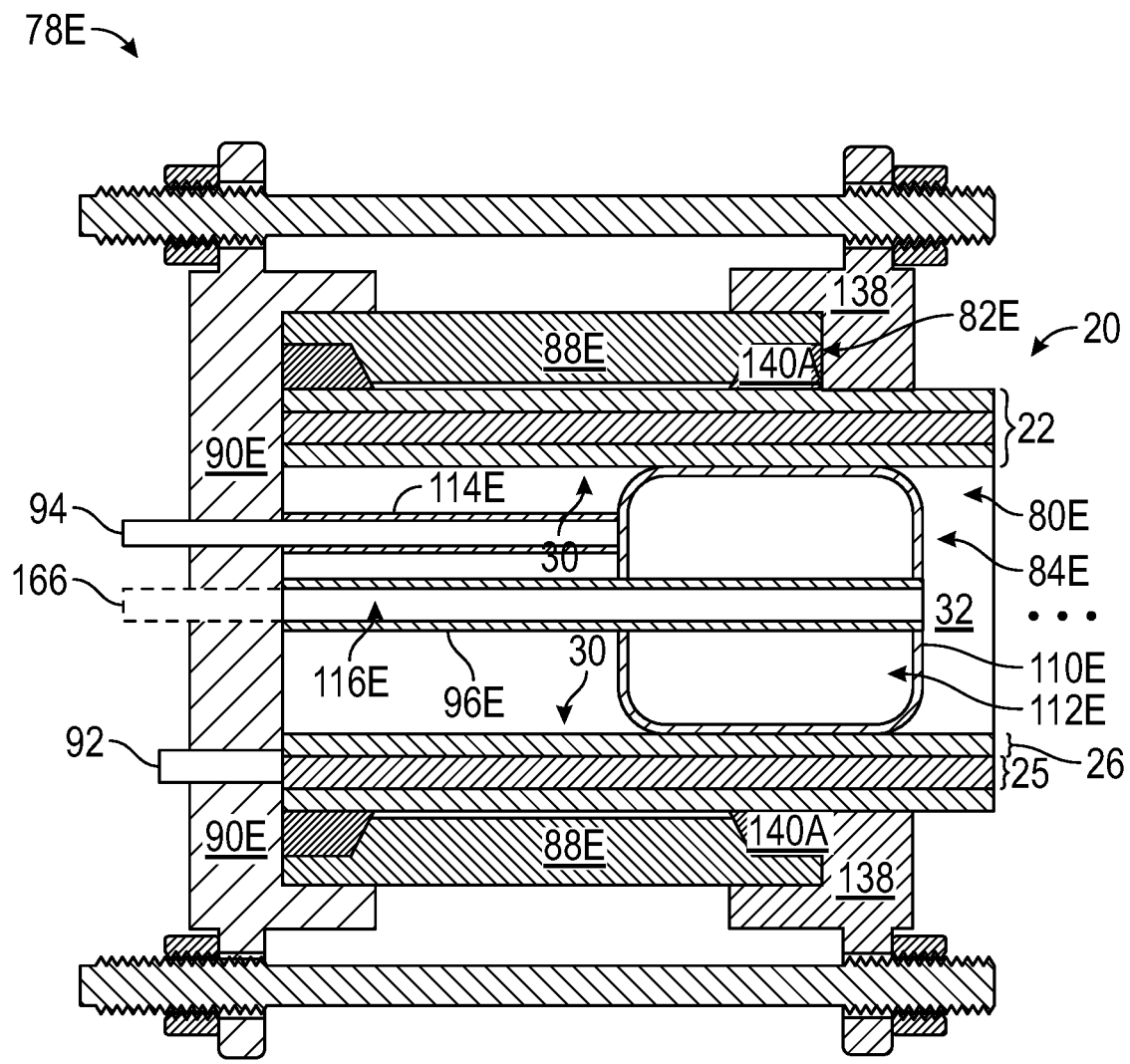
FIG. 11 is a side cross-sectional view of a further more detailed example of an (e.g., mechanical) end cap assembly and a further more detailed example of a (e.g., inflatable) bore plug assembly that may be included in the reusable test head of FIG. 5, in accordance with an embodiment of the present disclosure.

To help illustrate, a cross-section of a further example of an end cap assembly 78E and a further example of a bore plug assembly 80E, which may be included in a reusable test head 76, is shown in FIG. 11. In particular, similar to the end cap assembly 78D of FIGS. 10A and 10B, the end cap assembly 78E of FIG. 11 generally includes a cap end plate 90E, which covers an open end of a pipe segment 20, a cap end ring 138, which is disposed circumferentially around the pipe segment 20, a cap sleeve 88E, which is disposed circumferentially around the pipe segment 20 between the cap end plate 90E and the cap end ring 138, and a mechanical cap fastener mechanism 82E including a cap seal 140A, which is to be disposed circumferentially around the pipe segment 20 between the cap sleeve 88E and the cap end ring 138. In fact, in some embodiments, the end cap assembly 78E of FIG. 11 may generally match the end cap assembly 78D of FIGS. 10A and 10B.

However, as depicted, the bore plug assembly 80E of FIG. 11 utilizes an inflatable plug fastener mechanism 84E that includes a plug fluid bladder 110E, for example, instead of a mechanical plug fastener mechanism 84 that includes a plug seal 118. In particular, similar to the plug fluid bladders 110 of FIGS. 7 and 8, the plug fluid bladder 110E of FIG. 11 is disposed circumferentially around the plug shaft 96E of the bore plug assembly 80E. Additionally, similar to the plug shafts 96 of FIGS. 7 and 8, the plug shaft 96E of FIG. 11 is secured (e.g., welded) to the cap end plate 90E in the end cap assembly 78E.

Nevertheless, it should be appreciated that the depicted example is merely intended to be illustrative and not limiting. In particular, to enable an end cap assembly 78 and a bore plug assembly 80 to be selectively disconnected, in other embodiments, the cap end plate 90 of the end cap assembly 78 may include a plug shaft opening 162 that includes threading, which is implemented to threadingly interlock with threading on a threaded plug shaft 96 in the bore plug assembly 80. Accordingly, in such embodiments, the bore plug assembly 80 may be secured to the end cap assembly 78 at least in part by screwing the threaded plug shaft 96 into the plug shaft opening 162 in the cap end plate 90. On the other hand, the bore plug assembly 80 may be disconnected from the end cap assembly 78 at least in part by unscrewing the threaded plug shaft 96 from the plug shaft opening 162 in the cap end plate 90.

In any case, similar to the bore plug assemblies 80 of FIGS. 7 and 8, to facilitate controlling expansion and contraction of the plug fluid bladder 110E and, thus, its activation state, the bore plug assembly 80E of FIG. 11 includes an internal plug inflation fluid conduit 114E, which fluidly connects the plug fluid bladder 110E to a corresponding inflation fluid port 94 that opens through the end cap assembly 78E. Furthermore, similar to the plug shaft 96B of FIG. 8, the plug shaft 96E of FIG. 11 extends through the plug fluid bladder 110E such that the tube bore 116E of the plug shaft 96E opens through the plug fluid bladder 110E, for example, to the pipe bore 32 of a pipe segment 20.

Leveraging this fact, as in the depicted example, to facilitate improving pipe integrity testing, in some embodiments, a reusable test head 76 may include a bore fluid port 166, which opens through its end cap assembly 78 to the tube bore 116 of a corresponding plug shaft 96. In particular, as described above, since the tubing annulus 25 of a pipe segment 20 is pressurized during integrity testing, in some embodiments, a bore test fluid source 45 may supply bore test fluid to the pipe bore 32 of the pipe segment 20 to facilitate pressurizing the pipe bore 32 and, thus, blocking the inner barrier layer 26 of the pipe segment 20 from collapsing. Accordingly, in such embodiments, a bore fluid port 166 on a reusable test head 76 may be fluidly connected to a bore test fluid source 45, for example, via one or more external bore fluid conduits 61, such as a hose.

Additionally or alternatively, since the inner barrier layer 26 of a pipe segment 20 is primarily implemented to provide fluid isolation between the pipe bore 32 of the pipe segment 20 and external environmental conditions and, thus, provides fluid isolation between the pipe bore 32 and the tubing annulus 25 of the pipe segment 20, which is external to the inner barrier layer 26, an unexpected change in a bore fluid parameter resulting in the pipe bore 32 of the pipe segment 20 due to supply of annulus test fluid to the tubing annulus 25 of the pipe segment 20 may indicate that the integrity of the inner barrier layer 26 of the pipe segment 20 is potentially compromised by one or more faults, such as a breach. For example, an unexpected change (e.g., increase or decrease) in bore fluid pressure in a pipe segment 20 toward the fluid pressure of annulus test fluid supplied to the pipe segment 20, an unexpected change in bore fluid temperature in the pipe segment 20 toward the fluid temperature of the annulus test fluid, and/or an unexpected change in bore fluid composition in the pipe segment 20 toward the fluid composition of the annulus test fluid may indicate that the inner barrier layer 26 of the pipe segment 20 is potentially faulty. Accordingly, to facilitate determining one or more bore fluid parameters and, thus, testing pipe integrity, in some embodiments, one or more fluid parameter sensors 43, such as a fluid pressure sensor, a fluid temperature sensor, and/or a fluid composition sensor, may be fluidly connected to a bore fluid port 166 on a reusable test head 76, for example, via one or more external bore fluid conduits 61, such as a hose.

However, it should be appreciated that the depicted example is merely intended to be illustrative and not limiting. In particular, in other embodiments, the internal plug inflation fluid conduit 114E may be integrated with the plug shaft 96E in a similar manner as in FIG. 9 and, thus, the tube bore 116E of the plug shaft 96E may open to the plug fluid cavity 112E in the plug fluid bladder 110E, for example, instead of through the plug fluid bladder 110E to the pipe bore 32 of a pipe segment 20. Additionally or alternatively, in other embodiments, a reusable test head 76 may not include a bore fluid port 166, for example, when its plug shaft 96 does not include a tube bore 116 that opens through a corresponding plug fluid bladder 110. Furthermore, in other embodiments, an end cap assembly 78 of a reusable test head 76 may include an inflatable (e.g., pneumatic) cap fastener mechanism 82 while the bore plug assembly 80 of the reusable test head 76 includes a mechanical plug fastener mechanism 84. In fact, in some embodiments, a bore fluid port 166 may additionally or alternatively be included in a reusable test head 76 that includes an inflatable cap fastener mechanism 82 and/or a mechanical plug fastener mechanism 84.

In any case, returning to FIG. 5, as in the depicted example, to facilitate improving securement of its end cap assembly 78 and its bore plug assembly 80, in some embodiments, a reusable test head 76 in a pipe integrity testing system 38 may additionally include a supplemental support assembly 168 external to its end cap assembly 78. As in the depicted example, a supplemental support assembly 168 of a reusable test head 76 generally includes one or more support members (e.g., arms) 170, which are or are to be secured to the end cap assembly 78 of the reusable test head 76, and a support clamp 172, which is secured to the one or more support members 170.

However, it should be appreciated that the depicted example is merely intended to be illustrative and not limiting. In particular, in other embodiments, a reusable test head 76 in a pipe integrity testing system 38 may not include a supplemental support assembly 168, for example, when engagement of an end cap assembly 78 in the reusable test head 76 with tubing 22 of a pipe segment 20 and/or engagement of a bore plug assembly 80 in the reusable test head 76 with the tubing 22 of the pipe segment 20 is expected to be sufficient to secure the reusable test head 76 to the pipe segment 20 during pipe integrity testing. Alternatively, in other embodiments, a supplemental support assembly 168 of a reusable test head 76 may include more than two (e.g., three, four, or more) support members 170 or fewer than two (e.g., one) support members 170. In any case, a support clamp 172 of a supplemental support assembly 168 in a reusable test head 76 may generally be secured circumferentially around a pipe segment 20 external from the end cap assembly 78 of the reusable test head 76 to facilitate improving securement of the reusable test head 76 to the pipe segment 20.

Figure 12:
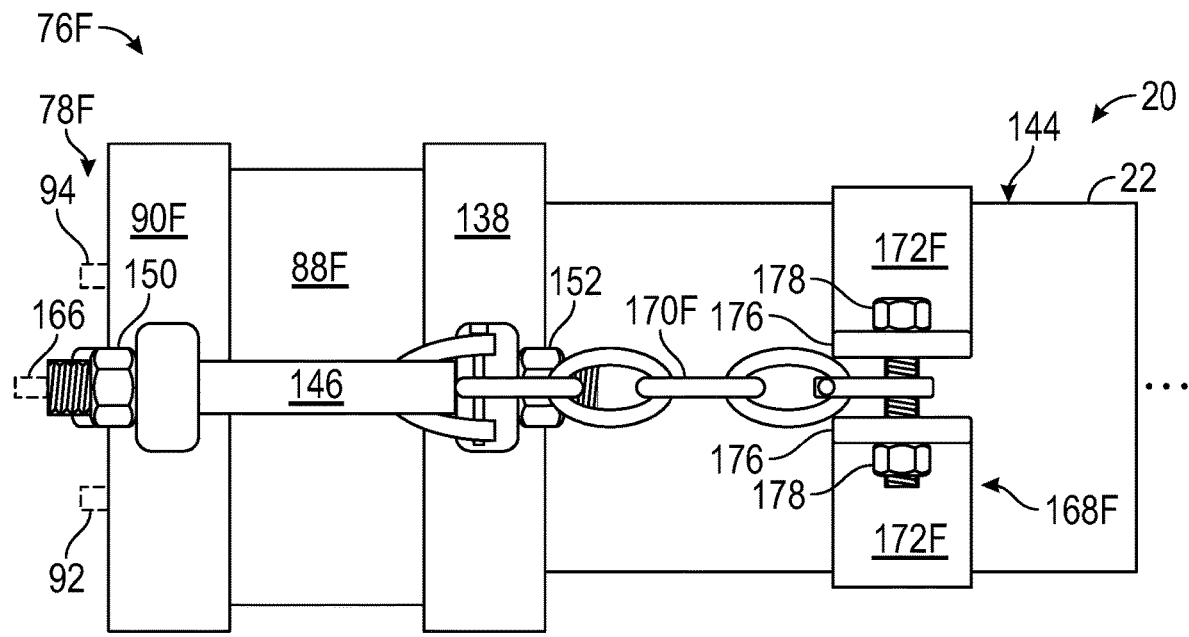
FIG. 12 is a side view of a more detailed example of the reusable test head of FIG. 5, in accordance with an embodiment of the present disclosure.

To help illustrate, a more detailed example of a reusable test head 76F, which may be included in a pipe integrity testing system 38, is shown in FIG. 12. As depicted, the reusable test head 76F generally includes an end cap assembly 78F and a bore plug assembly 80, which is obfuscated from view by the end cap assembly 78F. Additionally, similar to FIG. 11, the reusable test head 76F of FIG. 12 includes an inflation fluid port 94, an annulus fluid port 92, and a bore fluid port 166, which open through its end cap assembly 78F. Accordingly, in some embodiments, the bore plug assembly 80 of FIG. 12 may generally match the bore plug assembly 80E of FIG. 11 and, thus, include an inflatable plug fastener mechanism (e.g., bladder) 82.

However, it should be appreciated that the depicted example is merely intended to be illustrative and not limiting. In particular, in other embodiments, the bore plug assembly 80 in the reusable test head 76F may generally match the bore plug assembly 80A of FIG. 7, the bore plug assembly 80B of FIG. 8, or the bore plug assembly 80C of FIG. 9. Alternatively, in other embodiments, the bore plug assembly 80 in the reusable test head 76F may generally match the bore plug assembly 80D of FIGS. 10A and 10B and, thus, include a mechanical plug fastener mechanism (e.g., seal) 82.

In any case, similar to the end cap assembly 78E of FIG. 11, the end cap assembly 78F of FIG. 12 generally includes a cap end plate 90F, which covers an open end of a pipe segment 20, a cap end ring 138, which is disposed circumferentially around the pipe segment 20, a cap sleeve 88F, which is disposed circumferentially around the pipe segment 20 between the cap end plate 90F and the cap end ring 138, and a reusable cap fastener mechanism, which is obfuscated from view. In fact, in some embodiments, the end cap assembly 78F of FIG. 12 may generally match the end cap assembly 78E of FIG. 11 and, thus, include a mechanical cap fastener mechanism (e.g., seal) 82.

However, as depicted in FIG. 12, the reusable test head 76F additionally includes a supplemental support assembly 168F. As depicted, the supplemental support assembly 168F generally includes a support member 170—namely a support chain 170F—and a support clamp 172F, which is disposed circumferentially around the tubing 22 of the pipe segment 20 external to the end cap assembly 78F. In particular, to enable reuse, a support clamp 172 in a supplemental support assembly 168 generally contracts radially inward when transitioned from a deactivated state toward an activated state (e.g., to circumferentially compress an inner surface of the support clamp 172 against an outer surface 144 of the tubing 22 of a pipe segment 20) and expands radially outward when transitioned from the activated state toward the deactivated state (e.g., to disengage the inner surface of the support clamp 172 from the outer surface 144 of the pipe segment tubing 22). In other words, while in its activated state, a supplemental support assembly 168 of a reusable test head 76 may be secured to a pipe segment 20. On the other hand, the supplemental support assembly 168 may be disconnected (e.g., removed) from the pipe segment 20 while in its deactivated state, for example, at least in part by axially sliding its support clamp 172 off of the pipe segment 20.

Figure 13:
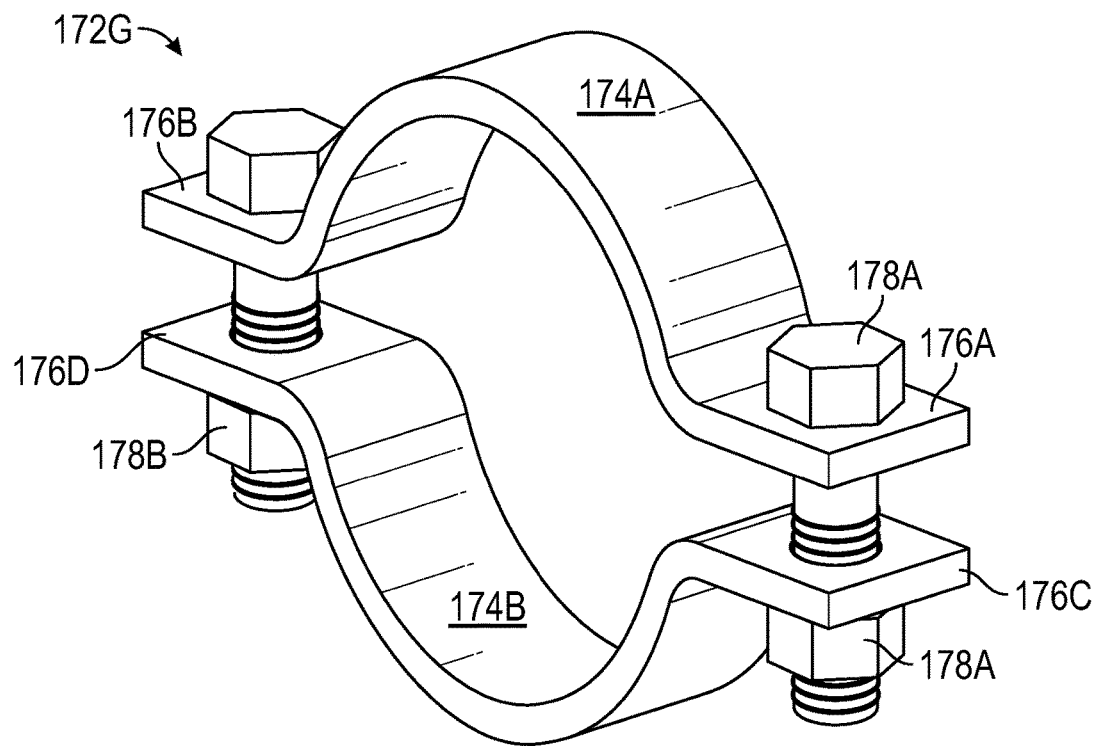
FIG. 13 is a perspective view of an example of a support clamp that may be included in the reusable test head of FIG. 12, in accordance with an embodiment of the present disclosure.

To help more clearly illustrate, an example of a support clamp 172G, which may be included in a supplemental support assembly 168 of a reusable test head 76, is shown in FIG. 13. As depicted, the support clamp 172G includes multiple clamp segments 174—namely a first clamp segment (e.g., half) 174A, which has a first clamp flange 176A and a second clamp flange 176B that extend out from its body, and a second clamp segment (e.g., half) 174B, which has a third clamp flange 176C and a fourth clamp flange 176D that extend out from its body. In particular, as depicted, the first clamp flange 176A of the first clamp segment 174A opposes the third clamp flange 176C of the second clamp segment 174B while the second clamp flange 176B of the first clamp segment 174A opposes the fourth clamp flange 176D of the second clamp segment 174B.

However, it should be appreciated that the depicted example is merely intended to be illustrative and not limiting. In particular, in other embodiments, a support clamp 172 in a supplemental support assembly 168 may include more than two (e.g., three, four, or more) clamp segments 174A and, thus, more than four (e.g., six, eight, or more) clamp flanges 176 or a single clamp segment 174, such as a C-shaped clamp segment 174, and, thus, fewer than four (e.g., two) clamp flanges 176. Additionally or alternatively, in other embodiments, adjacent clamp segments 174 in a support clamp 172 may be pivotably connected via a hinge.

In any case, as in the depicted example, to facilitate controlling expansion and contraction of a support clamp 172 in a supplemental support assembly 168 and, thus, the activation state of the supplemental support assembly 168, one or more support activation fasteners 178, such as a nut and a bolt, may be selectively tightened around clamp flanges 176 of the support clamp 172. In particular, in the depicted example, a first support activation fastener 178A may be selectively tightened around the first clamp flange 176A of the first clamp segment 174A and the third clamp flange 176C of the second clamp segment 174B while a second support activation fastener 178B may be selectively tightened around the second clamp flange 176B of the first clamp segment 174A and the fourth clamp flange 176D of the second clamp segment 174B.

However, it should again be appreciated that the depicted example is merely intended to be illustrative and not limiting. In particular, in other embodiments, a supplemental support assembly 168 of a reusable test head 76 may include more than two (e.g., three, four, or more) support activation fasteners 178, for example, when its support clamp 172 includes more than two pairs of clamp flanges 176. Alternatively, in other embodiments, a supplemental support assembly 168 of a reusable test head 76 may include fewer than two (e.g., one) support activation fastener 178, for example, when its support clamp 172 includes fewer than two pairs of clamp flanges 176.

In any case, as in the example depicted in FIG. 12, to facilitate securing an end cap assembly 78 of a reusable test head 76 to a support clamp 172 in a corresponding supplemental support assembly 168, in some embodiments, a support chain 170F in the supplemental support assembly 168 may be secured (e.g., shackled) to a threaded cap shaft 146 in the end cap assembly 78 and secured (e.g., shackled) to a support activation fastener 178, which is secured through clamp flanges 176 of the support clamp 172. In other words, in the depicted example, the end cap assembly 78F may be secured to the support clamp 172F and, thus, the pipe segment 20 at least in part by securing (e.g., shackling) the support chain 170F to the threaded cap shaft 146 and securing (e.g., shackling) the support chain 170F to the support activation fastener 178, for example, between the clamp flanges 176 on the support clamp 172. On the other hand, the end cap assembly 78F may be disconnected from the support clamp 172F and, thus, the pipe segment 20 at least in part by unsecuring (e.g., unshackling) the support chain 170F from the threaded cap shaft 146 and/or unsecuring (e.g., unshackling) the support chain 170F from the support activation fastener 178.

However, it should again be appreciated that the depicted example is merely intended to be illustrative and not limiting. In particular, in other embodiments, a supplemental support assembly 168 of a reusable test head 76 may include a different type of support member 170. For example, in other embodiments, a support member 170 in a reusable test head 76 may be a rigid structure, such as a bar or a shaft.

Figure 14:
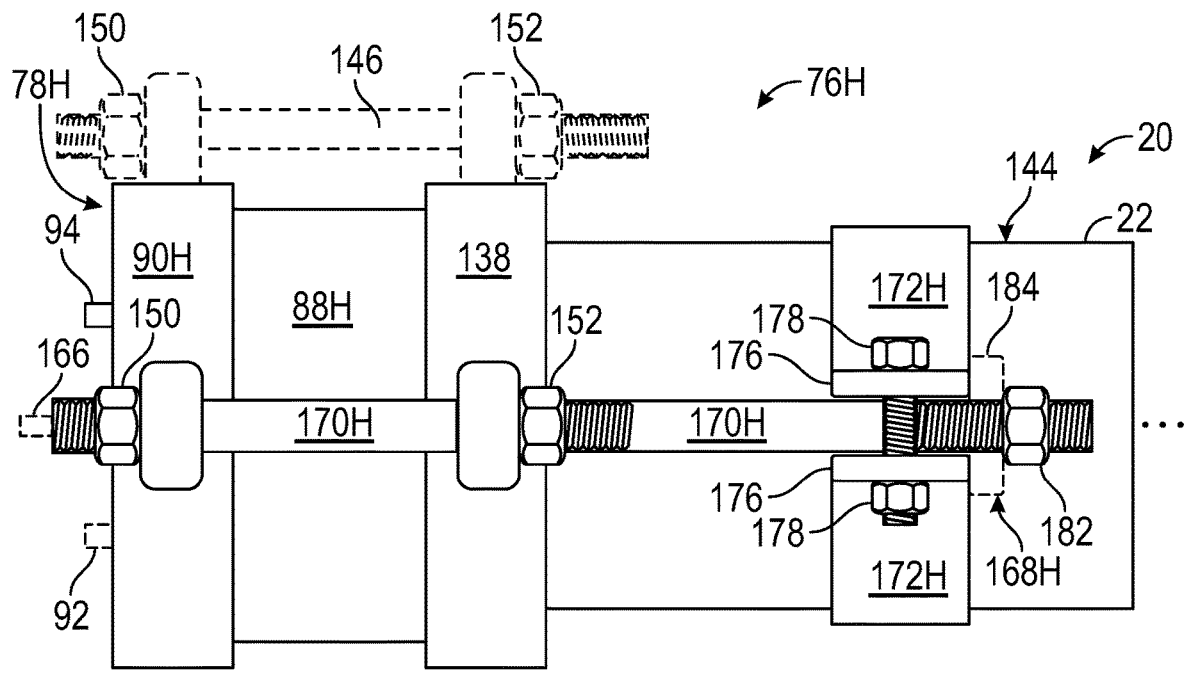
FIG. 14 is a side view of another more detailed example of the reusable test head of FIG. 5, in accordance with an embodiment of the present disclosure.

To help illustrate, another more detailed example of a reusable test head 76H, which may be included in a pipe integrity testing system 38, is shown in FIG. 14. Similar to the reusable test head 76F of FIG. 12, the reusable test head 76H of FIG. 14 generally includes an end cap assembly 78H, a supplemental support assembly 168H, and a bore plug assembly 80, which is obfuscated from view by the end cap assembly 78H. Additionally, similar FIG. 11, the reusable test head 76H of FIG. 14 includes an inflation fluid port 94, an annulus fluid port 92, and a bore fluid port 166, which open through its end cap assembly 78H. Accordingly, in some embodiments, the bore plug assembly 80 of FIG. 14 may generally match the bore plug assembly 80E of FIG. 11 and, thus, include an inflatable plug fastener mechanism (e.g., bladder) 84.

However, it should be appreciated that the depicted example is merely intended to be illustrative and not limiting. In particular, in other embodiments, the bore plug assembly 80 in the reusable test head 76H may generally match the bore plug assembly 80A of FIG. 7, the bore plug assembly 80B of FIG. 8, or the bore plug assembly 80C of FIG. 9. Alternatively, in other embodiments, the bore plug assembly 80 in the reusable test head 76H may generally match the bore plug assembly 80D of FIGS. 10A and 10B and, thus, include a mechanical plug fastener mechanism (e.g., seal) 84.

In any case, similar to the end cap assemblies of FIGS. 11 and 12, the end cap assembly 78H of FIG. 14 generally includes a cap end plate 90H, which covers an open end of a pipe segment 20, a cap end ring 138, which is disposed circumferentially around the pipe segment 20, a cap sleeve 88H, which is disposed circumferentially around the pipe segment 20 between the cap end plate 90H and the cap end ring 138, and a reusable cap fastener mechanism 82, which is obfuscated from view. In fact, in some embodiments, the end cap assembly 78H of FIG. 14 may generally match the end cap assembly 78E of FIG. 11 or the end cap assembly 78F of FIG. 12 and, thus, include a mechanical cap fastener mechanism (e.g., seal) 82.

Additionally, similar to the supplemental support assembly 168F of FIG. 12, the supplemental support assembly 168H of FIG. 14 generally includes a support member 170 and a support clamp 172H, which is disposed circumferentially around a pipe segment 20 external to the end cap assembly 78H, and one or more support activation fasteners 178, which are each secured around a pair of clamp flanges 176 on the support clamp 172H. In fact, in some embodiments, the support clamp 172H of FIG. 14 may generally match the support clamp 172H of FIG. 12.

However, as depicted in FIG. 14, the support member 170 in the supplemental support assembly 168H is a threaded support shaft 170H, for example, instead of being a chain. In particular, as in the depicted example, to facilitate securing an end cap assembly 78 of a reusable test head 76 to a support clamp 172 in a corresponding supplemental support assembly 168, in some embodiments, a threaded support shaft 170H of the supplemental support assembly 168 may be secured through a shaft opening 148 in the end cap assembly 78. In particular, in the depicted example, the threaded support shaft 170H is secured to the cap end plate 90H in the end cap assembly 78H via an end plate nut 150, which is secured to the threaded support shaft 170H behind a corresponding shaft opening (e.g., pad eye) 148A (obfuscated from view) in the cap end plate 90H, and secured to the cap end ring 138 in the end cap assembly 78H via an end ring nut 152, which is secured to the threaded support shaft 170H in front of a corresponding shaft opening 148B (obfuscated from view) in the cap end ring 138. Accordingly, in the depicted example, tightening the end plate nut 150 on the threaded support shaft 170H behind the cap end plate 90H and/or tightening the end ring nut 152 on the threaded support shaft 170H in front of the cap end ring 138 may force the cap end ring 138 and the cap sleeve 88H toward one another to axially compress a corresponding cap seal 140 therebetween such that the cap seal 140 contracts radially inward. On the other hand, in such embodiments, loosening the end plate nut 150 from behind the cap end plate 90H and/or loosening the end ring nut 152 from in front of the cap end ring 138 may enable the cap seal 140 to push the cap sleeve 88H and the cap end ring 138 axially away from one another as the cap seal 140 expands radially outward (e.g., due to material spring back). In other words, in such embodiments, a threaded support shaft 170H of a supplemental support assembly 168 may facilitate securing a corresponding end cap assembly 78 together as well as controlling the activation state of the end cap assembly 78.

In fact, in some such embodiments, a threaded support shaft 170H in a supplemental support assembly 168 may obviate the inclusion of a threaded cap shaft 146 in a corresponding end cap assembly 78. In other words, in some such embodiments, an end cap assembly 78 of a reusable test head 76 may not include a threaded cap shaft 146, for example, when a corresponding supplemental support assembly 168 includes a threaded support shaft 170H, which is to be secured to a cap end plate 90 of the end cap assembly 78 via an end plate nut 150 secured to the threaded support shaft 170H behind the cap end plate 90 and to a cap end ring 138 of the end cap assembly 78 via an end ring nut 152 secured to the threaded support shaft 170H in front of the cap end ring 138. Nevertheless, in other embodiments, an end cap assembly 78 of a reusable test head 76 may include one or more threaded cap shafts 146 while a corresponding supplemental support assembly 168 includes one or more threaded support shafts 170.

In any case, as in the depicted example, to facilitate securing a threaded support shaft 170H to a corresponding support clamp 172, a supplemental support assembly 168 of a reusable test head 76 may additionally include a corresponding support securement nut 182, which is implemented to be selectively secured to the threaded support shaft 170H in front of a corresponding pair of clamp flanges 176 on the support clamp 172. Accordingly, in such embodiments, tightening the support securement nut 182 on the threaded support shaft 170H in front of the clamp flanges 176 on the support clamp 172 may facilitate securing the support clamp 172 to the threaded support shaft 170H. On the other hand, in such embodiments, loosening the support securement nut 182 from in front of the clamp flanges 176 on the support clamp 172 may facilitate disconnecting the threaded support shaft 170H from the support clamp 172.

Moreover, as in the depicted example, in some embodiments, a supplemental support assembly 168 of a reusable test head 76 may additionally include a washer 184, which is implemented to be disposed circumferentially around a threaded support shaft 170H of the supplemental support assembly 168 between a support clamp 172 and a support securement nut 182 of the supplemental support assembly 168. In particular, as in the depicted example, in some such embodiments, a washer 184 in a supplemental support assembly 168 may have a larger outer surface diameter than a corresponding support securement nut 182 and, thus, facilitate maintaining the support securement nut 182 in front of corresponding clamp flanges 176 on a support clamp 172 of the supplemental support assembly 168. Additionally or alternatively, in some such embodiments, a washer 184 in a supplemental support assembly 168 may be formed from a softer material, such as rubber, while a corresponding support securement nut 182 in the supplemental support assembly 168 is formed from a harder material, such as metal.

However, it should again be appreciated that the depicted example is merely intended to be illustrative and not limiting. In particular, in other embodiments, a supplemental support assembly 168 of a reusable test head 76 may not include a washer 184, for example, when the outer surface diameter of a support securement nut 182 is expected to be sufficient to block clamp flanges 176 of a corresponding support clamp 172 from moving past the support securement nut 182 while the supplemental support assembly 168 is in its activated state. Additionally, in other embodiments, a supplemental support assembly 168 of a reusable test head 76 may include multiple (e.g., two, three, or more) support securement nuts 182, for example, when the supplemental support assembly 168 includes multiple threaded support shafts 170. Moreover, in other embodiments, a reusable test head 76 that utilizes an inflatable (e.g., pneumatic) cap fastener mechanism 82 in its end cap assembly 78 may also include a supplemental support assembly 168.

Figure 15:
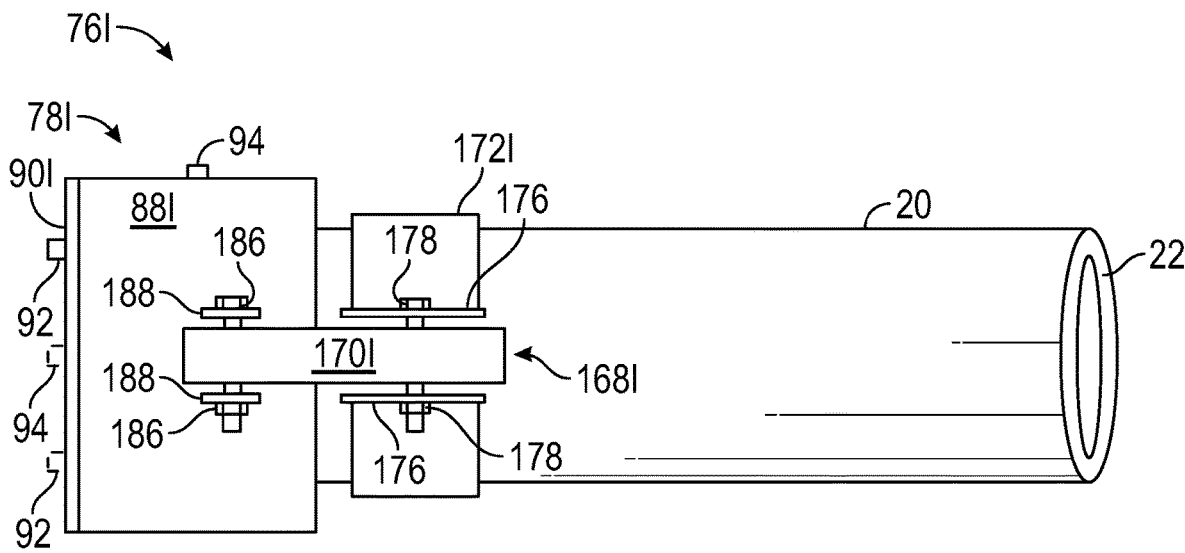
FIG. 15 is a side view of a further more detailed example of the reusable test head of FIG. 5, in accordance with an embodiment of the present disclosure.

To help illustrate, a further more detailed example of a reusable test head 76I, which may be included in a pipe integrity testing system 38, is shown in FIG. 15. Similar to the reusable test heads of FIGS. 12 and 14, the reusable test head 76I of FIG. 15 generally includes an end cap assembly 78I, a supplemental support assembly 168I, and a bore plug assembly 80, which is obfuscated from view by the end cap assembly 78H. Additionally, similar to FIGS. 7-9, the reusable test head 76I of FIG. 15 includes one or more inflation fluid ports 94 and one or more annulus fluid ports 92, which open through its end cap assembly 78I. Accordingly, in some embodiments, the bore plug assembly 80 of FIG. 15 may generally match the bore plug assembly 80A of FIG. 7, the bore plug assembly 80B of FIG. 8, or the bore plug assembly 80C of FIG. 9 and, thus, include an inflatable plug fastener mechanism (e.g., bladder) 84.

However, it should be appreciated that the depicted example is merely intended to be illustrative and not limiting. In particular, in other embodiments, the bore plug assembly 80 in the reusable test head 76I may generally match the bore plug assembly 80E of FIG. 11. Alternatively, in other embodiments, the bore plug assembly 80 in the reusable test head 76I may generally match the bore plug assembly 80D of FIGS. 10A and 10B and, thus, include a mechanical plug fastener mechanism (e.g., seal) 84.

In any case, similar to the end cap assembly 78A of FIGS. 7-9, the end cap assembly 78I of FIG. 15 generally includes a cap end plate 90I, which covers an open end of a pipe segment 20, a cap sleeve 88I, which is secured to the cap end plate 90I and disposed circumferentially around the pipe segment 20, and a reusable cap fastener mechanism 82, which is obfuscated from view. In particular, in the depicted example, the reusable cap fastener mechanism 82 in the end cap assembly 78I may be an inflatable cap fastener mechanism (e.g., bladder) 82 and, thus, the end cap assembly 78I of FIG. 15 may generally match the end cap assembly 78A of FIGS. 7-9.

Additionally, similar to the supplemental support assemblies 168 of FIGS. 12 and 14, the supplemental support assembly 168I of FIG. 15 generally includes a support member 170, a support clamp 172I, which is disposed circumferentially around a pipe segment 20 external to the end cap assembly 78I, and one or more support activation fasteners 178, which are each secured around a pair of clamp flanges 176 on the support clamp 172I. In fact, in some embodiments, the support clamp 172I of FIG. 15 may generally match the support clamp 172F of FIG. 12 or the support clamp of FIG. 14.

However, as depicted in FIG. 15, to facilitate securing the end cap assembly 78I to the support clamp 172I, the support member 170 in the supplemental support assembly 168I is a support bar 170I, which includes fastener openings that each enables a corresponding fastener to extend therethrough, for example, instead of being a threaded shaft or a chain. In particular, in the depicted example, the support bar 170I is secured to the end cap assembly 78I due to a cap securement fastener 186, such as a bolt and a nut, being secured through cap flanges 188 in the end cap assembly 78I as well as through a fastener opening in the support bar 170I. In other words, in the depicted example, the support bar 170I may be secured to the end cap assembly 78I at least in part by securing the cap securement fastener 186 through the cap flanges 188 in the end cap assembly 78I as well as through the fastener opening in the support bar 170I. On the other hand, the support bar 170I may be disconnected (e.g., removed) from the end cap assembly 78I at least in part by withdrawing the cap securement fastener 186 from the corresponding fastener opening in the support bar 170I.

Additionally, in the depicted example, the support bar 170I is secured to the support clamp 172I due to the support activation fastener 178 being secured through the clamp flanges 176 on the support clamp 172I as well as through a corresponding fastener opening in the support bar 170I. In other words, in the depicted example, the support clamp 172I may be secured to the pipe segment 20 as well as to the support bar 170I and, thus, the end cap assembly 78I at least in part by securing the support activation fastener 178 through the clamp flanges 176 on the support clamp 172 as well as through the corresponding fastener opening in the support bar 170I. On the other hand, the support clamp 172I may be disconnected (e.g., removed) from the pipe segment 20 as well as from the support bar 170I and, thus, the end cap assembly 78I at least in part by removing the support activation fastener 178 from the clamp flanges 176 on the support clamp 172 and the fastener opening in the support bar 170I.

Nevertheless, in some embodiments, a reusable test head 76 may be installed at and/or removed from a pipe segment 20 without disconnecting its end cap assembly 78 and its supplemental support assembly 168, for example, by merely loosening a support activation fastener 178 from around clamp flanges 176 on a support clamp 172 in the supplemental support assembly 168 to enable the support clamp 172 to slide along the pipe segment 20 while the support activation fastener 178 remains secured through a support member (e.g., bar) 170 in the supplemental support assembly 168. In fact, in some embodiments, a support member 170 in a supplemental support assembly 168 of a reusable test head 76 may be integrated with a corresponding end cap assembly 78, for example, instead of being a discrete component.

Figure 16:
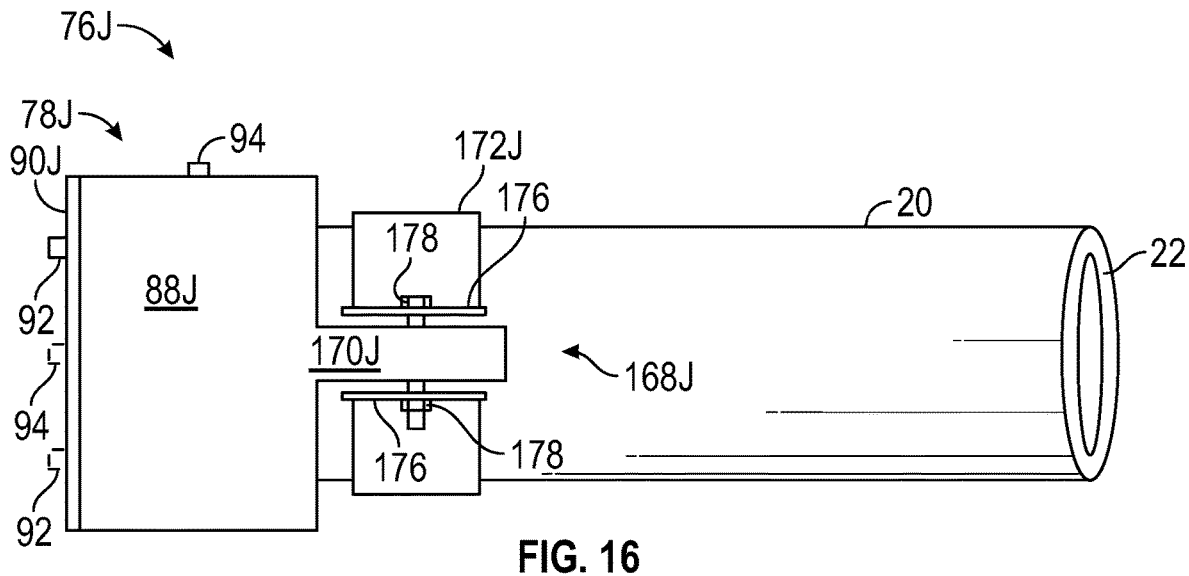
FIG. 16 is a side view of another more detailed example of the reusable test head of FIG. 5, in accordance with an embodiment of the present disclosure.

To help illustrate, another more detailed example of a reusable test head 76J, which may be included in a pipe integrity testing system 38, is shown in FIG. 16. Similar to the reusable test heads 76 of FIGS. 12, 14, and 15, the reusable test head 76J of FIG. 16 generally includes an end cap assembly 78J, a supplemental support assembly 168J, and a bore plug assembly 80, which is obfuscated from view by the end cap assembly 78J. Additionally, similar to FIGS. 7-9, the reusable test head 76J of FIG. 16 includes one or more inflation fluid ports 94 and one or more annulus fluid ports 92, which open through its end cap assembly 78J. Accordingly, in some embodiments, the bore plug assembly 80 of FIG. 16 may generally match the bore plug assembly 80A of FIG. 7, the bore plug assembly 80B of FIG. 8, or the bore plug assembly 80C of FIG. 9 and, thus, include an inflatable plug fastener mechanism (e.g., bladder) 84.

However, it should be appreciated that the depicted example is merely intended to be illustrative and not limiting. In particular, in other embodiments, the bore plug assembly 80 in the reusable test head 76J may generally match the bore plug assembly 80E of FIG. 11. Alternatively, in other embodiments, the bore plug assembly in the reusable test head 76J may generally match the bore plug assembly 80D of FIGS. 10A and 10B and, thus, include a mechanical plug fastener mechanism (e.g., seal) 84.

In any case, similar to the end cap assembly 78A of FIGS. 7-9, the end cap assembly 78J of FIG. 16 generally includes a cap end plate 90J, which covers an open end of a pipe segment 20, a cap sleeve 88J, which is secured to the cap end plate 90J and disposed circumferentially around a pipe segment 20, and a reusable cap fastener mechanism 82, which is obfuscated from view. In particular, in some embodiments, the reusable cap fastener mechanism 82 in the end cap assembly 78J may include an inflatable cap fastener mechanism (e.g., bladder) 82 and, thus, the end cap assembly 78J of FIG. 16 may generally match the end cap assembly 78A of FIGS. 7-9.

Additionally, similar to the supplemental support assemblies 168 of FIGS. 12, 14, and 15, the supplemental support assembly 168J of FIG. 16 generally includes a support arm 170, a support clamp 172J, which is disposed circumferentially around a pipe segment 20 external to the end cap assembly 78J, and one or more support activation fasteners 178, which are each secured around a pair of clamp flanges 176 on the support clamp 172J. In particular, similar to the supplemental support assembly 168I of FIG. 15, the support arm 170 in the supplemental support assembly 168J of FIG. 16 is a support bar 170J, which includes a fastener opening that each enables a support activation fastener 178 to extend therethrough.

However, as depicted in FIG. 16, the support bar 170J of the supplemental support assembly 168J is integrated with the cap sleeve 88J in the end cap assembly 78J, for example, as part of shell instead of being a discrete component that is secured to the end cap assembly 78J via a cap securement fastener 186. Nevertheless, similar to FIG. 15, the support clamp 172J of FIG. 16 may be secured to the pipe segment 20 as well as to the support bar 170J and, thus, the end cap assembly 78J at least in part by securing the support activation fastener 178 through the clamp flanges 176 on the support clamp 172 as well as through a corresponding fastener opening in the support bar 170J. On the other hand, the support clamp 172J may be disconnected (e.g., removed) from the pipe segment 20 as well as from the support bar 170J and, thus, the end cap assembly 78J at least in part by removing the support activation fastener 178 from the clamp flanges 176 on the support clamp 172 and the fastener opening in the support bar 170J. In this manner, a test head 44 in a pipe integrity testing system 38 may be implemented such that the test head 44 is reusable to separately test the integrity of multiple different pipe segments 20, which, at least in some instances, may facilitate improving pipe integrity testing efficiency, for example, by obviating the use of a new test head 44 for each pipe segment 20 deployed or to be deployed in a pipeline system 10.

Figure 17:
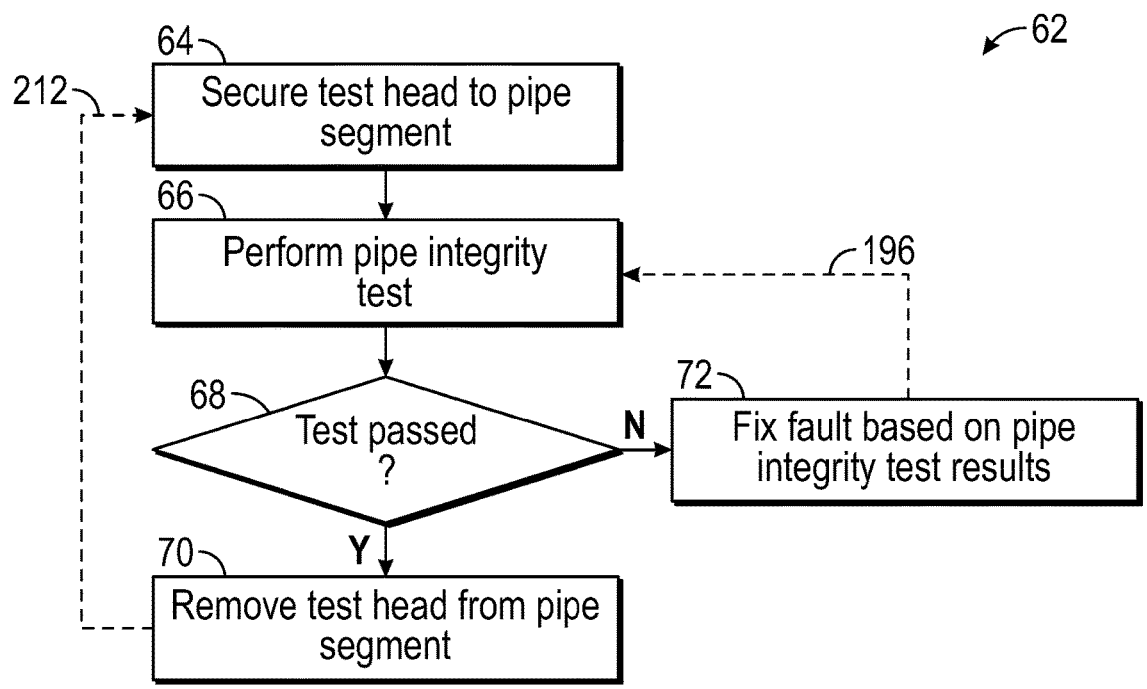
FIG. 17 is a flow diagram of an example of a process for operating a pipe integrity testing system, in accordance with an embodiment of the present disclosure.

To help further illustrate, an example of a process 62 for operating a pipe integrity testing system 38 is described in FIG. 17. Generally, the process 62 includes securing a test head to a pipe segment (process block 64), performing a pipe integrity test (process block 66), and determining whether the pipe integrity test has been passed (decision block 68). Additionally, the process 62 generally includes removing the test head from the pipe segment when the pipe integrity test has been passed (process block 70) and fixing a fault in the pipe segment based on results of the pipe integrity test when the pipe integrity test has not been passed (process block 72).

Although described in a specific order, which corresponds with an embodiment of the present disclosure, it should be appreciated that the example process 62 is merely intended to be illustrative and non-limiting. In particular, in other embodiments, a process 62 for operating a pipe integrity testing system 38 may include one or more additional process blocks and/or omit one or more of the depicted process blocks. For example, some embodiments of the process 62 may additionally include re-securing the test head to another pipe segment (arrow 212) while other embodiments of the process 62 do not. As another example, some embodiments of the process 62 may additionally include re-performing a pipe integrity test after a fault is believed to have been fixed (arrow 196) while other embodiments of the process 62 do not.

In any case, as described above, a pipe integrity testing system 38 may generally include a test head 44. In particular, as described above, to facilitate testing the integrity of a pipe segment 20, a test head 44 may generally be secured to the tubing 22 of the pipe segment 20 such that the tubing annulus 25 of the pipe segment 20 is sealed within the test head 44. Accordingly, operating a pipe integrity testing system 38 may generally include securing a test head 44 to a pipe segment 20 such that a tubing annulus 25 of the pipe segment 20 is sealed from environmental conditions external to the pipe segment 20 as well as from conditions within the pipe bore 32 of the pipe segment 20 (process block 64).

As described above, in some embodiments, a test head 44 in a pipe integrity testing system 38 may be secured to a pipe segment 20 using swaging techniques. In particular, in such embodiments, an axial (e.g., open) end of the pipe segment 20 may be inserted into the test head 44 such that the tubing 22 of the pipe segment 20 is disposed between an outer portion (e.g., jacket) of the test head 44 and an inner portion (e.g., tube) of the test head 44. In such embodiments, special-purpose deployment equipment—namely a swage machine—may then operate to conformally deform the test head around the tubing 22 of the pipe segment 20 such that the pipe segment tubing 22 is circumferentially compressed between the outer portion and the inner portion of the test head 44, thereby securing and sealing the axial end of the pipe segment tubing 22 and, thus, an open end of its annulus 25 within the test head 44. However, as described above, at least in some instances, securing a test head 44 to a pipe segment 20 using swaging techniques may affect (e.g., reduce) testing efficiency for a pipeline system 10, for example, due to the test head 44 effectively being a one-time-use (e.g., sacrificial) test head 44.

Accordingly, to facilitate improving pipe integrity testing efficiency, as described above, in other embodiments, a pipe integrity testing system 38 may include a test head 44—namely a reusable test head 76—that may be reused to separately test the integrity of multiple different pipe segments 20 deployed or to deployed in a pipeline system 10. As described above, to facilitate sealing a tubing annulus 25 of a pipe segment 20 from the pipe bore 32 of the pipe segment 20 and, thus, testing the integrity of the pipe segment 20, a reusable test head 76 generally includes a bore plug assembly 80, which is to be at least partially inserted into the pipe bore 32 of the pipe segment 20. In particular, as described above, a bore plug assembly 80 of a reusable test head 76 generally includes a reusable plug fastener mechanism 84 that expands radially outward when transitioned from its deactivated state towards its activated state and that contracts radially inward when transitioned from its activated state toward its deactivated state. Accordingly, securing a reusable test head 76 to a pipe segment 20 may generally include inserting a bore plug assembly 80 of the reusable test head 76 into the pipe bore 32 of the pipe segment 20 while the bore plug assembly 80 is in its deactivated state and, subsequently, transitioning the bore plug assembly 80 from its deactivated state to its activated state such that an outer surface 85 of a reusable plug fastener mechanism 84 in the bore plug assembly 80 is compressed circumferentially against an inner surface 30 of the tubing 22 of the pipe segment 20.

To enable repeatedly cycling between an activated state and a deactivated state and, thus, separately testing the integrity of multiple different pipe segments 20, as described with regard to FIGS. 7-9 and 11, in some embodiments, a reusable plug fastener mechanism 84 in a bore plug assembly 80 of a reusable test head 76 may be an inflatable (e.g., pneumatic) plug fastener mechanism 84, which generally includes a plug fluid bladder 110 that is fluidly connected to an inflation fluid port 94, which opens through the end cap assembly 78 of the reusable test head 76. In particular, in such embodiments, a plug fluid bladder 110 in a reusable test head 76 may generally expand radially outward when inflation fluid is supplied to its plug fluid cavity 112. Accordingly, in such embodiments, transitioning a bore plug assembly 80 of a reusable test head 76 from its deactivated state to its activated state may generally include supplying inflation fluid to a plug fluid bladder 110 in the bore plug assembly 80, for example, from an inflation fluid source 113 that is fluidly connected to a corresponding inflation fluid port 94 on the reusable test head 76 via one or more external inflation fluid conduits 115.

However, as described above with regard to FIGS. 10A and 10B, to enable repeatedly cycling between an activated state and a deactivated state and, thus, separately testing the integrity of multiple different pipe segments 20, in other embodiments, a reusable plug fastener mechanism 84 in a bore plug assembly 80 of a reusable test head 76 may be a mechanical plug fastener mechanism 84, which generally includes a plug seal 118. As described above, to facilitate controlling expansion and contraction of a plug seal 118 and, thus, its activation state, in some embodiments, a bore plug assembly 80 of a reusable test head 76 may additionally include a threaded plug shaft 96, a plug end plate 120, which is secured to an end of the threaded plug shaft 96, a plug activation plate 122, which is disposed circumferentially around the threaded plug shaft 96 such that the plug seal 118 is disposed between the plug activation plate 122 and the plug end plate 120, and a plug activation nut 124, which is to be selectively tightened on the threaded plug shaft 96 behind the plug activation plate 122. In particular, in such embodiments, the plug seal 118 may generally expand radially outward when axially compressed between the plug end plate 120 and the plug activation plate 122. Accordingly, in such embodiments, transitioning a bore plug assembly 80 of a reusable test head 76 from its deactivated state to its activated state may generally include tightening a plug activation nut 124 on a threaded plug shaft 96 in the bore plug assembly 80 behind a plug activation plate 122 such that a plug seal 118 in the bore plug assembly 80 is axially compressed between the plug activation plate 122 and a plug end plate 120.

In any case, as described above, in addition to a bore plug assembly 80, to facilitate sealing a tubing annulus 25 of a pipe segment 20 from environmental conditions external to the pipe segment 20 and, thus, testing the integrity of the pipe segment 20, a reusable test head 76 in a pipe integrity testing system 38 generally includes an end cap assembly 78, which is to be used to cover an open (e.g., axial) end of the pipe segment 20. In particular, as described above, an end cap assembly 78 of a reusable test head 76 generally includes a reusable cap fastener mechanism 82 that expands radially inward when transitioned from its deactivated state towards its activated state and that contracts radially outward when transitioned from its activated state toward its deactivated state. Accordingly, securing a reusable test head 76 to a pipe segment 20 may generally include disposing an end cap assembly 78 of the reusable test head 76 over an open end of the pipe segment 20 while the end cap assembly 78 is in its deactivated state and, subsequently, transitioning the end cap assembly 78 from its deactivated state to its activated state.

To enable repeatedly cycling between an activated state and a deactivated state and, thus, separately testing the integrity of multiple different pipe segments 20, as described with regard to FIGS. 7-9, in some embodiments, a reusable cap fastener mechanism 82 in an end cap assembly 78 of a reusable test head 76 may be an inflatable (e.g., pneumatic) cap fastener mechanism 82, which generally includes a cap fluid bladder 104 that is fluidly connected to an inflation fluid port 94, which opens through the end cap assembly 78. In particular, in such embodiments, a cap fluid bladder 104 may generally expand radially inward when inflation fluid is supplied to its cap fluid cavity 106. Accordingly, in such embodiments, transitioning an end cap assembly 78 of a reusable test head 76 from its deactivated state to its activated state may include supplying inflation fluid to a cap fluid bladder 104 in the end cap assembly 78, for example, from an inflation fluid source 113 that is fluidly connected to a corresponding inflation fluid port 94 on the reusable test head 76 via one or more external inflation fluid conduits 115.

However, as described above with regard to FIGS. 10A and 10B, to enable repeatedly cycling between an activated state and a deactivated state and, thus, separately testing the integrity of multiple different pipe segments 20, in other embodiments, a reusable cap fastener mechanism 82 in an end cap assembly 78 of a reusable test head 76 may be a mechanical cap fastener mechanism 82, which generally includes one or more cap seals 140. As described above, to facilitate controlling expansion and contraction of a cap seal 140 and, thus, its activation state, in some embodiments, an end cap assembly 78 of a reusable test head 76 may additionally include a cap end plate 90, which is to be used to cover an open end of a pipe segment 20 and includes a shaft opening (e.g., pad eye) 148A that enables a threaded shaft (e.g., threaded cap shaft 146 or threaded support shaft 170H) to be inserted therethrough, a cap end ring 138, which is to be disposed circumferentially around the pipe segment 20 and includes another shaft opening (e.g., pad eye) 148B that enables the threaded shaft to be inserted therethrough, a cap sleeve 88, which is to be disposed circumferentially around the pipe segment 20 between the cap end plate 90 and the cap end ring 138 such that the cap seal 140 is disposed between the cap sleeve 88 and the cap end ring 138, an end plate nut 150 that is to be selectively tightened on the threaded shaft behind the shaft opening 148A in the cap end plate 90, and an end ring nut 152 that is to be selectively tightened on the threaded shaft in front of the shaft opening 148B in the cap end ring 138. In particular, in such embodiments, the cap seal 140 may generally expand radially inward when axially compressed between the cap sleeve 88 and the cap end ring 138, for example, due to the cap end plate 90 and the cap end ring 138 being forced toward one another. Accordingly, in such embodiments, transitioning an end cap assembly 78 of a reusable test head 76 from its deactivated state to its activated state may include tightening an end plate nut 150 on a threaded shaft (e.g., a threaded cap shaft 146 or a threaded support shaft 170H) behind a shaft opening 148A in a cap end plate 90 of the end cap assembly 78 and/or tightening an end ring nut 152 on the threaded shaft in front of a shaft opening 148B in a cap end ring 138 of the end cap assembly 78 such that a cap seal 140 in the end cap assembly 78 is compressed axially between the cap end ring 138 and a cap sleeve 88 of the end cap assembly 78 and, thus, expands radially inward.

In any case, as described above, to facilitate improving securement to a pipe segment 20, in some embodiments, a reusable test head 76 in a pipe integrity testing system 38 may additionally include a supplemental support assembly 168, which is to be secured to the tubing 22 of the pipe segment 20 as well as an end cap assembly 78 of the reusable test head 76. Accordingly, in such embodiments, securing a reusable test head 76 to a pipe segment 20 may include securing a supplemental support assembly 168 of the reusable test head 76 to the tubing 22 of the pipe segment 20 as well as to the end cap assembly 78 of the reusable test head 76.

In particular, as described above, to facilitate securement to a pipe segment 20, in some embodiments, a supplemental support assembly 168 in a reusable test head 76 generally includes a support clamp 172, which is to be disposed circumferentially around the tubing 22 of the pipe segment 20 external to a corresponding end cap assembly 78, and a support activation fastener 178, such as a nut and a bolt, which is to be selectively tightened around a pair of clamp flanges 176 on the support clamp 172 to tighten the support clamp 172 around the pipe segment tubing 22. Accordingly, in such embodiments, securing a supplemental support assembly 168 of a reusable test head 76 to a pipe segment 20 may include disposing a support clamp 172 circumferentially around the tubing 22 of the pipe segment 20 and tightening a support activation fastener 178, such as a nut and a bolt, around a pair of clamp flanges 176 on the support clamp 172 such that an inner surface of the support clamp 172 engages an outer surface 144 of the pipe segment tubing 22.

Additionally, as described above, to facilitate securement to a corresponding end cap assembly 78, a supplemental support assembly 168 in a reusable test head 76 generally includes one or more support members (e.g., arms) 170, which each is or is to be secured to the end cap assembly 78. In particular, as described with regard to FIG. 12, in some embodiments, a support member 170 in a supplemental support assembly 168 may be a support chain 170F, which is to be secured (e.g., shackled) to a support activation fastener 178 in the supplemental support assembly 168 as well as to a threaded cap shaft 146 in a corresponding end cap assembly 78. Accordingly, in such embodiments, securing a supplemental support assembly 168 of a reusable test head 76 to an end cap assembly 78 of the reusable test head 76 may include securing (e.g., shackling) a first end of a support chain 170F to the end cap assembly 78 and securing (e.g., shackling) a second end of the support chain 170 to a support activation fastener 178, which is secured around clamp flanges 176 of a support clamp 172 in the supplemental support assembly 168, for example, between the clamp flanges 176.

However, as described with regard to FIG. 14, in other embodiments, a support member 170 in a supplemental support assembly 168 of a reusable test head 76 may be a threaded support shaft 170H, which is to be secured between a pair of clamp flanges 176 on a support clamp 172 in the supplemental support assembly 168 and within a shaft opening 148 in the end cap assembly 78. To facilitate securing a threaded support shaft 170H to its support clamp 172, in such embodiments, a supplemental support assembly 168 may additionally include a support securement nut 182, which is to be secured to an end of the threaded support shaft 170H that is opposite to an end of the threaded support shaft 170H to which a cap nut (e.g., end plate nut 150 or end ring nut 152) of the end cap assembly 78 is to be secured. Accordingly, in such embodiments, securing an end cap assembly 78 of a reusable test head 76 to a support clamp 172 in a corresponding supplemental support assembly 168 may include inserting a threaded support shaft 170H between a pair of clamp flanges 176 on a support clamp 172 in the supplemental support assembly 168 as well as through a shaft opening 148 in the end cap assembly 78 and securing a cap nut (e.g., end plate nut 150 or end ringnut 152) and a support securement nut 182 on either end of the threaded support shaft 170H.

Moreover, as described with regard to FIGS. 15 and 16, in other embodiments, a support member 170 in a supplemental support assembly 168 of a reusable test head 76 may be a support bar 170, which includes one or more fastener openings that each enables a corresponding fastener to be secured through the support bar 170. In particular, as described above, a support bar 170 may include a fastener opening that enables a support activation fastener 178, which is to be secured around (e.g., through) clamp flanges 176 of a corresponding support clamp 172, to be secured through the support bar 170, for example, such that the support bar 170 is secured between the clamp flanges 176. Accordingly, in such embodiments, securing a support clamp 172 of a supplemental support assembly 168 to a corresponding support member (e.g., bar) 170 and, thus, a corresponding end cap assembly 78 may include securing a support activation fastener 178 around a pair of clamp flanges 176 on the support clamp 172 as well as through a fastener opening in the support member 170.

Additionally, as described with regard to FIG. 15, to facilitate securement to a corresponding end cap assembly 78, in some such embodiments, a support bar 170 in a supplemental support assembly 168 of a reusable test head 76 may include a fastener opening that enables a cap securement fastener 186, such as a bolt and a nut, to be secured through the support bar 170 as well as around (e.g., through) cap flanges 188 on the end cap assembly 78, for example, such that the support bar 170 is secured between the cap flanges 188. Accordingly, in such embodiments, securing an end cap assembly 78 of a reusable test head 76 to a corresponding supplemental support assembly 168 may include securing a cap securement fastener 186 around a pair of cap flanges 188 in the end cap assembly 78 as well as through a fastener opening in a support member (e.g., bar) 170 of the supplemental support assembly 168.

In any case, in this manner, a (e.g., reusable) test head 44 in a pipe integrity testing system 38 may be secured to a pipe segment 20 such that an open end of the tubing annulus 25 (e.g., one or more internal annulus fluid conduits 24 implemented in one or more intermediate layers 34) in the pipe segment 20 is sealed within the test head 44. Accordingly, after a test head 44 is secured to a pipe segment 20, a pipe integrity testing system 38 may perform an integrity test on the pipe segment 20 (process block 66).

Figure 18:
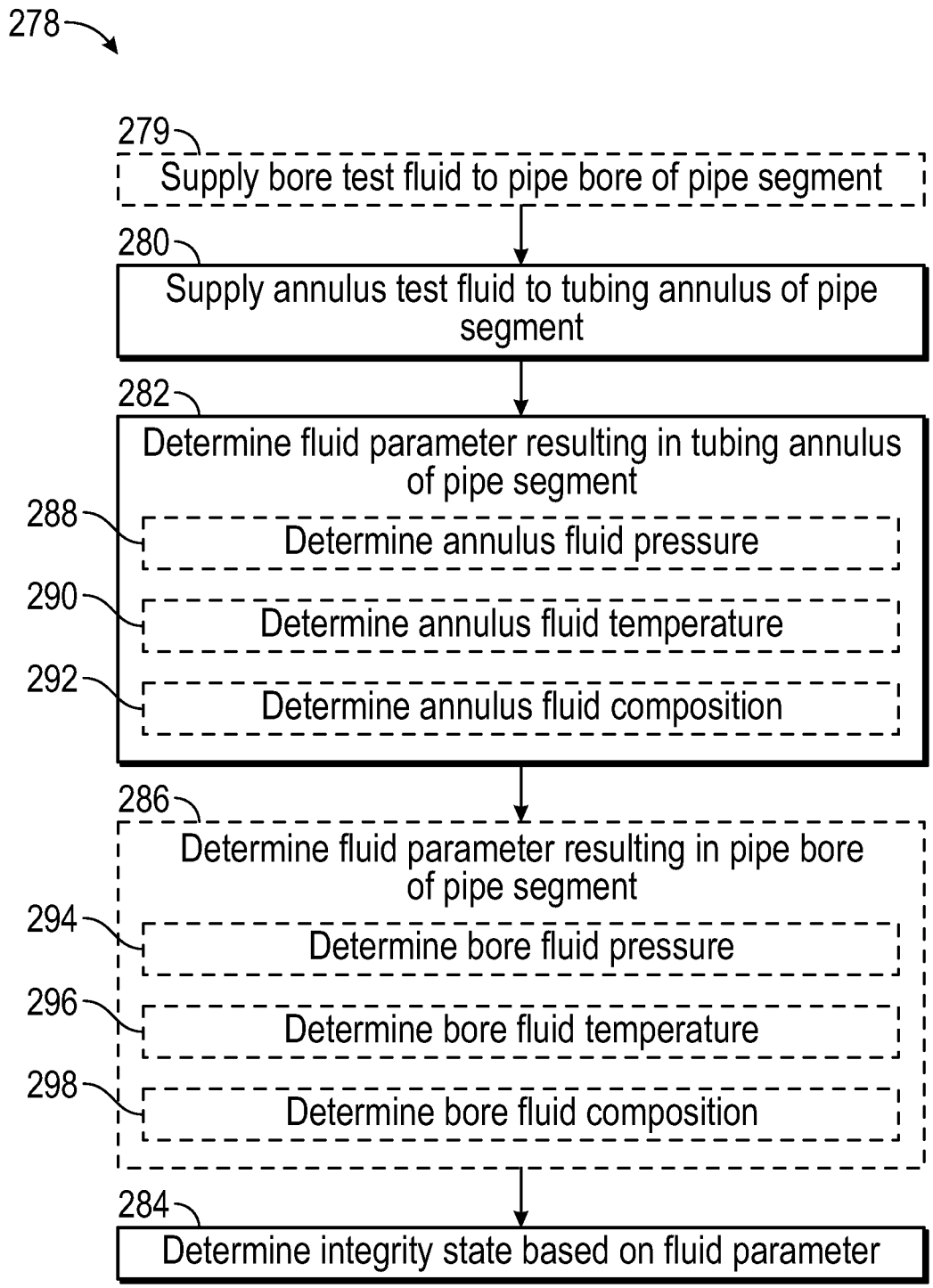
FIG. 18 is a flow diagram of an example of a process for performing a pipe integrity test, in accordance with an embodiment of the present disclosure.

To help illustrate, an example of a process 278 for performing an integrity test on a pipe segment 20 is described in FIG. 18. Generally, the process 278 includes supplying annulus test fluid to a tubing annulus of a pipe segment (process block 280). Additionally, the process 278 generally includes determining a fluid parameter that results in the tubing annulus of the pipe segment (process block 282) and determining an integrity state of the pipe segment based on the fluid parameter (process block 284).

Although specific process blocks are shown in a specific order, which corresponds with an embodiment of the present disclosure, it should be appreciated that the example process 278 is merely intended to be illustrative and not limiting. In particular, in other embodiments, a process 278 for performing a pipe integrity test may include one or more additional process blocks and/or omit one or more of the depicted process blocks. For example, some embodiments of the process 278 may additionally include supplying bore test fluid to a pipe bore of the pipe segment (process block 279) while other embodiments of the process 278 do not. As another example, some embodiments of the process 278 may additionally include determining a fluid parameter resulting in the pipe bore of the pipe segment (process block 286) while other embodiments of the process 278 do not. Moreover, in some embodiments, the process 278 may be performed at least in part by executing instructions stored in one or more tangible, non-transitory, computer-readable media, such as memory 52 in a control sub-system 40, using processing circuitry, such as a processor 50 in the control sub-system 40.

For example, in some such embodiments, a control sub-system 40 in a pipe integrity testing system 38 may instruct the pipe integrity testing system 38 to supply annulus test fluid (e.g., gas and/or liquid) to the tubing annulus 25 of a pipe segment 20 at which a test head 44 is deployed to pressurize (e.g., increase fluid pressure within) the tubing annulus 25 (process block 280). In particular, in such embodiments, to facilitate supplying annulus test fluid to the tubing annulus 25 of a pipe segment 20, a control sub-system 40 may instruct an annulus test fluid source (e.g., pump) 42 to turn on and/or a fluid valve, which is fluidly connected between the annulus test fluid source 42 and the tubing annulus 25 of the pipe segment 20, to transition from a closed state to an opened state. Nevertheless, in other embodiments, an operator (e.g., user and/or service technician) of a pipe integrity testing system 38 may additionally or alternatively manually control the supply of annulus test fluid to the tubing annulus 25 of a pipe segment 20, for example, by manually turning on an annulus test fluid source 42 and/or manually adjusting valve position of a fluid valve that is fluidly connected between the annulus test fluid source 42 and the tubing annulus 25 of the pipe segment 20.

In any case, as described above, to facilitate supplying annulus test fluid to the tubing annulus 25 of a pipe segment 20 and, thus, testing the integrity of the pipe segment 20, in some embodiments, a test head 44 in a pipe integrity testing system 38 may include an annulus fluid port 92 that opens therethrough to the tubing annulus 25 of the pipe segment 20. Accordingly, in such embodiments, supplying annulus test fluid to the tubing annulus 25 of a pipe segment 20 may include pumping (e.g., injecting) test fluid from an annulus test fluid source 42 to an annulus fluid port 92 on a corresponding test head 44. Additionally, as described above, in some embodiments, test fluid used in a pipe integrity testing system 38 and/or a pipe integrity testing process and, thus, supplied to the tubing annulus 25 of a pipe segment 20 may be an inert fluid, such as nitrogen (e.g., $N_2$) gas, for example, to facilitate reducing the likelihood that the test fluid itself affects (e.g., reduces) integrity of tubing 22 of the pipe segment 20.

In any case, since supplying annulus test fluid to the tubing annulus 25 of a pipe segment may pressurize the tubing annulus 25, as described above, to facilitate blocking the inner barrier layer 26 of the pipe segment 20 from collapsing during integrity testing, in some embodiments, a pipe integrity testing system 38 may also supply bore test fluid to the pipe bore 32 of the pipe segment 20 to pressurize (e.g., increase fluid pressure within) the pipe bore 32, for example, before annulus test fluid is supplied to the tubing annulus 25 of the pipe segment 20 (process block 279). In particular, in some such embodiments, to facilitate supplying bore test fluid to the pipe bore 32 of a pipe segment 20, a control sub-system 40 may instruct a bore test fluid source (e.g., pump) 45 to turn on and/or a fluid valve, which is fluidly connected between the bore test fluid source 45 and the pipe bore 32 of the pipe segment 20, to transition from a closed state to an opened state. Nevertheless, in other such embodiments, an operator (e.g., user and/or service technician) of a pipe integrity testing system 38 may additionally or alternatively manually control the supply of bore test fluid to the pipe bore 32 of a pipe segment 20, for example, by manually turning on a bore test fluid source 45 and/or manually adjusting valve position of a fluid valve that is fluidly connected between the bore test fluid source 45 and the pipe bore 32 of the pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. In particular, the tubing 22 of a pipe segment 20 may include an inner barrier layer 26, which is implemented to fluidly isolate the pipe bore 32 of the pipe segment 20 from the tubing annulus 25 of the pipe segment 20, and an outer barrier layer 28, which is implemented to fluidly isolate the tubing annulus 25 of the pipe segment 20 from external environmental conditions. Although some amount may nevertheless occur, a fluid parameter change that results in a pipe segment 20 with non-faulty tubing 22 due to test fluid being supplied to the pipe segment 20 is generally predictable, for example, based at least in part on a model, empirical testing, external environmental conditions, fluid parameters of the test fluid, implementation parameters, such as material and/or thickness, of the tubing 22 of the pipe segment 20, or any combination thereof. In other words, at least in some instances, an annulus fluid parameter resulting in a pipe segment 20 that differs from a corresponding fluid parameter of annulus test fluid supplied to the tubing annulus 25 of a pipe segment 20 by more than a corresponding difference (e.g., error) threshold, which facilitates accounting for the expected (e.g., predicted) change (e.g., in addition to sensor (e.g., measurement) error and/or changes in external environmental conditions), may indicate that the tubing 22 of the pipe segment 20 is potentially faulty.

Accordingly, to facilitate determining an integrity state of a pipe segment 20, a pipe integrity testing system 38 may determine one or more fluid parameters that result in the tubing annulus 25 of the pipe segment 20 due annulus test fluid being supplied to the tubing annulus 25 using one or more fluid parameter sensors 43, for example, which are fluidly connected to an annulus fluid port 92 on a corresponding test head 44 (process block 282). In particular, in some embodiments, determining one or more annulus fluid parameters that result in a pipe segment 20 may include determining an annulus fluid pressure using a fluid pressure sensor 43 (process block 288), determining an annulus fluid temperature using a fluid temperature sensor 43 (process block 290), determining an annulus fluid composition using a fluid composition sensor 43 (process block 292), or any combination thereof.

In some embodiments, a pipe integrity testing system 38 may identify that the integrity state of a pipe segment 20 is a non-faulty state when each annulus fluid parameter resulting in the pipe segment 20 does not differ from a corresponding fluid parameter of annulus test fluid supplied to the pipe segment 20 by more than a corresponding difference threshold, which facilitates accounting for expected (e.g., predicted) change, for example, in addition to sensor (e.g., measurement) error and/or changes in external environmental conditions. Merely as an illustrative non-limiting example, a pipe integrity testing system 38 may determine that the integrity state of a pipe segment 20 is a non-faulty state when annulus fluid pressure resulting in the pipe segment 20 does not differ from the fluid pressure of annulus test fluid supplied to the pipe segment 20 by more than a fluid pressure difference threshold, when annulus fluid temperature resulting in the pipe segment 20 does not differ from the temperature of the annulus test fluid by more than a temperature difference threshold, and when annulus fluid composition resulting in the pipe segment 20 does not differ from fluid composition of the annulus test fluid by more than a composition difference threshold.

On the other hand, in some embodiments, a pipe integrity testing system 38 may identify that the integrity state of a pipe segment 20 is a faulty state when one or more annulus fluid parameters resulting in the pipe segment 20 differs from a corresponding fluid parameter of annulus test fluid supplied to the pipe segment 20 by more than a corresponding difference threshold. Merely as an illustrative non-limiting example, a pipe integrity testing system 38 may determine that the integrity state of a pipe segment 20 is a faulty state when annulus fluid pressure resulting in the pipe segment 20 differs from the fluid pressure of annulus test fluid supplied to the pipe segment 20 by more than a fluid pressure difference threshold, when annulus fluid temperature resulting in the pipe segment 20 differs from the temperature of the annulus test fluid by more than a temperature difference threshold, or when annulus fluid composition resulting in the pipe segment 20 differs from the fluid composition of the annulus test fluid by more than a composition difference threshold.

Nevertheless, as described above, to facilitate improving pipe integrity testing, in some embodiments, a pipe integrity testing system 38 may additionally determine an integrity state of a pipe segment 20 based at least in part on one or more bore fluid parameters that result in the pipe segment 20 due to supply of annulus test fluid to the pipe segment 20. In particular, since the inner barrier layer 26 of a pipe segment 20 is implemented to provide fluid isolation between the pipe bore 32 of the pipe segment 20 and the tubing annulus 25 of the pipe segment 20, in some embodiments, a bore fluid parameter change resulting in a pipe segment 20 due to supply of annulus test fluid to the pipe segment 20 that exceeds a corresponding difference (e.g., error) threshold, which facilitates accounting for expected (e.g., predicted) change (e.g., in addition to sensor (e.g., measurement) error and/or changes in external environmental conditions), may indicate that the tubing 22 of the pipe segment 20 is potentially faulty.

Accordingly, to facilitate determining an integrity state of a pipe segment 20, in such embodiments, a pipe integrity testing system 38 may determine one or more fluid parameters that result in the pipe bore 32 of the pipe segment 20 due to supply of annulus test fluid to the tubing annulus 25 of the pipe segment 20 using one or more fluid parameter sensors 43, for example, which are fluidly connected to a bore fluid port 166 on a corresponding test head 44 (process block 286). In particular, in some embodiments, determining one or more bore fluid parameters that result in a pipe segment 20 may include determining a bore fluid pressure using a fluid pressure sensor 43 (process block 294), determining a bore fluid pressure using a fluid temperature sensor 43 (process block 296), determining a bore fluid composition using a fluid composition sensor 43 (process block 298), or any combination thereof.

In some embodiments, a pipe integrity testing system 38 may identify that the integrity state of a pipe segment 20 is a non-faulty state when each bore fluid parameter resulting in the pipe segment 20 does not change by more than a corresponding difference threshold, which facilitates accounting for expected (e.g., predicted) change, for example, in addition to sensor (e.g., measurement) error and/or changes in external environmental conditions. Merely as an illustrative non-limiting example, a pipe integrity testing system 38 may determine that the integrity state of a pipe segment 20 is a non-faulty state when a change in bore fluid pressure resulting in the pipe segment 20 due to supply of annulus test fluid to the pipe segment 20 does not exceed a pressure difference threshold, when a change in bore fluid temperature resulting in the pipe segment 20 due to supply of annulus test fluid to the pipe segment 20 does not exceed a temperature difference threshold, and when a change in bore fluid composition resulting in the pipe segment 20 due to supply of annulus test fluid to the pipe segment 20 does not exceed a composition difference threshold.

On the other hand, in some embodiments, a pipe integrity testing system 38 may identify that the integrity state of a pipe segment 20 is a faulty state when one or more bore fluid parameters resulting in the pipe segment 20 changes by more than a corresponding difference threshold due to supply of annulus test fluid to the pipe segment 20. Merely as an illustrative non-limiting example, a pipe integrity testing system 38 may determine that the integrity state of a pipe segment 20 is a faulty state when bore fluid pressure in the pipe segment 20 changes by more than a pressure difference threshold due to supply of annulus test fluid to the pipe segment 20, when bore fluid temperature in the pipe segment 20 changes by more than a temperature difference threshold due to supply of the annulus test fluid, or when bore fluid composition in the pipe segment 20 changes by more than a composition difference threshold due to supply of the annulus test fluid.

In fact, in some embodiments, determining an integrity state of a pipe segment 20 based on an annulus fluid parameter as well as a bore fluid parameter resulting in the pipe segment 20 may facilitate identifying which tubing layer in the pipe segment 20 is potentially faulty, for example, to enable the fault to be fixed before the pipe segment 20 is deployed in and/or used in normal operation of a pipeline system 10. In particular, when an integrity state determined based on annulus fluid parameter resulting in a pipe segment 20 and an integrity state determined based on a bore fluid parameter resulting in the pipe segment 20 are both faulty states, a pipe integrity testing system 38 may determine that a fault, such as a breach, is potentially present in at least the inner barrier layer 26 of the pipe segment 20. Additionally, when an integrity state determined based on annulus fluid parameter resulting in a pipe segment 20 and an integrity state determined based on a bore fluid parameter resulting in the pipe segment 20 are both non-faulty states, a pipe integrity testing system 38 may determine that the tubing 22 of the pipe segment 20 does not include a fault. Furthermore, when an integrity state determined based on an annulus fluid parameter resulting in a pipe segment 20 is a faulty state while an integrity state determined based on a bore fluid parameter resulting in the pipe segment is a non-faulty state, a pipe integrity testing system 38 may determine that a fault, such as a breach, is potentially present in the outer barrier layer 28 of the pipe segment 20. In this manner, a pipe integrity testing system 38 may be operated to perform a cycle of a pipe integrity test on a pipe segment 20.

Returning to the process 62 of FIG. 17, the pipe integrity testing system 38 may then determine whether the pipe segment 20 being tested has passed the integrity test (decision block 68). In particular, the pipe integrity testing system 38 may determine that the pipe segment 20 has passed when the integrity test indicates that the integrity state of its tubing 22 is a non-faulty state. On the other hand, the pipe integrity testing system 38 may determine that the pipe segment 20 has not passed when the integrity test indicates that the integrity state of its tubing 22 is a faulty state.

To facilitate improving operational efficiency and/or operational reliability of a pipeline system 10 in which a pipe segment 20 is or is to be deployed, when the pipe segment 20 has not passed an integrity test, one or more faults in its tubing 22 may be ameliorated (e.g., fixed and/or repaired), for example, by a user (e.g., operator and/or service technician) of the pipe integrity testing system 38 based at least in part on results of the integrity test before the pipe segment 20 is used in normal operation of the pipeline system 10 (process block 72). To facilitate communicating results of an integrity test to a user, in some embodiments, the pipe integrity testing system 38 may instruct an I/O device 54, such as an electronic display, to display a graphical user interface (GUI) that provides a visual representation of the integrity test results. For example, the graphical user interface may include a visual representation of the integrity state of the pipe segment 20, an expected type of fault present in the tubing 22 of the pipe segment 20, and/or a potentially faulty tubing layer in the tubing 22 of the pipe segment 20. In fact, in some embodiments, another cycle of the pipe integrity test may be performed on the pipe segment 20 once a fault in its tubing 22 is believed to have been ameliorated (arrow 196)

On the other hand, when the pipe segment 20 has passed the integrity test, the test head 44 may be removed from the pipe segment 20 (process block 70). In particular, as described above, in some embodiments, a test head 44 may be secured to a pipe segment 20 using swaging techniques that conformally deform (e.g., swage) at least a portion of the test head 44 around the tubing 22 of the pipe segment 20. As described above, a test head 44 secured to a pipe segment 20 using swaging techniques may effectively be permanently secured to the pipe segment 20. Accordingly, in such embodiments, a test head 44 secured to a pipe segment 20 using swaging techniques may be removed from the pipe segment 20 by cutting the test head 44, along with a portion of the pipe segment 20 secured therein, off from the remainder of the pipe segment 20 before the pipe segment 20 can be deployed in and/or used in normal operation of a pipeline system 10.

Moreover, as described above, even when a portion of a pipe segment 20 secured in a test head 44 is removable from the test head 44, at least in some instances, the deformation produced in the test head 44 to secure to the test head 44 to the pipe segment 20 may limit the ability of the test head 44 to be reused for testing the integrity of another (e.g., different) pipe segment 20. In other words, at least in some instances, a test head 44 secured using swaging techniques may effectively be a one-time-use (e.g., sacrificial) test head 44. Thus, at least in such instances, utilizing a test head 44 secured via swaging techniques may potentially limit testing efficiency of a pipeline system 10, for example, due to at least one new (e.g., different) test head 44 being used to test each pipe segment 20 deployed or to be deployed in the pipeline system 10.

Accordingly, as described above, to facilitate improving pipe integrity testing efficiency, in other embodiments, a pipe integrity testing system 38 may include a test head 44—namely a reusable test head 76—that may be reused to separately test the integrity of multiple different pipe segments 20. In particular, as described above, to facilitate sealing a tubing annulus 25 of a pipe segment 20 from environmental conditions external to the pipe segment 20 and, thus, testing the integrity of the pipe segment 20, a reusable test head 76 in a pipe integrity testing system 38 generally includes an end cap assembly 78, which is to be used to cover an open (e.g., axial) end of the pipe segment 20. In particular, as described above, an end cap assembly 78 of a reusable test head 76 generally includes a reusable cap fastener mechanism 82 that expands radially inward when transitioned from its deactivated state towards its activated state and that contracts radially outward when transitioned from its activated state toward its deactivated state. Accordingly, removing a reusable test head 76 from a pipe segment 20 may generally include transitioning an end cap assembly 78 of the reusable test head 76 from its activated state to its deactivated state such that an inner surface 83 of a reusable cap fastener mechanism 82 in the end cap assembly 78 disengages from an outer surface 144 of the tubing 22 of the pipe segment 20.

To enable repeatedly cycling between an activated state and a deactivated state and, thus, separately testing the integrity of multiple different pipe segments 20, as described with regard to FIGS. 7-9, in some embodiments, a reusable cap fastener mechanism 82 in an end cap assembly 78 of a reusable test head 76 may be an inflatable (e.g., pneumatic) cap fastener mechanism 82, which generally includes a cap fluid bladder 104 that is fluidly connected to an inflation fluid port 94, which opens through the end cap assembly 78. In particular, in such embodiments, a cap fluid bladder 104 may generally contract radially outward when inflation fluid is extracted (e.g., released) from its cap fluid cavity 106. According, in such embodiments, transitioning an end cap assembly 78 of a reusable test head 76 from its activated state to its deactivated state may include extracting (e.g., releasing) inflation fluid from a cap fluid bladder 104 in the end cap assembly 78, for example, to external environmental conditions and/or an inflation fluid source 113 that is fluidly connected to a corresponding inflation fluid port 94 on the reusable test head 76.

However, as described above with regard to FIGS. 10A and 10B, to enable repeatedly cycling between an activated state and a deactivated state and, thus, separately testing the integrity of multiple different pipe segments 20, in other embodiments, a reusable cap fastener mechanism 82 in an end cap assembly 78 of a reusable test head 76 may be a mechanical cap fastener mechanism 82, which generally includes one or more cap seals 140. As described above, to facilitate controlling expansion and contraction of a cap seal 140 and, thus, its activation state, in some embodiments, an end cap assembly 78 of a reusable test head 76 may additionally include a cap end plate 90, which is to be used to cover an open end of a pipe segment 20 and includes a shaft opening (e.g., pad eye) 148A that enables a threaded shaft (e.g., threaded cap shaft 146 or threaded support shaft 170H) to be inserted therethrough, a cap end ring 138, which is to be disposed circumferentially around the pipe segment 20 and includes another shaft opening (e.g., pad eye) 148B that enables the threaded shaft to be inserted therethrough, a cap sleeve 88, which is to be disposed circumferentially around the pipe segment 20 between the cap end plate 90 and the cap end ring 138 such that the cap seal 140 is disposed between the cap sleeve 88 and the cap end ring 138, an end plate nut 150 that is to be selectively tightened on the threaded shaft behind the shaft opening 148A in the cap end plate 90, and an end ring nut 152 that is to be selectively tightened on the threaded shaft in front of the shaft opening 148B in the cap end ring 138. In particular, in such embodiments, enabling the cap end ring 138 to move axially away from the cap sleeve 88 may enable the cap seal 140 to contract radially outward (e.g., due to material spring back). Accordingly, in such embodiments, transitioning an end cap assembly 78 of a reusable test head 76 from its activated state to its deactivated state may include loosening an end plate nut 150 from behind a shaft opening 148A in a cap end plate 90 of the end cap assembly 78 and/or loosening an end ring nut 152 from in front of a cap end ring 138 in the end cap assembly 78 to enable a cap seal 140 of the end cap assembly 78 push the cap end ring 138 and a cap sleeve 88, which is disposed between the cap end plate 90 and the cap end ring 138, axially away from one another.

In any case, as described above, in addition to an end cap assembly, to facilitate sealing a tubing annulus 25 of a pipe segment 20 from the pipe bore 32 of the pipe segment 20 and, thus, testing the integrity of the pipe segment 20, a reusable test head 76 generally includes a bore plug assembly 80, which is to be at least partially inserted into the pipe bore 32 of the pipe segment 20. In particular, as described above, a bore plug assembly 80 of a reusable test head 76 generally includes a reusable plug fastener mechanism 84 that expands radially outward when transitioned from its deactivated state towards its activated state and that contracts radially inward when transitioned from its activated state toward its deactivated state. Accordingly, removing a reusable test head 76 from a pipe segment 20 may generally include transitioning a bore plug assembly 80 of the reusable test head 76 from its activated state to its deactivated state such that an outer surface 85 of a reusable plug fastener mechanism 84 in the bore plug assembly 80 disengages from the inner surface 30 of the tubing 22 of the pipe segment 20 and, subsequently, withdrawing the bore plug assembly 80 from the pipe bore 32 of the pipe segment 20.

To enable repeatedly cycling between an activated state and a deactivated state and, thus, separately testing the integrity of multiple different pipe segments 20, as described with regard to FIGS. 7-9 and 11, in some embodiments, a reusable plug fastener mechanism 84 in a bore plug assembly 80 of a reusable test head 76 may be an inflatable (e.g., pneumatic) plug fastener mechanism 84, which generally includes a plug fluid bladder 110 that is fluidly connected to an inflation fluid port 94, which opens through the end cap assembly 78 of the reusable test head 76. In particular, in such embodiments, a plug fluid bladder 110 in a reusable test head 76 may generally contract radially inward when inflation fluid is extracted (e.g., released) from its plug fluid cavity 112. Accordingly, in such embodiments, transitioning a bore plug assembly 80 of a reusable test head 76 from its activated state to its deactivated state may generally include extracting (e.g., releasing) inflation fluid from a plug fluid bladder 110 in the bore plug assembly 80, for example, to external environmental conditions or an inflation fluid source 113 that is fluidly connected to a corresponding inflation fluid port 94 on the reusable test head 76 via one or more external inflation fluid conduits 115.

However, as described above with regard to FIGS. 10A and 10B, to enable repeatedly cycling between an activated state and a deactivated state and, thus, separately testing the integrity of multiple different pipe segments 20, in other embodiments, a reusable plug fastener mechanism 84 in a bore plug assembly 80 of a reusable test head 76 may be a mechanical plug fastener mechanism 84, which generally includes a plug seal 118. As described above, to facilitate controlling expansion and contraction of a plug seal 118 and, thus, its activation state, in some embodiments, a bore plug assembly 80 of a reusable test head 76 may additionally include a threaded plug shaft 96, a plug end plate 120, which is secured to an end of the threaded plug shaft 96, a plug activation plate 122, which is disposed circumferentially around the threaded plug shaft 96 such that the plug seal 118 is disposed between the plug activation plate 122 and the plug end plate 120, and a plug activation nut 124, which is to be selectively tightened on the threaded plug shaft 96 behind the plug activation plate 122. In particular, in such embodiments, enabling the plug activation plate 122 to move axially away from the plug end plate 120 may enable the plug seal 118 to contract radially inward. Accordingly, in such embodiments, transitioning a bore plug assembly 80 of a reusable test head 76 from its activated state to its deactivated state may include loosening a plug activation nut 124 from behind a plug activation plate 122 of the bore plug assembly 80 to enable a plug seal 118 of the bore plug assembly 80 to push the plug activation plate 122 axially away from a plug end plate 120 of the bore plug assembly 80.

In any case, to facilitate improving securement to a pipe segment 20, in some embodiments, a reusable test head 76 in a pipe integrity testing system 38 may additionally include a supplemental support assembly 168, which is to be secured to the tubing 22 of the pipe segment 20 as well as an end cap assembly 78 of the reusable test head 76. Accordingly, in such embodiments, removing a reusable test head 76 to a pipe segment 20 may include removing (e.g., disconnecting) a supplemental support assembly 168 of the reusable test head 76 from the tubing 22 of the pipe segment 20.

In particular, as described above, to facilitate securement to a pipe segment 20, a supplemental support assembly 168 of a reusable test head 76 may generally include a support clamp 172, which is to be disposed circumferentially around the tubing 22 of the pipe segment 20, and a support activation fastener 178, such as a nut and a bolt, which is to be selectively tightened around a pair of clamp flanges 176 on the support clamp 172 to tighten the support clamp 172 around the pipe segment tubing 22. Accordingly, in such embodiments, removing a supplemental support assembly 168 of a reusable test head 76 from a pipe segment 20 may include loosening a support activation fastener 178, such as a nut and a bolt, from around a corresponding pair of clamp flanges 176 on a support clamp 172 and, subsequently, removing the support clamp 172 from the pipe segment 20, for example, by sliding the support clamp 172 off of the pipe segment 20 while the support activation fastener 178 remains secured around the clamp flanges 176.

Additionally, as described above, to facilitate securement to a corresponding end cap assembly 78, a supplemental support assembly 168 of a reusable test head 76 generally includes one or more support members (e.g., arms) 170, which each is or is to be secured to the end cap assembly 78. In particular, as described with regard to FIG. 12, in some embodiments, a support member 170 in a supplemental support assembly 168 may be a support chain 170F, which is to be secured (e.g., shackled) to a support activation fastener 178 in the supplemental support assembly 168 as well as to a threaded cap shaft 146 in a corresponding end cap assembly 78. Accordingly, in such embodiments, disconnecting an end cap assembly 78 of a reusable test head 76 from a support clamp 172 in a corresponding supplemental support assembly 168 may include disconnecting (e.g., unshackling) a first end of a support chain 170F from the end cap assembly 78 and/or disconnecting (e.g., unshackling) a second end of the support chain 170F from the support clamp 172.

However, as described with regard to FIG. 14, in other embodiments, a supplemental support assembly 168 of a reusable test head 76 may include a threaded support shaft 170H, which is to be secured between a pair of clamp flanges 176 on a support clamp 172 in the supplemental support assembly 168 and within a shaft opening 148 in the end cap assembly 78, and a support securement nut 182, which is to be secured to an end of the threaded support shaft 170H that is opposite to an end of the threaded support shaft 170H to which a cap nut (e.g., end plate nut 150 or end ring nut 152) is to be secured. Accordingly, in such embodiments, disconnecting an end cap assembly 78 of a reusable test head 76 from a support clamp 172 in a corresponding supplemental support assembly 168 may include unsecuring a cap nut (e.g., end plate nut 150 or end ring nut 152) and/or a support securement nut 182 from a threaded support shaft 170H in the supplemental support assembly 168.

Moreover, as described with regard to FIGS. 15 and 16, in other embodiments, a support member 170 in a supplemental support assembly 168 of a reusable test head 76 may be a support bar 170, which includes one or more fastener openings that each enables a corresponding fastener to be secured through the support bar 170. In particular, as described above, a support bar 170 may include a fastener opening that enables a support activation fastener 178, which is to be secured around (e.g., through) clamp flanges 176 of a corresponding support clamp 172, to be secured through the support bar 170, for example, such that the support bar 170 is secured between the clamp flanges 176. Accordingly, in such embodiments, disconnecting an end cap assembly 78 of a reusable test head 76 from a support clamp 172 in a corresponding supplemental support assembly 168 may include removing a support activation fastener 178 from a fastener opening in a support member (e.g., bar) 170 in the supplemental support assembly 168 and/or a clamp flange 176 on the support clamp 172.

Additionally, as described with regard to FIG. 15, to facilitate selective securement to a corresponding end cap assembly 78, in some such embodiments, a support bar 170 in a supplemental support assembly 168 may include a fastener opening that enables a cap securement fastener 186 to be secured through the support bar 170 as well as around (e.g., through) cap flanges 188 on the end cap assembly 78, for example, such that the support bar 170 is secured between the cap flanges 188. Accordingly, in such embodiments, disconnecting an end cap assembly 78 of a reusable test head 76 from a support clamp 172 in a corresponding supplemental support assembly 168 may include removing a cap securement fastener 186 from a fastener opening in a support member (e.g., bar) 170 in the supplemental support assembly and/or a cap flange 188 in the end cap assembly 78.

Nevertheless, as mentioned above, in some embodiments, an end cap assembly 78 of a reusable test head 76 and a corresponding supplemental support assembly 168 may not be disconnected from one another when the reusable test head 76 is being removed from a pipe segment 20, for example, to facilitate reducing deployment duration for re-deploying (e.g., reinstalling and/or reusing) the reusable test head 76 at another pipe segment 20. In any case, in this manner, a reusable test head 76 may be removed from a pipe segment 20, for example, after the pipe segment 20 has passed a pipe integrity test.

After a reusable test head 76 is removed from a pipe segment 20, in some embodiments, the reusable test head 76 may be secured to another pipe segment 20 and, thus, used to test the integrity of the other pipe segment 20 (arrow 212). Merely as an illustrative non-limiting example, implementing and/or operating a reusable test head 76 in accordance with the techniques described in the present disclosure may enable the reusable test head 76 to be secured to a first pipe segment 20 to test the integrity of the first pipe segment 20, removed from the first pipe segment 20 after completing an integrity test for the first pipe segment 20, secured to a second (e.g., different) pipe segment 20 to test the integrity of the second pipe segment 20, and so on. Thus, at least in some instances, implementing and/or operating a (e.g., reusable) test head in accordance with the techniques described in the present disclosure may facilitate improving testing efficiency of a pipeline system, for example, by obviating the use of a new (e.g., different) test head for testing the integrity of each pipe segment deployed or to be deployed in the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:
1. A test head comprising:
an end cap assembly, wherein the test head is configured to be secured to an open end of a pipe segment such that the open end of the pipe segment is sealed therein and the end cap assembly comprises:
  a cap end plate configured to cover the open end of the pipe segment;
  a cap sleeve configured to be disposed circumferentially around the pipe segment; and
  a reusable cap fastener mechanism configured to:
    run circumferentially along an inner surface of the cap sleeve; and
    expand radially inward such that the reusable cap fastener mechanism circumferentially engages a tubing outer surface of the pipe segment to facilitate securing and sealing the open end of the pipe segment within the test head;
a bore plug assembly comprising a reusable plug fastener mechanism that comprises a plug fluid bladder, wherein the plug fluid bladder is configured to be disposed within a pipe bore of the pipe segment and to expand radially outward such that the plug fluid bladder circumferentially engages a tubing inner surface of the pipe segment to facilitate securing and sealing the open end of the pipe segment within the test head;
an inflation fluid port that opens through the end cap assembly;
an internal inflation fluid conduit that fluidly connects the inflation fluid port to the plug fluid bladder to enable inflation fluid to be supplied to the plug fluid bladder, extracted from the plug fluid bladder, or both; and
an annulus fluid port that opens through the end cap assembly, wherein the annulus fluid port is configured to facilitate testing integrity of the pipe segment at least in part by enabling annulus test fluid to be supplied to a tubing annulus of the pipe segment, enabling annulus fluid to flow out from the tubing annulus of the pipe segment, or both.

2. The test head of claim 1, comprising:
a support clamp, wherein the support clamp is configured to be secured circumferentially around the pipe segment external to the end cap assembly; and
a support member configured to be secured to the support clamp and to the end cap assembly to facilitate securing the open end of the pipe segment within the test head.

3. The test head of claim 2, comprising a bolt and a nut, wherein:
the support clamp comprises a first clamp flange having a first fastener opening and a second clamp flange having a second fastener opening;
a threaded end of the bolt is configured to be inserted through the first fastener opening in the first clamp flange and the second fastener opening in the second clamp flange; and
the nut is configured to be tightened on the threaded end of the bolt to facilitate:
tightening the support clamp circumferentially around the pipe segment tubing; and
securing the support clamp to the support member.

4. The test head of claim 3, wherein:
the reusable cap fastener mechanism comprises a cap seal;
the end cap assembly comprises:
a cap end ring configured to be disposed circumferentially around the pipe segment such that the cap sleeve is disposed between the cap end plate and the cap end ring and the cap seal is disposed between the cap sleeve and the cap end ring;
a threaded cap shaft configured to be inserted through a first shaft opening in the cap end plate and through a second shaft opening in the cap end ring; and
an end plate nut configured to be tightened on the threaded cap shaft behind the first shaft opening in the cap end plate and an end ring nut configured to be tightened on the threaded cap shaft in front of the second shaft opening in cap end ring to axially compress the cap seal between the cap sleeve and the cap end ring such that the cap seal expands radially inward; and
the support member comprises a support chain having a first end configured to be shackled to the threaded cap shaft between the cap end ring and the cap end plate and a second end configured to be shackled to the bolt between the first clamp flange and the second clamp flange on the support clamp.

5. The test head of claim 3, comprising a support securement nut, wherein:
the support member comprises a threaded support shaft configured to be disposed between the first clamp flange and the second clamp flange on the support clamp;
the reusable cap fastener mechanism comprises a cap seal configured to be disposed circumferentially around the pipe segment;
the end cap assembly comprises:
a cap end ring configured to be disposed circumferentially around the pipe segment such that the cap sleeve is disposed between the cap end plate and the cap end ring and the cap seal is disposed between the cap sleeve and the cap end ring; and
an end plate nut configured to be tightened on the threaded support shaft behind a first shaft opening in the cap end plate and an end ring nut configured to be tightened on the threaded support shaft in front of a second shaft opening in cap end ring to axially compress the cap seal between the cap sleeve and the cap end ring such that the cap seal expands radially inward; and
the support securement nut is configured to be tightened on the threaded support shaft in front of the first clamp flange and the second clamp flange on the support clamp to facilitate securing the end cap assembly to the support clamp.

6. The test head of claim 2, comprising a nut, wherein:
the support clamp comprises a first clamp flange and a second clamp flange; and
the nut is configured to be tightened on a threaded shaft disposed between the first clamp flange and the second clamp flange to facilitate securing the support clamp to the end cap assembly.

7. The test head of claim 2, comprising a nut, wherein:
the end cap assembly comprises a first cap flange and a second cap flange; and
the nut is configured to be tightened on a threaded shaft disposed between the first cap flange and the second cap flange to facilitate securing the end cap assembly to the support clamp.

8. The test head of claim 1, comprising:
another inflation fluid port that opens through the end cap assembly, wherein the reusable cap fastener mechanism in the end cap assembly comprises a cap fluid bladder that is configured to be disposed circumferentially around the pipe segment; and
another internal inflation fluid conduit that fluidly connects the another inflation fluid port to the cap fluid bladder to enable inflation fluid to be supplied to the cap fluid bladder, extracted from the cap fluid bladder, or both.

9. The test head of claim 1, wherein the bore plug assembly comprises a plug shaft configured to be at least partially inserted into the pipe bore of the pipe segment, wherein:
the plug fluid bladder is secured to the plug shaft; and
the plug shaft, the cap end plate, and the cap sleeve are integrated together to form a shell.

10. The test head of claim 1, wherein the bore plug assembly comprises a plug shaft configured to be at least partially inserted into the pipe bore of the pipe segment, wherein:
the plug fluid bladder is secured circumferentially around the plug shaft; and
the plug shaft comprises a tube bore that opens through the plug fluid bladder.

11. The test head of claim 10, comprising a bore fluid port that opens through the end cap assembly to the tube bore of the plug shaft, wherein the bore fluid port is configured to facilitate testing integrity of the pipe segment at least in part by enabling bore test fluid to be supplied to the pipe bore of the pipe segment, enabling bore fluid to flow out from the pipe bore of the pipe segment, or both.

12. A test head comprising:
an end cap assembly within which an open end of pipe segment tubing is to be secured and sealed;
an annulus fluid port that opens through the end cap assembly;
a bore plug assembly comprising a reusable plug fastener mechanism configured to be disposed internal to the end cap assembly, wherein the reusable plug fastener mechanism is configured to facilitate securing and sealing the open end of the pipe segment tubing within the end cap assembly to enable integrity of the pipe segment tubing to be tested at least in part by flowing annulus test fluid into an internal annulus fluid conduit defined in an annulus of the pipe segment tubing via the annulus fluid port that opens through the end cap assembly; and
a supplemental support assembly comprising a support clamp configured to be secured to the end cap assembly such that the support clamp is external to the end cap assembly, wherein the support clamp is configured to be secured circumferentially around the pipe segment tubing to facilitate securing the open end of the pipe segment tubing within the end cap assembly.

13. The test head of claim 12, comprising:
an inflation fluid port that opens through the end cap assembly, wherein the reusable plug fastener mechanism comprises a plug fluid bladder configured to be disposed within a pipe bore defined by the pipe segment tubing and to expand radially outward such that the plug fluid bladder circumferentially engages an inner surface of the pipe segment tubing to facilitate securing and sealing the open end of the pipe segment tubing within the end cap assembly; and
an internal inflation fluid conduit that fluidly connects the inflation fluid port to the plug fluid bladder to enable inflation fluid to be supplied to the plug fluid bladder, extracted from the plug fluid bladder, or both.

14. The test head of claim 12, wherein:
the bore plug assembly comprises a plug shaft that defines a tube bore; and
the reusable plug fastener mechanism is secured circumferentially around the plug shaft.

15. The test head of claim 14, comprising a bore fluid port, wherein:
the bore fluid port opens through the end cap assembly to the tube bore of the plug shaft; and
the tube bore of the plug shaft opens through the reusable plug fastener mechanism to enable bore test fluid to be supplied to a pipe bore defined by the pipe segment tubing, bore fluid to flow out of the pipe bore, or both via the bore fluid port that opens through the end cap assembly.

16. The test head of claim 12, wherein the supplemental support assembly comprises a support securement fastener, wherein:
the support clamp comprises a first clamp flange and a second clamp flange that opposes the first clamp flange; and
the support securement fastener is configured to be tightened around the first clamp flange and the second clamp flange to facilitate:
tightening the support clamp around the pipe segment tubing; and
securing the support clamp to the end cap assembly.

17. The test head of claim 16, wherein:
the end cap assembly comprises:
a cap end plate configured to cover the open end of the pipe segment tubing;
a cap end ring configured to be disposed circumferentially around the pipe segment tubing;
a cap sleeve configured to be disposed circumferentially around the pipe segment tubing between the cap end plate and the cap end ring;
a cap seal configured to be disposed circumferentially around the pipe segment tubing between the cap sleeve and the cap end ring;
a threaded cap shaft configured to be inserted through a first shaft opening in the cap end plate and through a second shaft opening in the cap end ring; and
an end plate nut configured to be tightened on the threaded cap shaft behind the first shaft opening in the cap end plate and an end ring nut configured to be tightened on the threaded cap shaft in front of the second shaft opening in cap end ring to axially compress the cap seal between the cap sleeve and the cap end ring such that the cap seal expands radially inward; and the supplemental support assembly comprises a support chain having a first end configured to be shackled to the threaded cap shaft between the cap end ring and the cap end plate and a second end configured to be shackled to the support securement fastener between the first clamp flange and the second clamp flange on the support clamp.

18. A test head comprising:
an end cap assembly within which an open end of pipe segment tubing is to be secured and sealed;
an annulus fluid port that opens through the end cap assembly;
a support clamp configured to be secured to the end cap assembly and to be selectively tightened around the pipe segment tubing to facilitate securing the pipe segment tubing within the end cap assembly to enable integrity of the pipe segment tubing to be test at least in part by flowing annulus test fluid into an internal annulus fluid conduit defined within an annulus of the pipe segment tubing via the annulus fluid port that opens through the end cap assembly, wherein the support clamp comprises:
a first clamp flange having a first fastener opening; and
a second clamp flange having a second fastener opening, wherein the second clamp flange opposes the first clamp flange;
a bolt, wherein the bolt comprises a threaded end configured to be inserted through the first fastener opening in the first clamp flange and the second fastener opening in the second clamp flange; and
a nut configured to be tightened on the threaded end of the bolt to facilitate:
tightening the support clamp around the pipe segment tubing; and
securing the support clamp to the end cap assembly.

19. The test head of claim 18, comprising:
a plug fluid bladder configured to be disposed within a pipe bore defined by the pipe segment tubing and to expand radially outward such that the plug fluid bladder circumferentially engages an inner surface of the pipe segment tubing to facilitate securing and sealing the open end of the pipe segment tubing within the end cap assembly;
an inflation fluid port that opens through the end cap assembly; and
an internal inflation fluid conduit that fluidly connects the inflation fluid port to the plug fluid bladder to enable inflation fluid to be supplied to the plug fluid bladder, extracted from the plug fluid bladder, or both.

20. The test head of claim 18, comprising a support chain and a support securement fastener, wherein:
the support clamp comprises a first clamp flange and a second clamp flange that opposes the first clamp flange; and
the support securement fastener is configured to be tightened around the first clamp flange and the second clamp flange to facilitate tightening the support clamp around the pipe segment tubing;
the end cap assembly comprises:
a cap end plate configured to cover the open end of the pipe segment tubing;
a cap end ring configured to be disposed circumferentially around the pipe segment tubing;
a cap sleeve configured to be disposed circumferentially around the pipe segment tubing between the cap end plate and the cap end ring;

a cap seal configured to be disposed circumferentially around the pipe segment tubing between the cap sleeve and the cap end ring;

a threaded cap shaft configured to be inserted through a first shaft opening in the cap end plate and through a second shaft opening in the cap end ring; and an end plate nut configured to be tightened on the threaded cap shaft behind the first shaft opening in the cap end plate and an end ring nut configured to be tightened on the threaded cap shaft in front of the second shaft opening in cap end ring to axially compress the cap seal between the cap sleeve and the cap end ring such that the cap seal expands radially inward; and a first end of the support chain is configured to be shackled to the threaded cap shaft between the cap end ring and the cap end plate and a second end of the support chain is configured to be shackled to the support securement fastener between the first clamp flange and the second clamp flange on the support clamp to facilitate securing the end cap assembly to the support clamp.

\* \* \* \* \*